US011991785B2

(12) United States Patent
Xu et al.

(10) Patent No.: US 11,991,785 B2
(45) Date of Patent: May 21, 2024

(54) COMMUNICATION METHOD AND DEVICE FOR USE WITH A PACKET DATA CONVERGENCE PROTOCOL (PDCP) DUPLICATE TRANSMISSION FUNCTION

(71) Applicant: Huawei Technologies Co., Ltd., Shenzhen (CN)

(72) Inventors: Bin Xu, Beijing (CN); Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 17/507,508

(22) Filed: Oct. 21, 2021

(65) Prior Publication Data
US 2022/0046754 A1 Feb. 10, 2022

Related U.S. Application Data

(63) Continuation of application No. PCT/CN2019/130433, filed on Dec. 31, 2019.

(30) Foreign Application Priority Data

Apr. 22, 2019 (CN) .......................... 201910324451.3

(51) Int. Cl.
*H04W 80/02* (2009.01)
*H04L 5/00* (2006.01)
*H04W 28/06* (2009.01)

(52) U.S. Cl.
CPC .......... *H04W 80/02* (2013.01); *H04L 5/0098* (2013.01); *H04W 28/06* (2013.01)

(58) Field of Classification Search
CPC . H04W 80/02; H04W 28/06; H04W 72/0453; H04W 76/15; H04L 5/0098; H04L 5/001; H04L 1/08; H04L 1/18
See application file for complete search history.

(56) References Cited

U.S. PATENT DOCUMENTS 11,363,569 B2 * 6/2022 Babaei ................ H04L 5/0094
2018/0368107 A1 * 12/2018 Babaei ................ H04W 76/00
(Continued)

FOREIGN PATENT DOCUMENTS

CN 102123487 A 7/2011
CN 104796227 A 7/2015
(Continued)

OTHER PUBLICATIONS

Samsung, "Discussion on PDCP data volume calculation during PDCP Duplication," 3GPP TSG-RAN WG2 Meeting #100, Reno, USA, R2-1712964, total 3 pages, 3rd Generation Partnership Project, Valbonne, France (Nov. 27-Dec. 1, 2017).
(Continued)

Primary Examiner — Afshawn M Towfighi
(74) Attorney, Agent, or Firm — Leydig, Voit & Mayer, Ltd.

(57) ABSTRACT

This application relates to a communication method and device. The communication method includes: receiving first signaling, where the first signaling indicates to deactivate that a first logical channel; and determining, depending on whether a logical channel in an activated state and the first logical channel belong to a same MAC entity, whether an association relationship between a carrier and the logical channel in the activated state applies, where the first logical channel and the logical channel in the activated state belong to a same radio bearer, and a PDCP duplication transmission function is configured for the radio bearer. According to the method provided in embodiments of this application, after a logical channel is deactivated, carriers that should be used for a remaining logical channel can be known, so that a terminal device can perform a correct operation.

19 Claims, 13 Drawing Sheets

(56) References Cited

U.S. PATENT DOCUMENTS

| | | | |
|---|---|---|---|
| 2018/0368132 A1* | 12/2018 | Babaei | H04W 76/11 |
| 2019/0098533 A1 | 3/2019 | Babaei et al. | |
| 2020/0119976 A1 | 4/2020 | Xu et al. | |
| 2020/0252330 A1* | 8/2020 | Wei | H04L 1/08 |
| 2020/0374752 A1* | 11/2020 | Xiao | H04W 76/15 |
| 2021/0336732 A1* | 10/2021 | Shi | H04W 28/12 |

FOREIGN PATENT DOCUMENTS

| | | |
|---|---|---|
| CN | 107342851 A | 11/2017 |
| CN | 108811175 A | 11/2018 |
| CN | 109547168 A | 3/2019 |
| WO | 2018164499 A1 | 9/2018 |
| WO | 2018228569 A1 | 12/2018 |
| WO | 2020119461 A1 | 6/2020 |

OTHER PUBLICATIONS

Nokia et al., "Duplication with multiple legs in SgNB," 3GPP TSG-RAN WG3 Meeting #103, Athens, Greece, R3-180218, total 4 pages, 3rd Generation Partnership Project, Valbonne, France (Feb. 25-Mar. 1, 2019).

"3rd Generation Partnership Project; Technical Specification Group Radio Access Network; NR; NR and NG-RAN Overall Description; Stage 2 (Release 15)," 3GPP TS 38.300 V15.5.0, total 97 pages, 3rd Generation Partnership Project, Valbonne, France (Mar. 2019).

Ericsson, "MAC impact of PDCP duplication," 3GPP TSG-RAN WG2 #98-AH, Qingdao, P.R. of China, Tdoc R2-1707173, total 4 pages, 3rd Generation Partnership Project, Valbonne, France (Jun. 27-29, 2017).

"3rd Generation Partnership Project; Technical Specification Group Radio Access Network; NR; Medium Access Control (MAC) protocol specification (Release 15)," 3GPP TS 38.321 V15.5.0, total 78 pages, 3rd Generation Partnership Project, Valbonne, France (Mar. 2019).

MediaTek Inc.,"RLC failure in CA duplication," 3GPP TSG-RAN WG2 #99bis, Prague, CZ, R2-1710861, total 3 pages, 3rd Generation Partnership Project, Valbonne, France (Oct. 9-13, 2017).

"Summary of offline 006—Clarification on LCH-to-cell restriction," 3GPP TSG-RAN WG2 Meeting #103, Gothenburg, Sweden, R2-1813038, Total 20 pages, 3rd Generation Partnership Project, Valbonne, France (Aug. 20-24, 2018).

\* cited by examiner

COMMUNICATION METHOD AND DEVICE FOR USE WITH A PACKET DATA CONVERGENCE PROTOCOL (PDCP) DUPLICATE TRANSMISSION FUNCTION

CROSS-REFERENCE TO RELATED APPLICATIONS

This application is a continuation of International Application No. PCT/CN2019/130433, filed on Dec. 31, 2019, which claims priority to Chinese Patent Application No. 201910324451.3, filed on Apr. 22, 2019. The disclosures of the aforementioned applications are hereby incorporated by reference in their entireties.

TECHNICAL FIELD

This application relates to the field of communication technologies, and in particular, to a communication method and device.

BACKGROUND

A packet data convergence protocol (PDCP) duplication transmission function is introduced in a 5th generation (5G) mobile communication technology system. The PDCP duplication transmission function usually means duplicating, at a PDCP layer, a data packet of a radio bearer to obtain two identical packets (namely, duplicated packets), and then separately delivering the two data packets to two different radio link control (RLC) entities, to transmit the data packets to a media access control (MAC) layer by using different logical channels.

To ensure reliability of data transmission, the original data packet and the data packet obtained through duplication that are to be transmitted to the MAC layer cannot be transmitted on a same carrier, and therefore cannot be transmitted by using a same MAC protocol data unit (PDU). This is because only when the data packets are transmitted on different carriers by using different MAC PDUs, transmission of a MAC PDU is not affected when another MAC PDU is lost. That is, reliability is doubled.

Currently, the PDCP duplication transmission function is limited only to using two RLC entities and two logical channels to transmit data packets of one radio bearer that are duplicated at the PDCP layer, and an association relationship with a carrier may be configured for each of the two logical channels, to ensure transmission of data of different logical channels on different carriers. When the PDCP duplication transmission function is activated or deactivated, the association relationship may change. However, when the PDCP duplication transmission function is not limited to two RLC entities and two logical channels, after a logical channel is deactivated, how to change an association relationship between a carrier and a remaining logical channel is still a problem to be urgently resolved.

SUMMARY

Embodiments of this application provide a communication method and device, to resolve a technical problem of knowing which carriers should be used for a remaining logical channel after a logical channel is deactivated.

According to a first aspect, a first communication method is provided. The method includes: receiving first signaling, where the first signaling is used to indicate to deactivate a first logical channel; and determining, depending on whether a logical channel in an activated state and the first logical channel belong to a same MAC entity, whether an association relationship between a carrier and the logical channel in the activated state applies, where the first logical channel and the logical channel in the activated state belong to a same radio bearer, and a PDCP duplication transmission function is configured for the radio bearer.

The method may be performed by a first communication apparatus. The first communication apparatus may be a communication device or a communication apparatus, for example, a chip system, that can support the communication device in implementing a function required for the method. For example, the communication device is a terminal device.

In this embodiment of this application, if the first logical channel is deactivated, whether an association relationship between a carrier and a remaining logical channel in the activated state applies may be determined depending on whether the remaining logical channel in the activated state and the first logical channel belong to a same MAC entity. It can be learned that, according to the method provided in this embodiment of this application, after a logical channel is deactivated, carriers that should be used for a remaining logical channel can be known, so that the terminal device can perform a correct operation.

With reference to the first aspect, in a possible implementation of the first aspect, the determining, depending on whether a logical channel in an activated state and the first logical channel belong to a same MAC entity, whether an association relationship between a carrier and the logical channel in the activated state applies includes: when a second logical channel in the activated state and the first logical channel belong to a same MAC entity, determining that an association relationship between a carrier and the second logical channel does not apply.

In this embodiment of this application, if the first logical channel is deactivated, and the activated second logical channel and the first logical channel belong to the same MAC entity, the association relationship between a carrier and the second logical channel does not apply, thereby improving a system capacity. In addition, according to the method provided in this embodiment of this application, after a logical channel is deactivated, carriers that should be used for a remaining activated logical channel can be known, so that the terminal device can perform a correct operation.

With reference to the first aspect, in a possible implementation of the first aspect, the method further includes: determining that a data packet carried on the second logical channel is capable of being transmitted on a first type of carrier, where the first type of carrier includes all carriers corresponding to the MAC entity, or the first type of carrier includes a carrier that had an association relationship with the first logical channel before the first logical channel is deactivated and a carrier that has an association relationship with the second logical channel.

That an association relationship between a carrier and a logical channel does not apply may alternatively be described as that a specific carrier or specific carriers on which data carried on the logical channel is transmitted is/are not limited by the association relationship between a carrier and a logical channel. In this case, if the terminal device determines that the association relationship between a carrier and the second logical channel does not apply, the terminal device may further determine that the data packet carried on the second logical channel is capable of being transmitted on the first type of carrier of the MAC entity. For example, the first type of carrier includes all the carriers corresponding to the MAC entity. All the carriers corresponding to the MAC entity include the carrier that had an association relationship with the first logical channel before the first logical channel is deactivated and the carrier that has an association relationship with the second logical channel. In addition, if the MAC entity further corresponds to other logical channels in addition to the first logical channel and the second logical channel, all the carriers corresponding to the MAC entity also include carriers having association relationships with these other logical channels. If the MAC entity further includes an available carrier that has no association relationship with any logical channel, all the carriers corresponding to the MAC entity also include the carrier. Alternatively, the first type of carrier may include the carrier that had an association relationship with the first logical channel before the first logical channel is deactivated and the carrier that has an association relationship with the second logical channel. In this case, if the MAC entity further corresponds to other logical channels in addition to the first logical channel and the second logical channel, the first type of carrier does not include carriers having association relationships with these other logical channels. If the MAC entity further includes an available carrier that has no association relationship with any logical channel, the first type of carrier does not include the carrier either.

With reference to the first aspect, in a possible implementation of the first aspect, the determining, depending on whether a logical channel in an activated state and the first logical channel belong to a same MAC entity, whether an association relationship between a carrier and the logical channel in the activated state applies includes:

when the logical channel in the activated state and the first logical channel belong to the same MAC entity, and a quantity of logical channels in the activated state is 1, determining that the association relationship between a carrier and the logical channel in the activated state does not apply;

when the logical channel in the activated state and the first logical channel belong to the same MAC entity, and a quantity of logical channels in the activated state is greater than 1, determining that the association relationship between a carrier and the logical channel in the activated state still applies; or when the logical channel in the activated state and the first logical channel belong to the same MAC entity, and a quantity of logical channels in the activated state is greater than 1, determining, based on first information, a carrier used to transmit a data packet carried on the logical channel in the activated state, where the first information is obtained from the first signaling, or the first information is preset information.

If the first logical channel is deactivated, the logical channel in the activated state and the first logical channel belong to the same MAC entity, and the quantity of logical channels in the activated state is 1, it may be determined that the association relationship between a carrier and the logical channel in the activated state does not apply. For example, all carriers of the MAC entity may be used for the logical channel in the activated state. This can improve a system capacity. Alternatively, if the logical channel in the activated state and the first logical channel belong to the same MAC entity, but the quantity of logical channels in the activated state is greater than 1, and if the association relationship between a carrier and the logical channel in the activated state is set not to apply, a same carrier may be selected for different logical channels in the activated state, and consequently, PDCP duplication transmission cannot be implemented. Therefore, in this case, the association relationship between a carrier and the logical channel in the activated state may be set to still apply, or an association relationship between a carrier and the logical channel in the activated state may be determined based on the first information, to ensure as much as possible that the PDCP duplication transmission function can be implemented.

With reference to the first aspect, in a possible implementation of the first aspect, the determining, depending on whether a logical channel in an activated state and the first logical channel belong to a same MAC entity, whether an association relationship between a carrier and the logical channel in the activated state applies includes: when the logical channel in the activated state and the first logical channel belong to different MAC entities, determining that the association relationship between a carrier and the logical channel in the activated state still applies.

If the logical channel in the activated state and the first logical channel belong to different MAC entities, the different MAC entities do not affect each other. Therefore, the association relationship between a carrier and the logical channel in the activated state may still apply.

According to a second aspect, a second communication method is provided. The method includes: determining to deactivate a first logical channel; and sending first signaling to a terminal device, where the first signaling indicates to deactivate the first logical channel, to indicate the terminal device to determine, depending on whether a logical channel in an activated state and the first logical channel belong to a same MAC entity, whether an association relationship between a carrier and the logical channel in the activated state applies.

The method may be performed by a second communication apparatus. The second communication apparatus may be a communication device or a communication apparatus, for example, a chip system, that can support the communication device in implementing a function required for the method. For example, the communication device is a network device.

With reference to the second aspect, in a possible implementation of the second aspect, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when a second logical channel in the activated state and the first logical channel belong to a same MAC entity, that an association relationship between a carrier and the second logical channel does not apply.

With reference to the second aspect, in a possible implementation of the second aspect, the first signaling further indicates the terminal device to determine that a data packet carried on the second logical channel is capable of being transmitted on a first type of carrier, where the first type of carrier includes all carriers corresponding to the MAC entity, or the first type of carrier includes a carrier that had an association relationship with the first logical channel before the first logical channel is deactivated and a carrier that has an association relationship with the second logical channel.

With reference to the second aspect, in a possible implementation of the second aspect, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when the logical channel in the activated state and the first logical channel belong to the same MAC entity, and a quantity of logical channels in the activated state is 1, that the association relationship between a carrier and the logical channel in the activated state does not apply;

the first signaling indicates the terminal device to determine, when the logical channel in the activated state and the first logical channel belong to the same MAC entity, and a quantity of logical channels in the activated state is greater than 1, that the association relationship between a carrier and the logical channel in the activated state still applies; or the first signaling indicates the terminal device to determine, based on first information when the logical channel in the activated state and the first logical channel belong to the same MAC entity, and a quantity of logical channels in the activated state is greater than 1, a carrier used to transmit a data packet carried on the logical channel in the activated state, where the first information is obtained from the first signaling, or the first information is preset information.

With reference to the second aspect, in a possible implementation of the second aspect, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when the logical channel in the activated state and the first logical channel belong to different MAC entities, that the association relationship between a carrier and the logical channel in the activated state still applies.

For technical effects brought by the second aspect or the implementations of the second aspect, refer to the descriptions of the technical effects of the first aspect or the implementations of the first aspect. Details are not described again.

According to a third aspect, a third communication method is provided. The method includes: receiving first signaling, where the first signaling indicates to activate or deactivate a first logical channel; and determining an association relationship between a carrier and a remaining activated logical channel of a radio bearer based on the first signaling, where the radio bearer is a radio bearer to which the first logical channel belongs, and a PDCP duplication transmission function is configured for the radio bearer.

The method may be performed by a third communication apparatus. The third communication apparatus may be a communication device or a communication apparatus, for example, a chip system, that can support the communication device in implementing a function required for the method. For example, the communication device is a terminal device.

In this embodiment of this application, a network device may indicate an association relationship between a carrier and a logical channel by using the first signaling, to reduce a possibility that an error occurs in a PDCP duplication transmission process, and an indication manner is relatively definite. In addition, in this manner of changing an association relationship between a carrier and a logical channel, an association relationship may be re-established between a logical channel and a carrier that had an association relationship with another logical channel that has been deactivated, so that these carriers are used, thereby helping improve a system capacity.

With reference to the third aspect, in a possible implementation of the third aspect, the first signaling further carries an identifier, and the determining an association relationship between a carrier and a remaining activated logical channel of a radio bearer based on the first signaling includes:

determining the association relationship between a carrier and a remaining activated logical channel of the radio bearer based on the identifier.

In this embodiment of this application, the network device may explicitly indicate an association relationship between a carrier and a logical channel by using the identifier. For example, a correspondence between an identifier and an association relationship may be preconfigured by the network device for the terminal device, or may be specified in a protocol. In this case, the network device only needs to include the identifier in the first signaling without including the specific association relationship. This helps reduce signaling overheads.

With reference to the third aspect, in a possible implementation of the third aspect, a quantity of identifiers carried in the first signaling is 1, and the identifier is used to indicate an association relationship between a carrier and each logical channel of the radio bearer; or a quantity of identifiers carried in the first signaling is less than or equal to a quantity of remaining activated logical channels of the radio bearer, and one of the identifiers is used to indicate an association relationship between a carrier and one activated logical channel.

In a first implementation of the identifier, one or more identifiers may be set for one logical channel, and each identifier corresponds to one association relationship between a carrier and the logical channel. In this manner, if the first signaling needs to indicate an association relationship between a carrier and a specific logical channel, an identifier corresponding to the logical channel may be carried in the first signaling. An indication manner is relatively definite, simple, and direct. Alternatively, in a second implementation of the identifier, one or more identifiers may be set for all logical channels of one radio bearer, in other words, one or more identifiers are set for one radio bearer, where one identifier corresponds to one association relationship between carriers and all the logical channels of the radio bearer. In this manner, all the logical channels only need to correspond to a same identifier. In this case, the first signaling only needs to carry one identifier to indicate the association relationship between carriers and all the activated logical channels. This helps reduce signaling overheads.

With reference to the third aspect, in a possible implementation of the third aspect, the method further includes:

receiving a correspondence between an identifier and a first association relationship, where the first association relationship includes the association relationship between a carrier and each logical channel of the radio bearer, and one identifier is used to indicate an association relationship between a carrier and one logical channel, or one identifier is used to indicate an association relationship between carriers and all logical channels.

The network device may first send the correspondence to the terminal device, so that the network device only needs to include a corresponding identifier in the first signaling subsequently, and the terminal device may determine a correspondence between a carrier and a logical channel based on the identifier carried in the first signaling and the correspondence.

According to a fourth aspect, a fourth communication method is provided. The method includes: determining an association relationship that is between a carrier and each of a remaining activated logical channel of a radio bearer and that is after a first logical channel is activated or deactivated, where the radio bearer is a radio bearer to which the first logical channel belongs, and a PDCP duplication transmission function is configured for the radio bearer; and sending first signaling to a terminal device, where the first signaling indicates to activate or deactivate the first logical channel, and the first signaling is further used to indicate the association relationship that is between a carrier and each of a remaining activated logical channel of the radio bearer and that is after the first logical channel is activated or deactivated.

The method may be performed by a fourth communication apparatus. The fourth communication apparatus may be a communication device or a communication apparatus, for example, a chip system, that can support the communication device in implementing a function required for the method. For example, the communication device is a network device.

With reference to the fourth aspect, in a possible implementation of the fourth aspect, the first signaling further carries an identifier, and the identifier is used to indicate the association relationship that is between a carrier and each of a remaining activated logical channel of the radio bearer and that is after the first logical channel is activated or deactivated.

With reference to the fourth aspect, in a possible implementation of the fourth aspect, the identifier is used to indicate the association relationship between a carrier and each logical channel of the radio bearer; or the identifier is used to indicate an association relationship between a carrier and one activated logical channel of the radio bearer.

With reference to the fourth aspect, in a possible implementation of the fourth aspect, the method further includes:

sending a correspondence between an identifier and a first association relationship to the terminal device, where the first association relationship includes an association relationship between a carrier and a logical channel of the radio bearer, and one identifier is used to indicate an association relationship between a carrier and one logical channel, or one identifier is used to indicate an association relationship between carriers and all logical channels.

For technical effects brought by any one of the fourth aspect or the implementations of the fourth aspect, refer to the descriptions of the technical effects of the third aspect or the implementations of the third aspect. Details are not described again.

According to a fifth aspect, a fifth communication method is provided. The method includes: obtaining first information; and determining, based on the first information, whether an association relationship between a carrier and a remaining activated logical channel of a radio bearer still applies when a logical channel of the radio bearer is activated or deactivated, where a PDCP duplication transmission function is configured for the radio bearer.

In this embodiment of this application, whether an association relationship between a carrier and a logical channel still applies may be explicitly indicated by using the first information, to reduce a possibility that an error occurs in a PDCP duplication transmission process, and an indication manner is relatively definite.

The method may be performed by a fifth communication apparatus. The fifth communication apparatus may be a communication device or a communication apparatus, for example, a chip system, that can support the communication device in implementing a function required for the method. For example, the communication device is a terminal device.

With reference to the fifth aspect, in a possible implementation of the fifth aspect, the first information is used to indicate: when a logical channel of a first MAC entity corresponding to the radio bearer is activated or deactivated and a quantity of remaining activated logical channels of the first MAC entity is 1, whether an association relationship between a carrier and the remaining activated logical channel still applies; and/or the first information is used to indicate: when a logical channel of a first MAC entity corresponding to the radio bearer is activated or deactivated and a quantity of remaining activated logical channels of the first MAC entity is greater than 1, whether an association relationship between a carrier and each of the remaining activated logical channels still applies.

For example, if a logical channel of the first MAC entity of the radio bearer is activated or deactivated, and the quantity of remaining activated logical channels of the first MAC entity is 1, the association relationship between a carrier and the remaining activated logical channel of the first MAC entity may not apply. In this manner, an association relationship may be re-established between a logical channel and a carrier that had an association relationship with another logical channel that has been deactivated, so that these carriers are used, thereby helping improve a system capacity. Alternatively, for example, if a logical channel of the first MAC entity of the radio bearer is activated or deactivated, and the quantity of remaining activated logical channels of the first MAC entity is greater than 1, and if an association relationship between a carrier and a remaining logical channel that is of the first MAC entity and that is in an activated state is set not to apply, a same carrier may be selected for different logical channels in the activated state. Consequently, PDCP duplication transmission cannot be implemented. Therefore, in this case, the association relationship between a carrier and a remaining logical channel that is of the first MAC entity and that is in an activated state may be set to still apply, to ensure as much as possible that the PDCP duplication transmission function can be implemented.

According to a sixth aspect, a sixth communication method is provided. The method includes: determining first information, where the first information is used to indicate whether an association relationship between a carrier and a remaining activated logical channel of a radio bearer still applies when a logical channel of the radio bearer is activated or deactivated, where a PDCP duplication transmission function is configured for the radio bearer; and sending the first information to a terminal device.

The method may be performed by a sixth communication apparatus. The sixth communication apparatus may be a communication device or a communication apparatus, for example, a chip system, that can support the communication device in implementing a function required for the method. For example, the communication device is a network device.

With reference to the sixth aspect, in a possible implementation of the sixth aspect, that the first information is used to indicate whether an association relationship between a carrier and a remaining activated logical channel of a radio bearer still applies when a logical channel of the radio bearer is activated or deactivated includes:

the first information is used to indicate: when a logical channel of a first MAC entity corresponding to the radio bearer is activated or deactivated and a quantity of remaining activated logical channels of the first MAC entity is 1, whether an association relationship between a carrier and the remaining activated logical channel still applies; and/or the first information is used to indicate: when a logical channel of a first MAC entity corresponding to the radio bearer is activated or deactivated and a quantity of remaining activated logical channels of the first MAC entity is greater than 1, whether an association relationship between a carrier and each of the remaining activated logical channels still applies.

For technical effects brought by the sixth aspect or the implementations of the sixth aspect, refer to the descriptions of the technical effects of the fifth aspect or the implementations of the fifth aspect. Details are not described again.

According to a seventh aspect, a first type of communication apparatus is provided. For example, the communication apparatus is the foregoing first communication apparatus. The communication apparatus is configured to perform the method according to any one of the first aspect or the possible implementations of the first aspect. Specifically, the communication apparatus may include modules configured to perform the method according to any one of the first aspect or the possible implementations of the first aspect. For example, the communication apparatus includes a processing module and a transceiver module. For example, the communication apparatus is a terminal device.

The transceiver module is configured to receive first signaling, where the first signaling indicates to deactivate a first logical channel.

The processing module is configured to determine, depending on whether a logical channel in an activated state and the first logical channel belong to a same MAC entity, whether an association relationship between a carrier and the logical channel in the activated state applies, where the first logical channel and the logical channel in the activated state belong to a same radio bearer, and a PDCP duplication transmission function is configured for the radio bearer.

With reference to the seventh aspect, in a possible implementation of the seventh aspect, the processing module is configured to determine, in the following manner and depending on whether the logical channel in the activated state and the first logical channel belong to the same MAC entity, whether the association relationship between a carrier and the logical channel in the activated state applies:

when a second logical channel in the activated state and the first logical channel belong to a same MAC entity, determining that an association relationship between a carrier and the second logical channel does not apply.

With reference to the seventh aspect, in a possible implementation of the seventh aspect, the processing module is further configured to determine that a data packet carried on the second logical channel is capable of being transmitted on a first type of carrier, where the first type of carrier includes all carriers corresponding to the MAC entity, or the first type of carrier includes a carrier that had an association relationship with the first logical channel before the first logical channel is deactivated and a carrier that has an association relationship with the second logical channel.

With reference to the seventh aspect, in a possible implementation of the seventh aspect, the processing module is configured to determine, in the following manner and depending on whether the logical channel in the activated state and the first logical channel belong to the same MAC entity, whether the association relationship between a carrier and the logical channel in the activated state applies:

when the logical channel in the activated state and the first logical channel belong to the same MAC entity, and a quantity of logical channels in the activated state is 1, determining that the association relationship between a carrier and the logical channel in the activated state does not apply;

when the logical channel in the activated state and the first logical channel belong to the same MAC entity, and a quantity of logical channels in the activated state is greater than 1, determining that the association relationship between a carrier and the logical channel in the activated state still applies; or when the logical channel in the activated state and the first logical channel belong to the same MAC entity, and a quantity of logical channels in the activated state is greater than 1, determining, based on first information, a carrier used to transmit a data packet carried on the logical channel in the activated state, where the first information is obtained from the first signaling, or the first information is preset information.

With reference to the seventh aspect, in a possible implementation of the seventh aspect, the processing module is configured to determine, in the following manner and depending on whether the logical channel in the activated state and the first logical channel belong to the same MAC entity, whether the association relationship between a carrier and the logical channel in the activated state applies:

when the logical channel in the activated state and the first logical channel belong to different MAC entities, determining that the association relationship between a carrier and the logical channel in the activated state still applies.

For technical effects brought by the seventh aspect or the implementations of the seventh aspect, refer to the descriptions of the technical effects of the first aspect or the implementations of the first aspect. Details are not described again.

According to an eighth aspect, a second type of communication apparatus is provided. For example, the communication apparatus is the foregoing second communication apparatus. The communication apparatus is configured to perform the method according to any one of the second aspect or the possible implementations of the second aspect. Specifically, the communication apparatus may include modules configured to perform the method according to any one of the second aspect or the possible implementations of the second aspect. For example, the communication apparatus includes a processing module and a transceiver module. For example, the communication apparatus is a network device.

The processing module is configured to determine to deactivate a first logical channel.

The transceiver module is configured to send first signaling to a terminal device, where the first signaling indicates to deactivate the first logical channel, to indicate the terminal device to determine, depending on whether a logical channel in an activated state and the first logical channel belong to a same MAC entity, whether an association relationship between a carrier and the logical channel in the activated state applies.

With reference to the eighth aspect, in a possible implementation of the eighth aspect, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when a second logical channel in the activated state and the first logical channel belong to a same MAC entity, that an association relationship between a carrier and the second logical channel does not apply.

With reference to the eighth aspect, in a possible implementation of the eighth aspect, the first signaling further indicates the terminal device to determine that a data packet carried on the second logical channel is capable of being transmitted on a first type of carrier, where the first type of carrier includes all carriers corresponding to the MAC entity, or the first type of carrier includes a carrier that had an association relationship with the first logical channel before the first logical channel is deactivated and a carrier that has an association relationship with the second logical channel.

With reference to the eighth aspect, in a possible implementation of the eighth aspect, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when the logical channel in the activated state and the first logical channel belong to the same MAC entity, and a quantity of logical channels in the activated state is 1, that the association relationship between a carrier and the logical channel in the activated state does not apply;

the first signaling indicates the terminal device to determine, when the logical channel in the activated state and the first logical channel belong to the same MAC entity, and a quantity of logical channels in the activated state is greater than 1, that the association relationship between a carrier and the logical channel in the activated state still applies; or the first signaling indicates the terminal device to determine, based on first information when the logical channel in the activated state and the first logical channel belong to the same MAC entity, and a quantity of logical channels in the activated state is greater than 1, a carrier used to transmit a data packet carried on the logical channel in the activated state, where the first information is obtained from the first signaling, or the first information is preset information.

With reference to the eighth aspect, in a possible implementation of the eighth aspect, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when the logical channel in the activated state and the first logical channel belong to different MAC entities, that the association relationship between a carrier and the logical channel in the activated state still applies.

For technical effects brought by the eighth aspect or the implementations of the eighth aspect, refer to the descriptions of the technical effects of the second aspect or the implementations of the second aspect. Details are not described again.

According to a ninth aspect, a third type of communication apparatus is provided. For example, the communication apparatus is the foregoing third communication apparatus. The communication apparatus is configured to perform the method according to any one of the third aspect or the possible implementations of the third aspect. Specifically, the communication apparatus may include modules configured to perform the method according to any one of the third aspect or the possible implementations of the third aspect. For example, the communication apparatus includes a processing module and a transceiver module. For example, the communication apparatus is a terminal device.

The transceiver module is configured to receive first signaling, where the first signaling indicates to activate or deactivate a first logical channel.

The processing module is configured to determine an association relationship between a carrier and a remaining activated logical channel of a radio bearer based on the first signaling, where the radio bearer is a radio bearer to which the first logical channel belongs, and a PDCP duplication transmission function is configured for the radio bearer.

With reference to the ninth aspect, in a possible implementation of the ninth aspect, the first signaling further carries an identifier, and the processing module is configured to determine the association relationship between a carrier and a remaining activated logical channel of the radio bearer based on the first signaling in the following manner:

determining the association relationship between a carrier and a remaining activated logical channel of the radio bearer based on the identifier.

With reference to the ninth aspect, in a possible implementation of the ninth aspect, a quantity of identifiers carried in the first signaling is 1, and the identifier is used to indicate an association relationship between a carrier and each logical channel of the radio bearer; or a quantity of identifiers carried in the first signaling is less than or equal to a quantity of remaining activated logical channels of the radio bearer, and one of the identifiers is used to indicate an association relationship between a carrier and one activated logical channel.

With reference to the ninth aspect, in a possible implementation of the ninth aspect, the transceiver module is further configured to receive a correspondence between an identifier and a first association relationship, where the first association relationship includes the association relationship between a carrier and each logical channel of the radio bearer, and one identifier is used to indicate an association relationship between a carrier and one logical channel, or one identifier is used to indicate an association relationship between carriers and all logical channels.

For technical effects brought by the ninth aspect or the implementations of the ninth aspect, refer to the descriptions of the technical effects of the third aspect or the implementations of the third aspect. Details are not described again.

According to a tenth aspect, a fourth type of communication apparatus is provided. For example, the communication apparatus is the foregoing fourth communication apparatus. The communication apparatus is configured to perform the method according to any one of the fourth aspect or the possible implementations of the fourth aspect. Specifically, the communication apparatus may include modules configured to perform the method according to any one of the fourth aspect or the possible implementations of the fourth aspect. For example, the communication apparatus includes a processing module and a transceiver module. For example, the communication apparatus is a network device.

The processing module is configured to determine an association relationship that is between a carrier and each of a remaining activated logical channel of a radio bearer and that is after a first logical channel is activated or deactivated, where the radio bearer is a radio bearer to which the first logical channel belongs, and a PDCP duplication transmission function is configured for the radio bearer.

The transceiver module is configured to send first signaling to a terminal device, where the first signaling indicates to activate or deactivate the first logical channel, and the first signaling is further used to indicate the association relationship that is between a carrier and each of a remaining activated logical channel of the radio bearer and that is after the first logical channel is activated or deactivated.

With reference to the tenth aspect, in a possible implementation of the tenth aspect, the first signaling further carries an identifier, and the identifier is used to indicate the association relationship that is between a carrier and each of a remaining activated logical channel of the radio bearer and that is after the first logical channel is activated or deactivated.

With reference to the tenth aspect, in a possible implementation of the tenth aspect, the identifier is used to indicate the association relationship between a carrier and each logical channel of the radio bearer; or the identifier is used to indicate an association relationship between a carrier and one activated logical channel of the radio bearer.

With reference to the tenth aspect, in a possible implementation of the tenth aspect, the transceiver module is further configured to send a correspondence between an identifier and a first association relationship to the terminal device, where the first association relationship includes an association relationship between a carrier and a logical channel of the radio bearer, and one identifier is used to indicate an association relationship between a carrier and one logical channel, or one identifier is used to indicate an association relationship between carriers and all logical channels.

For technical effects brought by the tenth aspect or the implementations of the tenth aspect, refer to the descriptions of the technical effects of the fourth aspect or the implementations of the fourth aspect. Details are not described again.

According to an eleventh aspect, a fifth type of communication apparatus is provided. For example, the communication apparatus is the foregoing fifth communication apparatus. The communication apparatus is configured to perform the method according to any one of the fifth aspect or the possible implementations of the fifth aspect. Specifically, the communication apparatus may include modules configured to perform the method according to any one of the fifth aspect or the possible implementations of the fifth aspect. For example, the communication apparatus includes a processing module and a transceiver module. For example, the communication apparatus is a terminal device.

The transceiver module is configured to obtain first information.

The processing module is configured to determine, based on the first information, whether an association relationship between a carrier and a remaining activated logical channel of a radio bearer still applies when a logical channel of the radio bearer is activated or deactivated, where a PDCP duplication transmission function is configured for the radio bearer.

With reference to the eleventh aspect, in a possible implementation of the eleventh aspect, the first information indicates: when a logical channel of a first MAC entity corresponding to the radio bearer is activated or deactivated and a quantity of remaining activated logical channels of the first MAC entity is 1, whether an association relationship between a carrier and the remaining activated logical channel still applies; and/or the first information indicates: when a logical channel of a first MAC entity corresponding to the radio bearer is activated or deactivated and a quantity of remaining activated logical channels of the first MAC entity is greater than 1, whether an association relationship between a carrier and each of the remaining activated logical channels still applies.

For technical effects brought by the eleventh aspect or the implementations of the eleventh aspect, refer to the descriptions of the technical effects of the fifth aspect or the implementations of the fifth aspect. Details are not described again.

According to a twelfth aspect, a sixth type of communication apparatus is provided. For example, the communication apparatus is the foregoing sixth communication apparatus. The communication apparatus is configured to perform the method according to any one of the sixth aspect or the possible implementations of the sixth aspect. Specifically, the communication apparatus may include modules configured to perform the method according to any one of the sixth aspect or the possible implementations of the sixth aspect. For example, the communication apparatus includes a processing module and a transceiver module. For example, the communication apparatus is a network device.

The processing module is configured to determine first information, where the first information is used to indicate whether an association relationship between a carrier and a remaining activated logical channel of a radio bearer still applies when a logical channel of the radio bearer is activated or deactivated, where a PDCP duplication transmission function is configured for the radio bearer.

The transceiver module is configured to send the first information to a terminal device.

With reference to the twelfth aspect, in a possible implementation of the twelfth aspect, that the first information is used to indicate whether an association relationship between a carrier and a remaining activated logical channel of a radio bearer still applies when a logical channel of the radio bearer is activated or deactivated includes:

the first information is used to indicate: when a logical channel of a first MAC entity corresponding to the radio bearer is activated or deactivated and a quantity of remaining activated logical channels of the first MAC entity is 1, whether an association relationship between a carrier and each of the remaining activated logical channel still applies; and/or the first information is used to indicate: when a logical channel of a first MAC entity corresponding to the radio bearer is activated or deactivated and a quantity of remaining activated logical channels of the first MAC entity is greater than 1, whether an association relationship between a carrier and each of the remaining activated logical channels still applies.

For technical effects brought by the twelfth aspect or the implementations of the twelfth aspect, refer to the descriptions of the technical effects of the sixth aspect or the implementations of the sixth aspect. Details are not described again.

According to a thirteenth aspect, a seventh type of communication apparatus is provided. For example, the communication apparatus is the foregoing first communication apparatus. The communication apparatus includes a processor and a memory, and optionally, further includes a transceiver. The processor, the memory, and the transceiver are configured to implement the method according to the first aspect or the possible designs of the first aspect. For example, the communication apparatus is a chip disposed in a communication device. For example, the communication device is a terminal device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component.

The transceiver is configured to receive first signaling, where the first signaling is used to indicate to deactivate a first logical channel.

The processor is configured to determine, depending on whether a logical channel in an activated state and the first logical channel belong to a same MAC entity, whether an association relationship between a carrier and the logical channel in the activated state applies, where the first logical channel and the logical channel in the activated state belong to a same radio bearer, and a PDCP duplication transmission function is configured for the radio bearer.

With reference to the thirteenth aspect, in a possible implementation of the thirteenth aspect, the processor is configured to determine, in the following manner and depending on whether the logical channel in the activated state and the first logical channel belong to the same MAC entity, whether the association relationship between a carrier and the logical channel in the activated state applies:

when a second logical channel in the activated state and the first logical channel belong to a same MAC entity, determining that an association relationship between a carrier and the second logical channel does not apply.

With reference to the thirteenth aspect, in a possible implementation of the thirteenth aspect, the processor is further configured to determine that a data packet carried on the second logical channel is capable of being transmitted on a first type of carrier, where the first type of carrier includes all carriers corresponding to the MAC entity, or the first type of carrier includes a carrier that had an association relationship with the first logical channel before the first logical channel is deactivated and a carrier that has an association relationship with the second logical channel.

With reference to the thirteenth aspect, in a possible implementation of the thirteenth aspect, the processor is configured to determine, in the following manner and depending on whether the logical channel in the activated state and the first logical channel belong to the same MAC entity, whether the association relationship between a carrier and the logical channel in the activated state applies:

when the logical channel in the activated state and the first logical channel belong to the same MAC entity, and a quantity of logical channels in the activated state is 1, determining that the association relationship between a carrier and the logical channel in the activated state does not apply;

when the logical channel in the activated state and the first logical channel belong to the same MAC entity, and a quantity of logical channels in the activated state is greater than 1, determining that the association relationship between a carrier and the logical channel in the activated state still applies; or when the logical channel in the activated state and the first logical channel belong to the same MAC entity, and a quantity of logical channels in the activated state is greater than 1, determining, based on first information, a carrier used to transmit a data packet carried on the logical channel in the activated state, where the first information is obtained from the first signaling, or the first information is preset information.

With reference to the thirteenth aspect, in a possible implementation of the thirteenth aspect, the processor is configured to determine, in the following manner and depending on whether the logical channel in the activated state and the first logical channel belong to the same MAC entity, whether the association relationship between a carrier and the logical channel in the activated state applies:

when the logical channel in the activated state and the first logical channel belong to different MAC entities, determining that the association relationship between a carrier and the logical channel in the activated state still applies.

For technical effects brought by the thirteenth aspect or the implementations of the thirteenth aspect, refer to the descriptions of the technical effects of the first aspect or the implementations of the first aspect. Details are not described again.

According to a fourteenth aspect, an eighth type of communication apparatus is provided. For example, the communication apparatus is the foregoing second communication apparatus. The communication apparatus includes a processor and a transceiver, and is configured to implement the method according to the second aspect or the possible designs of the second aspect. For example, the communication apparatus is a chip disposed in a communication device. For example, the communication device is a network device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component.

The processor is configured to determine to deactivate a first logical channel.

The transceiver is configured to send first signaling to a terminal device, where the first signaling indicates to deactivate the first logical channel, to indicate the terminal device to determine, depending on whether a logical channel in an activated state and the first logical channel belong to a same MAC entity, whether an association relationship between a carrier and the logical channel in the activated state applies.

With reference to the fourteenth aspect, in a possible implementation of the fourteenth aspect, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when a second logical channel in the activated state and the first logical channel belong to a same MAC entity, that an association relationship between a carrier and the second logical channel does not apply.

With reference to the fourteenth aspect, in a possible implementation of the fourteenth aspect, the first signaling further indicates the terminal device to determine that a data packet carried on the second logical channel is capable of being transmitted on a first type of carrier, where the first type of carrier includes all carriers corresponding to the MAC entity, or the first type of carrier includes a carrier that had an association relationship with the first logical channel before the first logical channel is deactivated and a carrier that has an association relationship with the second logical channel.

With reference to the fourteenth aspect, in a possible implementation of the fourteenth aspect, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when the logical channel in the activated state and the first logical channel belong to the same MAC entity, and a quantity of logical channels in the activated state is 1, that the association relationship between a carrier and the logical channel in the activated state does not apply;

the first signaling indicates the terminal device to determine, when the logical channel in the activated state and the first logical channel belong to the same MAC entity, and a quantity of logical channels in the activated state is greater than 1, that the association relationship between a carrier and the logical channel in the activated state still applies; or the first signaling indicates the terminal device to determine, based on first information when the logical channel in the activated state and the first logical channel belong to the same MAC entity, and a quantity of logical channels in the activated state is greater than 1, a carrier used to transmit a data packet carried on the logical channel in the activated state, where the first information is obtained from the first signaling, or the first information is preset information.

With reference to the fourteenth aspect, in a possible implementation of the fourteenth aspect, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when the logical channel in the activated state and the first logical channel belong to different MAC entities, that the association relationship between a carrier and the logical channel in the activated state still applies.

For technical effects brought by the fourteenth aspect or the implementations of the fourteenth aspect, refer to the descriptions of the technical effects of the second aspect or the implementations of the second aspect. Details are not described again.

According to a fifteenth aspect, a ninth type of communication apparatus is provided. For example, the communication apparatus is the foregoing third communication apparatus. The communication apparatus includes a processor and a transceiver, and is configured to implement the method according to the third aspect or the possible designs of the third aspect. For example, the communication apparatus is a chip disposed in a communication device. For example, the communication device is a terminal device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component.

The transceiver is configured to receive first signaling, where the first signaling indicates to activate or deactivate a first logical channel.

The processor is configured to determine an association relationship between a carrier and a remaining activated logical channel of a radio bearer based on the first signaling, where the radio bearer is a radio bearer to which the first logical channel belongs, and a PDCP duplication transmission function is configured for the radio bearer.

With reference to the fifteenth aspect, in a possible implementation of the fifteenth aspect, the first signaling further carries an identifier, and the processing module is configured to determine the association relationship between a carrier and a remaining activated logical channel of the radio bearer based on the first signaling in the following manner:

determining the association relationship between a carrier and a remaining activated logical channel of the radio bearer based on the identifier.

With reference to the fifteenth aspect, in a possible implementation of the fifteenth aspect, a quantity of identifiers carried in the first signaling is 1, and the identifier is used to indicate an association relationship between a carrier and each logical channel of the radio bearer; or a quantity of identifiers carried in the first signaling is less than or equal to a quantity of remaining activated logical channels of the radio bearer, and one of the identifiers is used to indicate an association relationship between a carrier and one activated logical channel.

With reference to the fifteenth aspect, in a possible implementation of the fifteenth aspect, the transceiver is further configured to receive a correspondence between an identifier and a first association relationship, where the first association relationship includes the association relationship between a carrier and each logical channel of the radio bearer, and one identifier is used to indicate an association relationship between a carrier and one logical channel, or one identifier is used to indicate an association relationship between carriers and all logical channels.

For technical effects brought by the fifteenth aspect or the implementations of the fifteenth aspect, refer to the descriptions of the technical effects of the third aspect or the implementations of the third aspect. Details are not described again.

According to a sixteenth aspect, a tenth type of communication apparatus is provided. For example, the communication apparatus is the foregoing fourth communication apparatus. The communication apparatus includes a processor and a transceiver, and is configured to implement the method according to the fourth aspect or the possible designs of the fourth aspect. For example, the communication apparatus is a chip disposed in a communication device. For example, the communication device is a network device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component.

The processor is configured to determine an association relationship that is between a carrier and each of a remaining activated logical channel of a radio bearer and that is after a first logical channel is activated or deactivated, where the radio bearer is a radio bearer to which the first logical channel belongs, and a PDCP duplication transmission function is configured for the radio bearer.

The transceiver is configured to send first signaling to a terminal device, where the first signaling indicates to activate or deactivate the first logical channel, and the first signaling is further used to indicate the association relationship that is between a carrier and each of a remaining activated logical channel of the radio bearer and that is after the first logical channel is activated or deactivated.

With reference to the sixteenth aspect, in a possible implementation of the sixteenth aspect, the first signaling further carries an identifier, and the identifier is used to indicate the association relationship that is between a carrier and each of a remaining activated logical channel of the radio bearer and that is after the first logical channel is activated or deactivated.

With reference to the sixteenth aspect, in a possible implementation of the sixteenth aspect, the identifier is used to indicate the association relationship between a carrier and each logical channel of the radio bearer; or the identifier is used to indicate an association relationship between a carrier and one activated logical channel of the radio bearer.

With reference to the sixteenth aspect, in a possible implementation of the sixteenth aspect, the transceiver is further configured to send a correspondence between an identifier and a first association relationship to the terminal device, where the first association relationship includes an association relationship between a carrier and a logical channel of the radio bearer, and one identifier is used to indicate an association relationship between a carrier and one logical channel, or one identifier is used to indicate an association relationship between carriers and all logical channels.

For technical effects brought by the sixteenth aspect or the implementations of the sixteenth aspect, refer to the descriptions of the technical effects of the fourth aspect or the implementations of the fourth aspect. Details are not described again.

According to a seventeenth aspect, an eleventh type of communication apparatus is provided. For example, the communication apparatus is the foregoing fifth communication apparatus. The communication apparatus includes a processor and a transceiver, and is configured to implement the method according to the fifth aspect or the possible designs of the fifth aspect. For example, the communication apparatus is a chip disposed in a communication device. For example, the communication device is a terminal device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component.

The processor is configured to obtain first information.

The transceiver is configured to determine, based on the first information, whether an association relationship between a carrier and a remaining activated logical channel of a radio bearer still applies when a logical channel of the radio bearer is activated or deactivated, where a PDCP duplication transmission function is configured for the radio bearer.

With reference to the seventeenth aspect, in a possible implementation of the seventeenth aspect, the first information indicates: when a logical channel of a first MAC entity corresponding to the radio bearer is activated or deactivated and a quantity of remaining activated logical channels of the first MAC entity is 1, whether an association relationship between a carrier and the remaining activated logical channel still applies; and/or the first information indicates: when a logical channel of a first MAC entity corresponding to the radio bearer is activated or deactivated and a quantity of remaining activated logical channels of the first MAC entity is greater than 1, whether an association relationship between a carrier and each of the remaining activated logical channels still applies.

For technical effects brought by the seventeenth aspect or the implementations of the seventeenth aspect, refer to the descriptions of the technical effects of the fifth aspect or the implementations of the fifth aspect. Details are not described again.

According to an eighteenth aspect, a twelfth type of communication apparatus is provided. For example, the communication apparatus is the foregoing sixth communication apparatus. The communication apparatus includes a processor and a transceiver, and is configured to implement the method according to the sixth aspect or the possible designs of the sixth aspect. For example, the communication apparatus is a chip disposed in a communication device. For example, the communication device is a network device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component.

The processor is configured to determine first information, where the first information indicates whether an association relationship between a carrier and a remaining activated logical channel of a radio bearer still applies when a logical channel of the radio bearer is activated or deactivated, where a PDCP duplication transmission function is configured for the radio bearer.

The transceiver is configured to send the first information to a terminal device.

With reference to the eighteenth aspect, in a possible implementation of the eighteenth aspect, that the first information indicates whether an association relationship between a carrier and a remaining activated logical channel of a radio bearer still applies when a logical channel of the radio bearer is activated or deactivated includes:

the first information indicates: when a logical channel of a first MAC entity corresponding to the radio bearer is activated or deactivated and a quantity of remaining activated logical channels of the first MAC entity is 1, whether an association relationship between a carrier and each of the remaining activated logical channel still applies; and/or the first information indicates: when a logical channel of a first MAC entity corresponding to the radio bearer is activated or deactivated and a quantity of remaining activated logical channels of the first MAC entity is greater than 1, whether an association relationship between a carrier and each of the remaining activated logical channels still applies.

For technical effects brought by the eighteenth aspect or the implementations of the eighteenth aspect, refer to the descriptions of the technical effects of the sixth aspect or the implementations of the sixth aspect. Details are not described again.

According to a nineteenth aspect, a thirteenth type of communication apparatus is provided. The communication apparatus may be the first communication apparatus in the foregoing method designs. For example, the communication apparatus is a chip disposed in a terminal device. The communication apparatus includes: a memory, configured to store computer-executable program code; and a processor, where the processor is coupled to the memory. The program code stored in the memory includes instructions. When the processor executes the instructions, the thirteenth type of communication apparatus is enabled to perform the method according to any one of the first aspect or the possible implementations of the first aspect.

The thirteenth type of communication apparatus may further include a communication interface. The communication interface may be a transceiver in the terminal device, and is implemented by using, for example, an antenna, a feeder, and a codec in the communication apparatus. Alternatively, if the thirteenth type of communication apparatus is the chip disposed in the terminal device, the communication interface may be an input/output interface of the chip, for example, may be an input/output pin.

According to a twentieth aspect, a fourteenth type of communication apparatus is provided. The communication apparatus may be the second communication apparatus in the foregoing method designs. For example, the communication apparatus is a chip disposed in a network device. The communication apparatus includes: a memory, configured to store computer-executable program code; and a processor, where the processor is coupled to the memory. The program code stored in the memory includes instructions. When the processor executes the instructions, the fourteenth type of communication apparatus is enabled to perform the method according to any one of the second aspect or the possible implementations of the second aspect.

The fourteenth type of communication apparatus may further include a communication interface. The communication interface may be a transceiver in the network device, and is implemented by using, for example, an antenna, a feeder, and a codec in the communication apparatus. Alternatively, if the fourteenth type of communication apparatus is the chip disposed in the network device, the communication interface may be an input/output interface of the chip, for example, may be an input/output pin.

According to a twenty-first aspect, a fifteenth type of communication apparatus is provided. The communication apparatus may be the third communication apparatus in the foregoing method designs. For example, the communication apparatus is a chip disposed in a terminal device. The communication apparatus includes: a memory, configured to store computer-executable program code; and a processor, where the processor is coupled to the memory. The program code stored in the memory includes instructions. When the processor executes the instructions, the fifteenth type of communication apparatus is enabled to perform the method according to any one of the third aspect or the possible implementations of the third aspect.

The fifteenth type of communication apparatus may further include a communication interface. The communication interface may be a transceiver in the terminal device, and is implemented by using, for example, an antenna, a feeder, and a codec in the communication apparatus. Alternatively, if the fifteenth type of communication apparatus is the chip disposed in the terminal device, the communication interface may be an input/output interface of the chip, for example, may be an input/output pin.

According to a twenty-second aspect, a sixteenth type of communication apparatus is provided. The communication apparatus may be the fourth communication apparatus in the foregoing method designs. For example, the communication apparatus is a chip disposed in a network device. The communication apparatus includes: a memory, configured to store computer-executable program code; and a processor, where the processor is coupled to the memory. The program code stored in the memory includes instructions. When the processor executes the instructions, the sixteenth type of communication apparatus is enabled to perform the method according to any one of the fourth aspect or the possible implementations of the fourth aspect.

The sixteenth type of communication apparatus may further include a communication interface. The communication interface may be a transceiver in the network device, and is implemented by using, for example, an antenna, a feeder, and a codec in the communication apparatus. Alternatively, if the sixteenth type of communication apparatus is the chip disposed in the network device, the communication interface may be an input/output interface of the chip, for example, may be an input/output pin.

According to a twenty-third aspect, a seventeenth type of communication apparatus is provided. The communication apparatus may be the fifth communication apparatus in the foregoing method designs. For example, the communication apparatus is a chip disposed in a terminal device. The communication apparatus includes: a memory, configured to store computer-executable program code; and a processor, where the processor is coupled to the memory. The program code stored in the memory includes instructions. When the processor executes the instructions, the seventeenth type of communication apparatus is enabled to perform the method according to any one of the fifth aspect or the possible implementations of the fifth aspect.

The seventeenth type of communication apparatus may further include a communication interface. The communication interface may be a transceiver in the terminal device, and is implemented by using, for example, an antenna, a feeder, and a codec in the communication apparatus. Alternatively, if the seventeenth type of communication apparatus is the chip disposed in the terminal device, the communication interface may be an input/output interface of the chip, for example, may be an input/output pin.

According to a twenty-fourth aspect, an eighteenth type of communication apparatus is provided. The communication apparatus may be the sixth communication apparatus in the foregoing method designs. For example, the communication apparatus is a chip disposed in a network device. The communication apparatus includes: a memory, configured to store computer-executable program code; and a processor, where the processor is coupled to the memory. The program code stored in the memory includes instructions. When the processor executes the instructions, the eighteenth type of communication apparatus is enabled to perform the method according to any one of the sixth aspect or the possible implementations of the sixth aspect.

The eighteenth type of communication apparatus may further include a communication interface. The communication interface may be a transceiver in the network device, and is implemented by using, for example, an antenna, a feeder, and a codec in the communication apparatus. Alternatively, if the eighteenth type of communication apparatus is the chip disposed in the network device, the communication interface may be an input/output interface of the chip, for example, may be an input/output pin.

According to a twenty-fifth aspect, a first type of communication system is provided. The communication system may include the first type of communication apparatus in the seventh aspect, the seventh type of communication apparatus in the thirteenth aspect, or the thirteenth type of communication apparatus in the nineteenth aspect, and include the second type of communication apparatus in the eighth aspect, the eighth type of communication apparatus in the fourteenth aspect, or the fourteenth type of communication apparatus in the twentieth aspect.

According to a twenty-sixth aspect, a second type of communication system is provided. The communication system may include the third type of communication apparatus in the ninth aspect, the ninth type of communication apparatus in the fifteenth aspect, or the fifteenth type of communication apparatus in the twenty-first aspect, and include the fourth type of communication apparatus in the tenth aspect, the tenth type of communication apparatus in the sixteenth aspect, or the sixteenth type of communication apparatus in the twenty-second aspect.

According to a twenty-seventh aspect, a third type of communication system is provided. The communication system may include the fifth type of communication apparatus in the eleventh aspect, the eleventh type of communication apparatus in the seventeenth aspect, or the seventeenth type of communication apparatus in the twenty-third aspect, and include the sixth type of communication apparatus in the twelfth aspect, the twelfth type of communication apparatus in the eighteenth aspect, or the eighteenth type of communication apparatus in the twenty-fourth aspect.

The first type of communication system, the second type of communication system, and the third type of communication system may be a same communication system, or may be different communication systems; or any two of the communication systems are a same communication system, and the other one is a different communication system.

According to a twenty-eighth aspect, a computer storage medium is provided. The computer-readable storage medium stores instructions. When the instructions are run on a computer, the computer is enabled to perform the method according to any one of the first aspect or the possible designs of the first aspect.

According to a twenty-ninth aspect, a computer storage medium is provided. The computer-readable storage medium stores instructions. When the instructions are run on a computer, the computer is enabled to perform the method according to any one of the second aspect or the possible designs of the second aspect.

According to a thirtieth aspect, a computer storage medium is provided. The computer-readable storage medium stores instructions. When the instructions are run on a computer, the computer is enabled to perform the method according to any one of the third aspect or the possible designs of the third aspect.

According to a thirty-first aspect, a computer storage medium is provided. The computer-readable storage medium stores instructions. When the instructions are run on a computer, the computer is enabled to perform the method according to any one of the fourth aspect or the possible designs of the fourth aspect.

According to a thirty-second aspect, a computer storage medium is provided. The computer-readable storage medium stores instructions. When the instructions are run on a computer, the computer is enabled to perform the method according to any one of the fifth aspect or the possible designs of the fifth aspect.

According to a thirty-third aspect, a computer storage medium is provided. The computer-readable storage medium stores instructions. When the instructions are run on a computer, the computer is enabled to perform the method according to any one of the sixth aspect or the possible designs of the sixth aspect.

According to a thirty-fourth aspect, a computer program product including instructions is provided. The computer program product stores the instructions. When the instructions are run on a computer, the computer is enabled to perform the method according to any one of the first aspect or the possible designs of the first aspect.

According to a thirty-fifth aspect, a computer program product including instructions is provided. The computer program product stores the instructions. When the instructions are run on a computer, the computer is enabled to perform the method according to any one of the second aspect or the possible designs of the second aspect.

According to a thirty-sixth aspect, a computer program product including instructions is provided. The computer program product stores the instructions. When the instructions are run on a computer, the computer is enabled to perform the method according to any one of the third aspect or the possible designs of the third aspect.

According to a thirty-seventh aspect, a computer program product including instructions is provided. The computer program product stores the instructions. When the instructions are run on a computer, the computer is enabled to perform the method according to any one of the fourth aspect or the possible designs of the fourth aspect.

According to a thirty-eighth aspect, a computer program product including instructions is provided. The computer program product stores the instructions. When the instructions are run on a computer, the computer is enabled to perform the method according to any one of the fifth aspect or the possible designs of the fifth aspect.

According to a thirty-ninth aspect, a computer program product including instructions is provided. The computer program product stores the instructions. When the instructions are run on a computer, the computer is enabled to perform the method according to any one of the sixth aspect or the possible designs of the sixth aspect.

According to the methods provided in the embodiments of this application, after a logical channel is deactivated, carriers that should be used for a remaining logical channel can be known, so that the terminal device can perform a correct operation.

DESCRIPTION OF EMBODIMENTS

Figure 1:
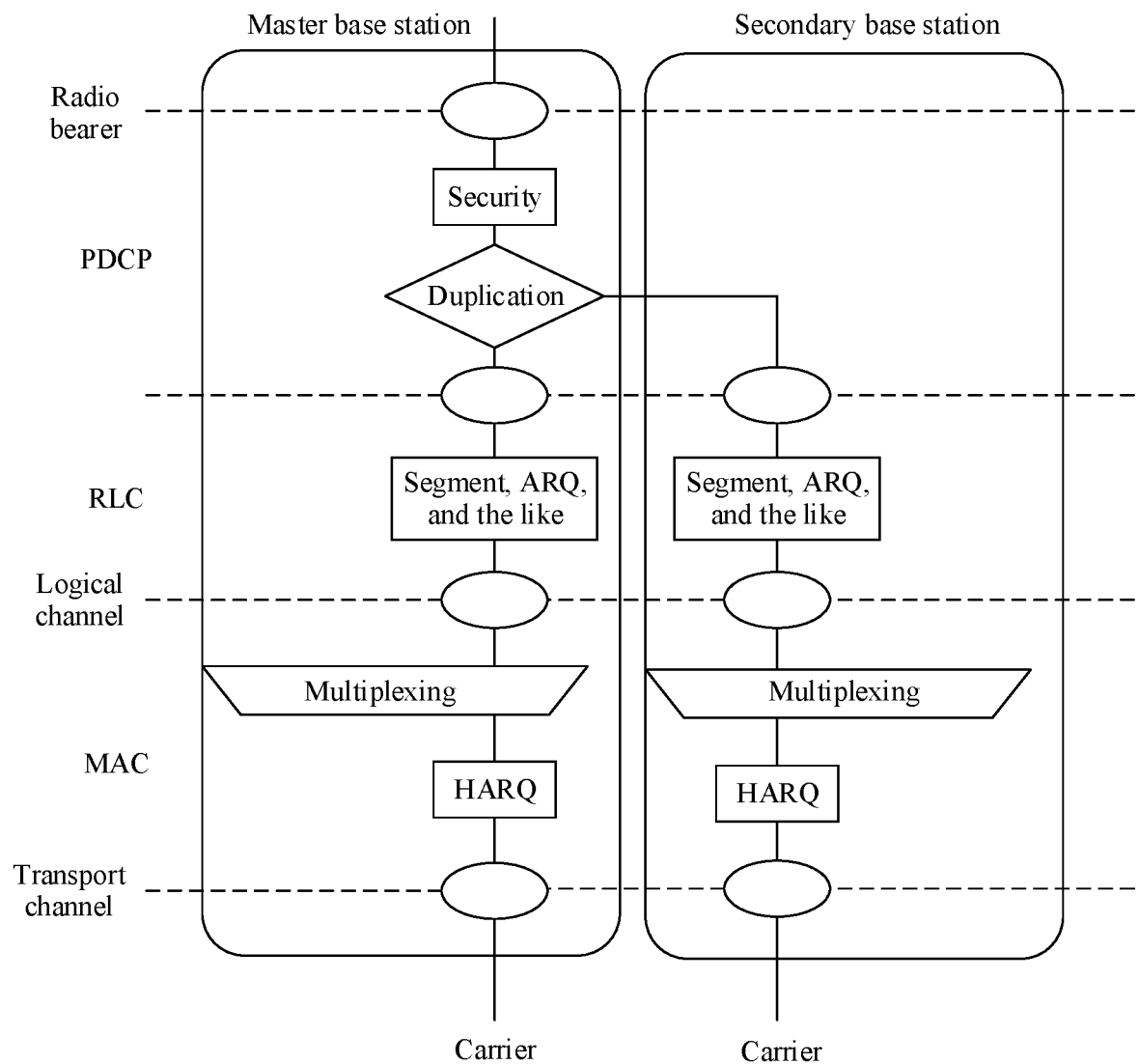
FIG. 1 is a schematic diagram of a network architecture related to implementation of a duplication process at a PDCP layer in a DC scenario.

To make the objectives, technical solutions, and advantages of embodiments of this application clearer, the following further describes the embodiments of this application in detail with reference to the accompanying drawings.

In the following descriptions, some terms in the embodiments of this application are described, to help a person skilled in the art have a better understanding.

(1) A terminal device includes a device that provides a user with voice and/or data connectivity, for example, may include a handheld device with a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit, a subscriber station, a mobile station, a remote station, an access point (AP), a remote terminal, an access terminal, a user terminal, a user agent, a user device, or the like. For example, the terminal device may include a mobile phone (sometimes referred to as a "cellular" phone), a computer with a mobile terminal device, a portable, pocket-sized, handheld, computer built-in, or in-vehicle mobile apparatus, or an intelligent wearable device. For example, the terminal device is a personal communications service (PCS) phone, a cordless phone, a session initiation protocol (SIP) phone, a wireless local loop (WLL) station, or a personal digital assistant (PDA). The terminal device further includes a limited device, for example, a device with relatively low power consumption, a device with a limited storage capability, or a device with a limited computing capability. For example, the terminal device includes an information sensing device such as a barcode, radio frequency identification (RFID) device, a sensor, a global positioning system (GPS), or a laser scanner.

By way of example rather than limitation, the terminal device in the embodiments of this application may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on the body or integrated into clothes or an accessory of a user. The wearable device is a hardware device, and also implements powerful functions through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

(2) A network device includes, for example, an access network (AN) device such as a base station (for example, an access point), and may be a device that communicates with a wireless terminal device over an air interface through one or more cells in an access network. Alternatively, for example, a network device in a V2X technology is a road side unit (RSU). The base station may be configured to mutually convert a received over-the-air frame and a received Internet protocol (IP) packet, and serve as a router between the terminal device and a remaining portion of the access network, where the remaining portion of the access network may include an IP network. An RSU may be a fixed infrastructure entity that supports a vehicle-to-everything (V2X) application, and may exchange a message with another entity that supports the V2X application. The access network device may further coordinate attribute management of the air interface. For example, the access network device may include an evolved NodeB (NodeB, eNB, or e-NodeB) in a long term evolution (LTE) system or a long term evolution-advanced (LTE-A) system, may include a next generation NodeB (gNB) in a 5G new radio (NR) system, or may include a centralized unit (CU) and a distributed unit (DU) in a cloud radio access network (Cloud RAN) system. This is not limited in the embodiments of this application.

Certainly, the network device may further include a core network device. However, the technical solutions provided in the embodiments of this application mainly relate to the access network device. Therefore, unless otherwise specified, "network device" described below is an access network device.

(3) Dual connectivity (DC): In an LTE system, a terminal device supports simultaneous access to two network devices. This access manner is referred to as DC. One of the two network devices is a master network device, and the other network device is a secondary network device. In a development and evolution process of a wireless communication system, an operator deploys both a 5G NR system and an LTE system, and a terminal device supports simultaneous access to an LTE network device and an NR network device. Because LTE is also referred to as evolved universal terrestrial radio access (evolved universal terrestrial radio access, E-UTRA), this access manner is referred to as evolved universal terrestrial radio access-new radio dual connectivity (E-UTRA-NR dual connectivity, EN-DC). In the EN-DC mode, an LTE network device is a master network device, and an NR network device is a secondary network device. Certainly, with evolution of a system, new radio-evolved universal terrestrial radio access dual connectivity (NR-E-UTRA dual connectivity, NE-DC) can also be supported in the future, that is, an NR network device is a master network device, and an LTE network device is a secondary network device. Because a terminal device in the EN-DC mode and a terminal device in the NE-DC mode are each connected to network devices of two different radio access technologies, these DC modes may also be collectively referred to as multi-radio access technology dual connectivity (multi-RAT dual connectivity, MR-DC).

(4) Carrier aggregation (CA): In a CA technology, a plurality of component carriers (CCs) may be aggregated to serve one terminal device, to realize larger transmission bandwidth and effectively improve uplink and downlink transmission rates.

(5) That a logical channel is associated with a carrier, in other words, that there is an association relationship between a logical channel and a carrier, which may also be referred to as that there is a binding relationship, a binding transmission relationship, a carrier binding transmission relationship, or a mapping relationship between a logical channel and a carrier, which may also be referred to as that a cell, is allowed by using allowed serving cells to be used for a logical channel, or the like, includes but is not limited to: if a configuration of a logical channel indicates that some carriers are allowed to be used, it indicates that data transmitted on the logical channel (which is alternatively described as data carried on the logical channel) may be transmitted on these carriers, or resources on these carriers may be allocated to the logical channel. This may be referred to as that the logical channel is associated with these carriers. Further, when an association relationship between a logical channel and a carrier is valid, data transmitted on a logical channel is not transmitted on a carrier that has no association relationship with the logical channel. A logical channel corresponding to a data packet duplicated at a PDCP layer may have an association relationship with a carrier. In some scenarios, if no associated carrier is configured for a logical channel, it indicates that data transmitted on the logical channel may be transmitted on any carrier.

For example, a parameter, for example, referred to as a parameter A, may be configured for a logical channel, and values of the parameter A indicate different carriers. This indicates that data transmitted on the logical channel can be transmitted only on a carrier specified by the parameter A. That is, the parameter A may indicate an association relationship between a logical channel and a carrier. For example, if the parameter A is configured for a logical channel 1, and the parameter A indicates carriers 1 and 2, it indicates that data carried on the logical channel can be transmitted only on the carriers 1 and 2. In this way, it may be referred to as that the logical channel 1 has an association relationship with the carriers 1 and 2.

(6) Packet data convergence protocol (PDCP) duplication transmission function means that a PDCP entity duplicates a data packet to obtain a plurality of copies of data packets, and separately delivers the plurality of data packets to different RLC entities, and then the plurality of data packets are transmitted from an RLC layer to a MAC layer through logical channels. An activated logical channel is a logical channel used when a PDCP duplication transmission function is activated, or a logical channel used when a PDCP duplication transmission function is deactivated, or a logical channel used when a PDCP duplication transmission function is activated and a logical channel used when the PDCP duplication transmission function is deactivated. A deactivated logical channel is a logical channel not used when a PDCP duplication transmission function is activated, or a logical channel not used when a PDCP duplication transmission function is deactivated, or a logical channel not used when a PDCP duplication transmission function is activated and a logical channel not used when the PDCP duplication transmission function is deactivated.

(7) That a logical channel belongs to a MAC entity or that a logical channel corresponds to a MAC entity means that the logical channel has a subordination relationship or an association relationship with the MAC entity. For example, if data is transmitted to a MAC entity 1 of a terminal device by using a logical channel 1 of the terminal device, it is referred to as that the logical channel 1 belongs to the MAC entity 1, or that the logical channel 1 corresponds to the MAC entity 1.

(8) The terms "system" and "network" may be interchangeably used in the embodiments of this application. "At least one" refers to one or more, and "a plurality of" refers to two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof means any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

In addition, unless otherwise stated, in the embodiments of this application, ordinal numbers such as "first" and "second" are used to distinguish between a plurality of objects, and are not intended to limit a sequence, a time sequence, a priority, or importance of the plurality of objects. For example, a first logical channel and a second logical channel are merely used to distinguish between different logical channels, but do not indicate that priorities, importance degrees, or the like of the two logical channels are different.

The foregoing describes some concepts in the embodiments of this application. The following describes technical features in the embodiments of this application.

A PDCP duplication transmission function usually refers to duplicating, at a PDCP layer, a data packet of a radio bearer to obtain a plurality of identical data packets (namely, duplicate packets), and then separately delivering the plurality of identical data packets to a plurality of different RLC entities, to transmit the data packets to a MAC layer by using different logical channels. The logical channel is a channel between an RLC layer and the MAC layer. It should be noted that retransmission that is commonly mentioned is retransmission, but duplication transmission in the embodiments of this application is not retransmission. Retransmission means resending a same data packet after the data packet fails to be sent, or sending a same data packet for a plurality of consecutive times. Duplicate transmission means duplicating one data packet to obtain a plurality of same data packets, and transmitting the plurality of data packets on a plurality of logical channels. One logical channel is used to transmit one of the plurality of data packets. "Duplicate" herein may also be understood as "replicate".

To ensure reliability of data transmission, an original packet and a packet obtained through duplication that are to be transmitted to the MAC layer cannot be transmitted by using a same MAC PDU. This is because only when the packets are transmitted by using different MAC PDUs, transmission of a PDU is not affected when another PDU is lost. That is, reliability is doubled.

The following separately describes how to implement a transmission function at a PDCP layer in a DC scenario and a CA scenario.

FIG. 1 shows an example of a network architecture related to implementation of a PDCP duplication transmission process in a DC scenario. For a base station, the DC scenario relates to a master base station and a secondary base station, and network architectures of the master base station and the secondary base station for one radio bearer are shown in FIG. 1. A network architecture of a terminal device for the radio bearer includes the network architecture of the master base station and the network architecture of the secondary base station that are shown in FIG. 1, that is, for the radio bearer, the terminal device includes one PDCP entity, two RLC entities, and two MAC entities. Security, duplication, segment, automatic repeat request (ARQ), multiplexing, hybrid automatic repeat request (HARQ), robust header compression (ROHC), and the like in FIG. 1 all represent functions of the PDCP entity, the RLC entity, or the MAC entity. The PDCP entity and a PDCP layer may be understood as a same concept. Similarly, the RLC entity and an RLC layer may be understood as a same concept, and the MAC entity and a MAC layer may be understood as a same concept. Circles in FIG. 1 represent interfaces and/or channels between different layers. The interface is referred to as an inter-layer interface, for example, a service access point (SAP), and the channel is, for example, a logical channel. A case in the following is also similar, and details are not described again. It should be noted that FIG. 1 shows only an example of the architecture, and the components in the figure are not indispensable components in the embodiments of this application. For example, a security module may be omitted as required.

In the DC scenario, one terminal device is connected to two base stations, namely, a master base station and a secondary base station. If a PDCP duplication transmission function is configured for a radio bearer, two data packets duplicated at a PDCP layer are to be transmitted to two different RLC entities, and transmitted to different MAC entities through different logical channels, and finally, two MAC PDUs are formed and transmitted on different carriers. This process is the same for the base station and the terminal device. A difference lies in: For the base station, the PDCP layer in the master base station transmits the two duplicated data packets to two different RLC entities, and the two RLC entities are respectively located in the master base station and the secondary base station. Then, the RLC entity in the master base station transmits the received data packet to the MAC entity in the master base station, and the RLC entity in the secondary base station transmits the received data packet to the MAC entity in the secondary base station. The two MAC entities transmit the data packets on respective carriers. For the terminal device, two RLC entities and two MAC entities are all located in the terminal device. Other processes are the same.

Figure 2:
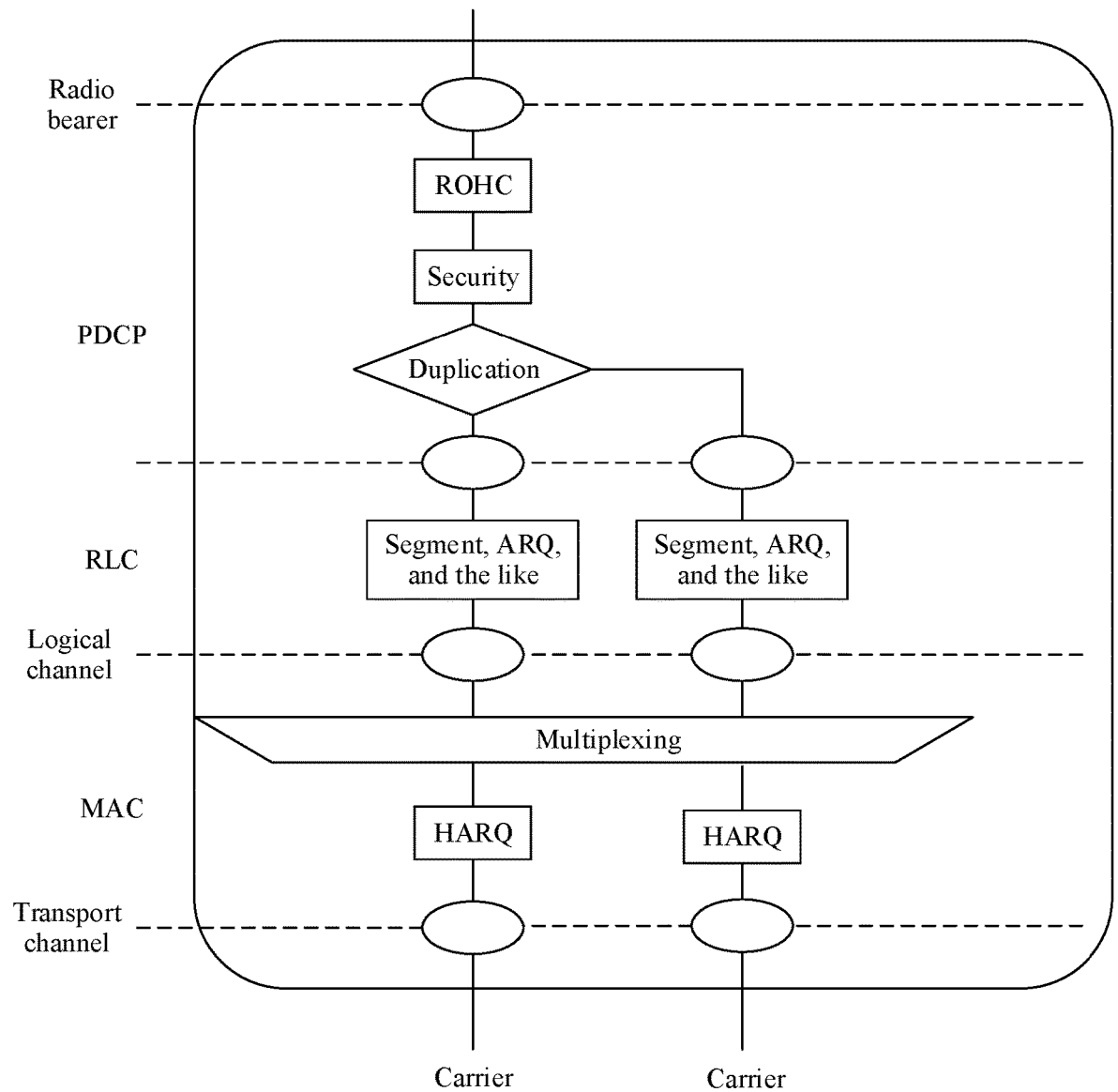
FIG. 2 shows a network architecture related to implementation of a duplication process at a PDCP layer in a CA scenario.

FIG. 2 shows a network architecture related to implementation of a PDCP duplication transmission function in a CA scenario. In the CA scenario, a terminal device is connected to one base station. Network architectures of the base station and the terminal device for one radio bearer are shown in FIG. 2, that is, for the radio bearer, the base station and the terminal device each include one PDCP entity, two RLC entities, and one MAC entity. Security, duplication, segment, ARQ, multiplexing, HARQ, ROHC, and the like in FIG. 2 all represent functions of the PDCP entity, the RLC entity, or the MAC entity.

In the CA scenario, one terminal device is connected to one base station, and the same base station has more than one carrier to serve the terminal device. Assuming that a PDCP duplication transmission function is configured for a radio bearer, two data packets duplicated at a PDCP layer are to be transmitted to two different RLC entities, and the two RLC entities transmit the two data packets to a same MAC entity through different logical channels. In this case, because the two data packets are transmitted to the same MAC entity, the MAC entity puts the two data packets into one MAC PDU for transmission. Therefore, to separately transmit the two data packets by using two MAC PDUs, a parameter, for example, referred to as a parameter A, may be configured for the logical channel. The parameter A indicates a cell (carrier) identifier, and a cell (carrier) allowed to be used to transmit data on the logical channel is indicated by using the parameter A, to ensure that two MAC PDUs including the two data packets can be finally transmitted in different cells (on different carriers). The concept of the cell herein may also be referred to as a carrier.

For example, if a parameter A is configured for a logical channel, it indicates that data in an RLC entity corresponding to the logical channel can be transmitted only in a cell (or on a carrier) indicated by the parameter A. In this way, if parameters A configured for two duplicate logical channels indicate different carriers, two duplicate data packets are finally transmitted on the different carriers, so that reliability can be ensured.

In a communication system, a PDCP duplication transmission function may be configured and activated for a radio bearer, or a PDCP duplication transmission function configured for a radio bearer may be deactivated.

Figure 3:
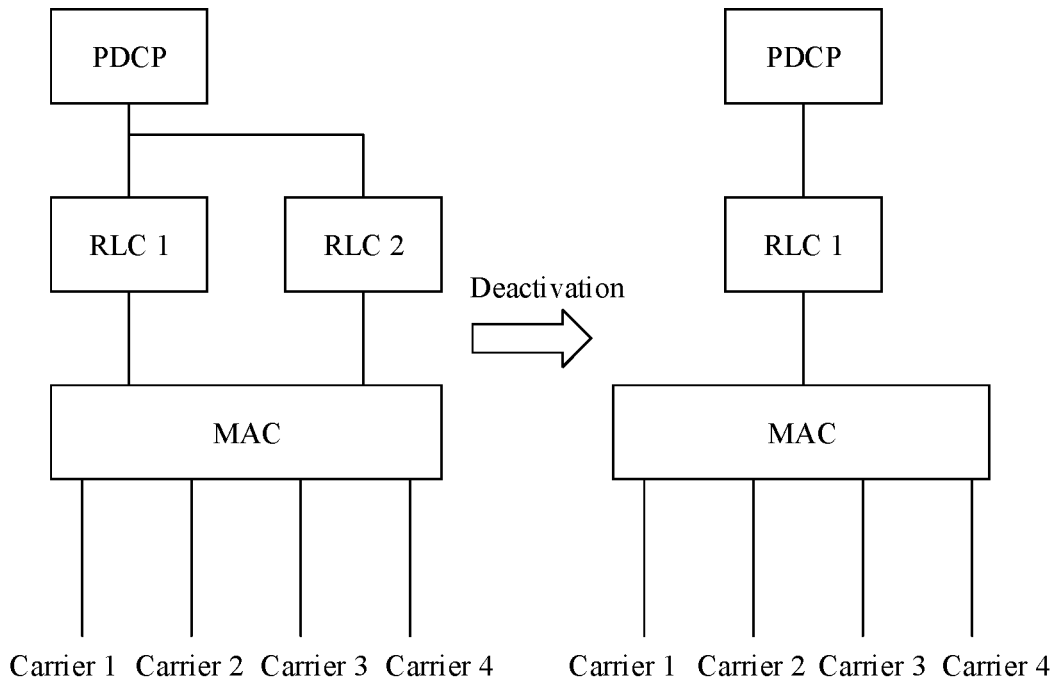
FIG. 3 is a schematic diagram in which when two logical channels are configured for one radio bearer in a CA scenario, after a logical channel of the radio bearer is deactivated, an association relationship between a carrier and the other logical channel also does not apply.

Currently, PDCP duplication transmission is limited only to using two logical channels to transmit data packets of one radio bearer that are duplicated at a PDCP layer (this is also commonly referred to as duplication transmission with two legs). In a CA scenario of duplication transmission with a maximum of two legs, after a PDCP duplication transmission function configured for a radio bearer is deactivated (or referred to as that PDCP duplication transmission is deactivated), an association relationship between a carrier and a logical channel of the radio bearer also does not apply. Refer to FIG. 3. It is assumed that when a PDCP duplication transmission function is activated (or referred to as that PDCP duplication transmission is activated), data from a logical channel 1 can be transmitted only on a carrier 1 or a carrier 2, and data from a logical channel 2 can be transmitted only on a carrier 3 or a carrier 4. At a specific moment, the PDCP duplication transmission function is deactivated, and only the logical channel 1 still works. In this case, to improve a transmission capacity, an association relationship between the logical channel 1 and the carrier does not apply, that is, all available (activated) carriers of the terminal device are allowed to be used for the logical channel 1. That a carrier is used for a logical channel herein means that data transmitted on the logical channel may be transmitted on the carrier.

Figure 4:
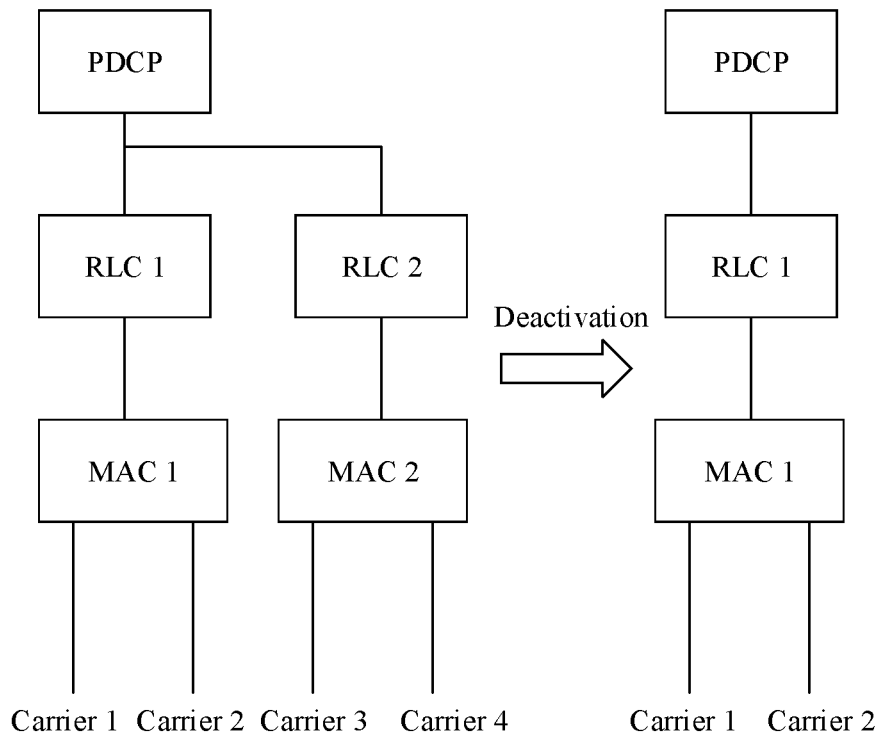
FIG. 4 is a schematic diagram in which after a logical channel of a MAC entity of a radio bearer is deactivated in a DC scenario, an association relationship between a carrier and a logical channel of another MAC entity of the radio bearer still applies.

In a DC scenario of duplication transmission with a maximum of two legs, after a PDCP duplication transmission function configured for a radio bearer is deactivated, an association relationship between a carrier and a logical channel of the radio bearer still applies. Refer to FIG. 4. It is assumed that when a PDCP duplication transmission function is activated (or referred to as that PDCP duplication transmission is activated), data from a logical channel 1 can be transmitted only on a carrier 1 or a carrier 2, and data from a logical channel 2 can be transmitted only on a carrier 3. At a specific moment, the PDCP duplication transmission function is deactivated, and only the logical channel 1 still works. In this case, an association relationship between the logical channel 1 and the carrier still applies. That is, in the DC scenario, two legs of the PDCP duplication transmission are connected to different base stations, and deactivation of one leg does not affect an association relationship between a carrier and a logical channel of the other leg.

A plurality of logical channels may be subsequently introduced in a communication system for a same bearer to perform PDCP duplication transmission, in other words, a plurality of data packets of one radio bearer that are duplicated at a PDCP layer are transmitted by using a plurality of logical channels. For example, data packets duplicated at the PDCP layer may be transmitted by using three or more logical channels, and these logical channels may correspond to one base station, or may correspond to a plurality of base stations. In this case, if a logical channel of the radio bearer is deactivated, a plurality of remaining activated logical channels may still exist, and which carriers should be used for the remaining activated logical channels is not discussed currently.

For example, PDCP duplication transmission is performed by using four logical channels in a 5G system. For details, refer to FIG. 5. Assuming that four logical channels are configured for a radio bearer to transmit data packets duplicated at a PDCP layer (this may also be referred to as duplication transmission with four legs), a data packet is duplicated at the PDCP layer to obtain four copies, and the four copies of data packets are separately transmitted on a logical channel 1, a logical channel 2, a logical channel 3, and a logical channel 4. Data on the logical channel 1 may be transmitted on a carrier 1, data on the logical channel 2 may be transmitted on a carrier 2, data on the logical channel 3 may be transmitted on a carrier 3 and a carrier 4, and data on the logical channel 4 may be transmitted on a carrier 5 and a carrier 6. The logical channel 1 and the logical channel 2 correspond to a MAC entity 1, and the logical channel 3 and the logical channel 4 correspond to a MAC entity 2. For example, if the logical channel 3 is deactivated at a specific moment, remaining activated logical channels are the logical channel 1, the logical channel 2, and the logical channel 3, and a terminal device cannot determine which carriers should be used for these remaining logical channels.

In view of this, the technical solutions in the embodiments of this application are provided. In the embodiments of this application, if a first logical channel is deactivated, whether an association relationship between a carrier and a remaining logical channel in an activated state applies may be determined depending on whether the remaining logical channel in the activated state and the first logical channel belong to a same MAC entity. It can be learned that, according to a method provided in the embodiments of this application, after a logical channel is deactivated, carriers that should be used for a remaining logical channel can be known, so that a terminal device can perform a correct operation.

Figure 6:
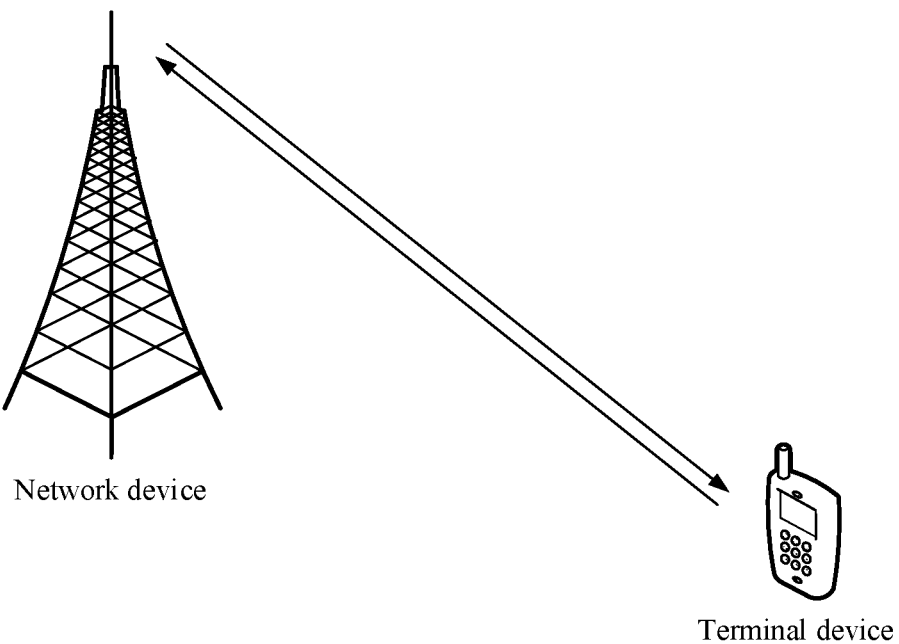
FIG. 6 is a schematic diagram of an application scenario according to an embodiment of this application.

FIG. 6 shows an application scenario according to an embodiment of this application. The scenario shown in FIG. 6 may be understood as a CA scenario. FIG. 6 includes a network device and a terminal device, and the terminal device is connected to one network device. Certainly, a quantity of terminal devices in FIG. 6 is merely an example. In an actual application, the network device may serve a plurality of terminal devices, and all or a part of the plurality of terminal devices each may determine an association relationship between a carrier and a logical channel by using the method provided in the embodiments of this application.

Figure 7:
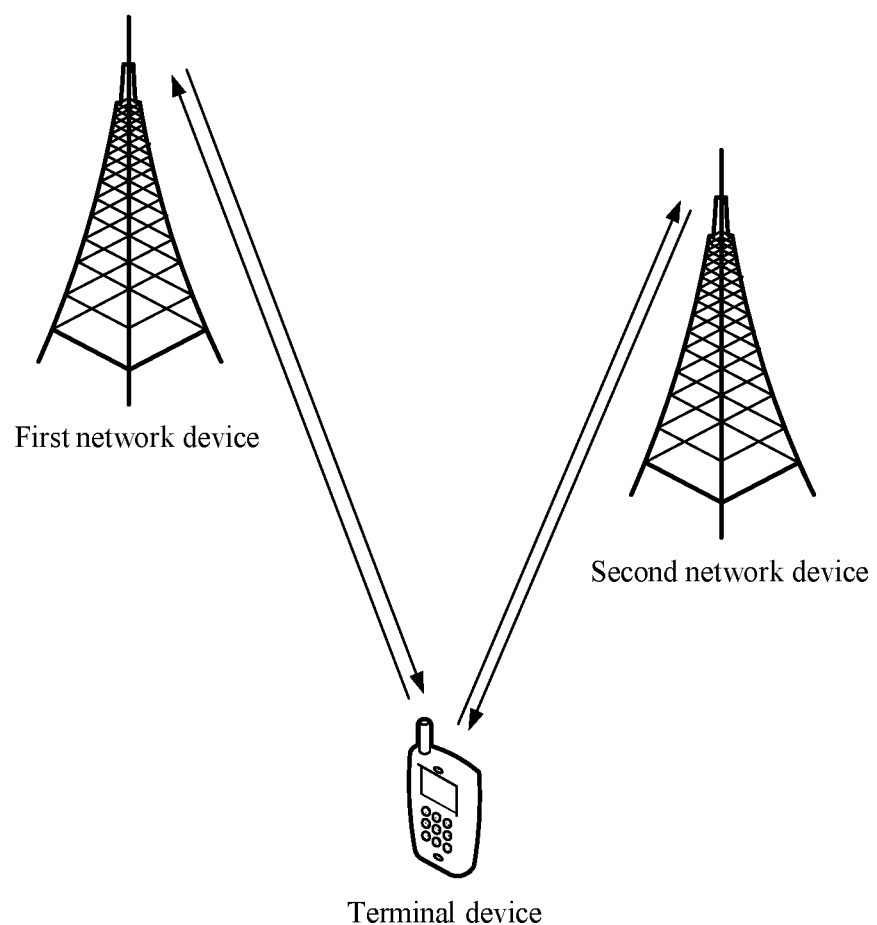
FIG. 7 is a schematic diagram of another application scenario according to an embodiment of this application.

FIG. 7 shows another application scenario according to an embodiment of this application. The scenario shown in FIG. 7 may be understood as a DC scenario. FIG. 7 includes two network devices and one terminal device. The two network devices are a first network device and a second network device. For example, the first network device is a master network device of the terminal device, and the second network device is a secondary network device of the terminal device. Alternatively, the first network device is a secondary network device of the terminal device, and the second network device is a master network device of the terminal device. For example, if the two network devices are both base stations, the master network device is a master base station, and the secondary network device is a secondary base station. For example, the first network device works in an evolved universal mobile telecommunications system terrestrial radio access (evolved UMTS terrestrial radio access, E-UTRA) system, and the second network device works in an NR system. Alternatively, for example, the first network device works in an NR system, and the second network device works in an E-UTRA system. Alternatively, for example, the first network device and the second network device both work in an NR system or an E-UTRA system. The terminal device is connected to both the two network devices, and can communicate with the two network devices.

The network device in FIG. 6 or FIG. 7 is, for example, a base station. The network device corresponds to different devices in different systems. For example, the network device may correspond to an eNB in a 4th generation (4G) mobile communication technology system, and may correspond to a gNB in a 5G system.

With reference to the accompanying drawings, the following describes the technical solutions provided in the embodiments of this application. In the embodiments of this application, the concepts of "carrier" and "cell" may be used interchangeably.

Figure 8:
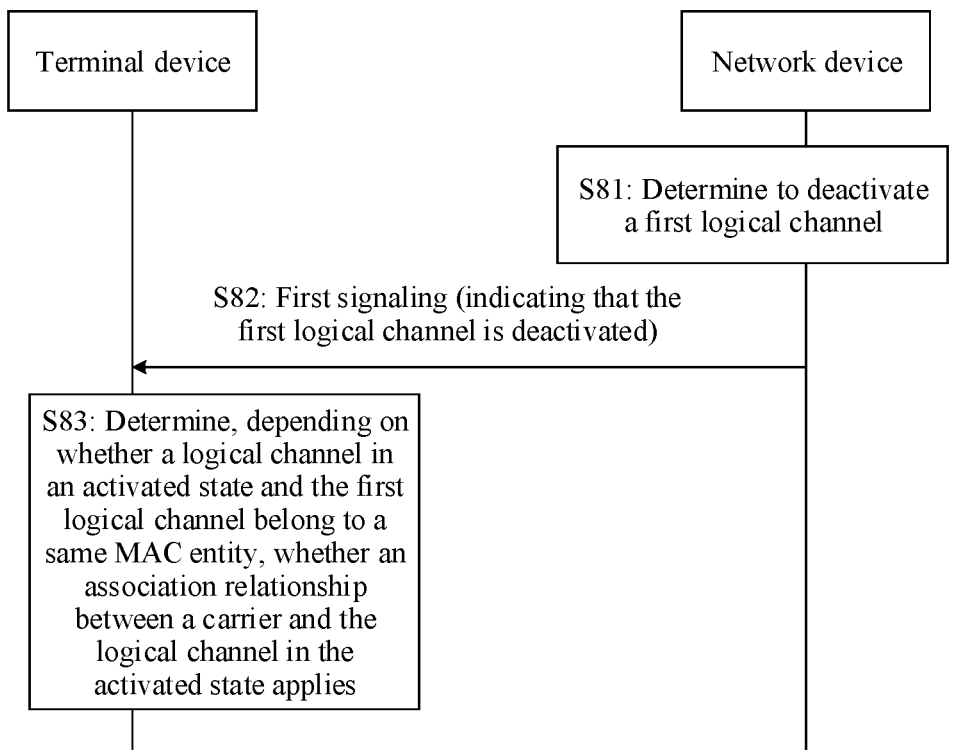
FIG. 8 is a flowchart of a first communication method according to an embodiment of this application.

An embodiment of this application provides a first communication method. FIG. 8 is a flowchart of the method. The following descriptions use an example in which the method is applied to the network architecture shown in FIG. 6 or FIG. 7. In addition, the method may be performed by two communication apparatuses. The two communication apparatuses are, for example, a first communication apparatus and a second communication apparatus. The first communication apparatus may be a network device or a communication apparatus that can support the network device in implementing a function required for the method, or the first communication apparatus may be a terminal device or a communication apparatus that can support the terminal device in implementing a function required for the method. Certainly, the first communication apparatus may alternatively be another communication apparatus, for example, a chip system. Similarly, the second communication apparatus may be a network device or a communication apparatus that can support the network device in implementing a function required for the method, or the second communication apparatus may be a terminal device or a communication apparatus that can support the terminal device in implementing a function required for the method. Certainly, the second communication apparatus may alternatively be another communication apparatus, for example, a chip system. In addition, implementations of the first communication apparatus and the second communication apparatus are not limited. For example, the first communication apparatus may be a network device, and the second communication apparatus is a terminal device; or both the first communication apparatus and the second communication apparatus are network devices; or both the first communication apparatus and the second communication apparatus are terminal devices; or the first communication apparatus is a network device, and the second communication apparatus is a communication apparatus that can support a terminal device in implementing a function required for the method. The network device is, for example, a base station.

For ease of description, the following uses an example in which the method is performed by a network device and a terminal device, that is, an example in which the first communication apparatus is a network device and the second communication apparatus is a terminal device. If this embodiment is applied to the network architecture shown in FIG. 6, the network device described below may be the network device in the network architecture shown in FIG. 6, and the terminal device described below may be the terminal device in the network architecture shown in FIG. 6. Alternatively, if this embodiment is applied to the network architecture shown in FIG. 7, the network device described below may be the first network device or the second network device in the network architecture shown in FIG. 7, and the terminal device described below may be the terminal device in the network architecture shown in FIG. 7. The following descriptions, use an example in which this embodiment is applied to the network architecture shown in FIG. 7.

S81: The network device determines to deactivate a first logical channel.

The first logical channel belongs to a radio bearer, and a PDCP duplication transmission function is configured for the radio bearer. A PDCP entity of the radio bearer is associated with at least two RLC entities, and the at least two RLC entities are configured to perform the PDCP duplication transmission function. Deactivating a logical channel means that the logical channel is no longer used to perform a PDCP duplication transmission function.

S82: The network device sends first signaling, and the terminal device receives the first signaling from the network device, where the first signaling indicates to deactivate the first logical channel. In addition, the first signaling may further indicate the terminal device to determine, depending on whether a logical channel in an activated state and the first logical channel belong to a same MAC entity, whether an association relationship between a carrier and the logical channel in the activated state applies.

In the embodiments of this application, the first signaling may also be understood as a first message, and the concepts of "signaling" and "message" may be used interchangeably in the embodiments of this application. Details are not described in subsequent embodiments again.

The first signaling is, for example, downlink control information (DCI), a media access control control element (MAC CE), radio resource control (RRC) signaling, an RLC control protocol data unit (PDU), or a PDCP control PDU, and is not specifically limited, provided that the first signaling indicates to deactivate the first logical channel.

The RLC control PDU is an RLC PDU different from an RLC data PDU, and is distinguished from the RLC data PDU by using indication information of a header. Usually, the RLC control PDU is used to transmit control information or feedback information of an RLC layer, and may be used to transmit control information related to the PDCP duplication transmission function in this embodiment of this application, where the control information includes an activation/deactivation indication and the like.

The PDCP control PDU is a PDCP PDU different from a PDCP data PDU, and is distinguished from the PDCP data PDU by using indication information of a header. Usually, the PDCP control PDU is used to transmit control information or feedback information of a PDCP layer, and may be used to transmit control information related to the PDCP duplication transmission function in this embodiment of this application, where the control information includes an activation/deactivation indication and the like.

S83: The terminal device determines, depending on whether the logical channel in the activated state and the first logical channel belong to the same MAC entity, whether the association relationship between a carrier and the logical channel in the activated state applies, where the first logical channel and the logical channel in the activated state belong to the same radio bearer, and the PDCP duplication transmission function is configured for the radio bearer.

The logical channel in the activated state in S82 is a remaining logical channel that is of the radio bearer and that is in the activated state after the first logical channel is deactivated.

That the PDCP duplication transmission function is configured for the radio bearer may be understood as: When a quantity of activated logical channels of the radio bearer is greater than or equal to 2, a data packet of the radio bearer is duplicated at the PDCP layer to obtain at least two copies of data packets, and the at least two copies of data packets are separately transmitted on the at least two logical channels, in other words, identical duplicated data packets are transmitted on the at least two logical channels. Each of the at least two logical channels may be used to transmit one data packet, in other words, the at least two logical channels are used to transmit at least two data packets. In the at least two data packets, one data packet may be an original data packet, and another data packet is a data packet obtained after the original data packet is duplicated. In short, the at least two data packets are collectively referred to as duplicated data packets, or referred to as data packets duplicated at the PDCP layer. The following "duplicated data packet" or "data packet duplicated at the PDCP layer" is understood in the same manner.

After the first logical channel is deactivated, a quantity of remaining activated logical channels of the radio bearer may be greater than or equal to 1. If the quantity of remaining activated logical channels of the radio bearer is equal to 1 after the first logical channel is deactivated, the remaining activated logical channel is referred to as, for example, a second logical channel. In this case, the terminal device may directly determine whether the remaining activated logical channel and the first logical channel belong to the same MAC entity. Alternatively, if the quantity of remaining activated logical channels of the radio bearer is greater than 1 after the first logical channel is deactivated, for each remaining activated logical channel, the terminal device may determine whether the logical channel and the first logical channel belong to the same MAC entity.

Figure 5:
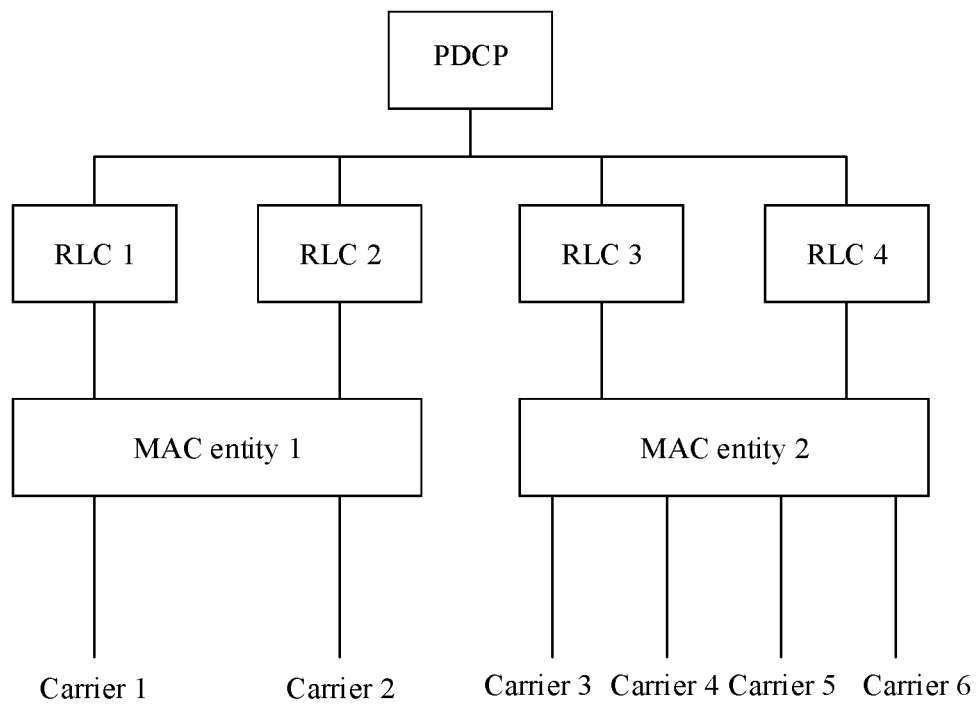
FIG. 5 is a schematic diagram in which PDCP duplication transmission may be performed by using four logical channels in a 5G system according to an embodiment of this application.

For example, still refer to FIG. 5. For example, if the logical channel 3 is deactivated, remaining activated logical channels are the logical channel 1, the logical channel 2, and the logical channel 4. In this case, the terminal device may determine that the logical channel 1 and the logical channel 3 do not belong to a same MAC entity, the logical channel 2 and the logical channel 3 do not belong to a same MAC entity, and the logical channel 4 and the logical channel 3 belong to a same MAC entity.

In an implementation, when the second logical channel and the first logical channel belong to the same MAC entity, the terminal device determines that an association relationship between a carrier and the second logical channel does not apply. The second logical channel is a logical channel in a remaining logical channel that is of the radio bearer and that is in the activated state after the first logical channel is deactivated.

That an association relationship between a carrier and a logical channel does not apply may alternatively be described as that a specific carrier or specific carriers on which data carried on the logical channel is transmitted is/are not limited by the association relationship between a carrier and a logical channel. In this case, if the terminal device determines that the association relationship between a carrier and the second logical channel does not apply, the terminal device may further determine that a data packet carried on the second logical channel is capable of being transmitted on a first type of carrier of the MAC entity. For example, the first type of carrier includes all carriers corresponding to the MAC entity. All the carriers corresponding to the MAC entity include a carrier that had an association relationship with the first logical channel before the first logical channel is deactivated and a carrier that has an association relationship with the second logical channel. In addition, if the MAC entity further corresponds to other logical channels in addition to the first logical channel and the second logical channel, all the carriers corresponding to the MAC entity also include carriers having association relationships with these other logical channels. If the MAC entity further includes an available carrier that has no association relationship with any logical channel, all the carriers corresponding to the MAC entity also include the carrier.

Alternatively, the first type of carrier may include a carrier that had an association relationship with the first logical channel before the first logical channel is deactivated and a carrier that has an association relationship with the second logical channel. In this case, if the MAC entity further corresponds to other logical channels in addition to the first logical channel and the second logical channel, the first type of carrier does not include carriers having association relationships with these other logical channels. If the MAC entity further includes an available carrier that has no association relationship with any logical channel, the first type of carrier does not include the carrier either.

In this embodiment of this application, if the first logical channel is deactivated, and the activated second logical channel and the first logical channel belong to the same MAC entity, the association relationship between a carrier and the second logical channel does not apply, thereby improving a system capacity. In addition, according to the method provided in this embodiment of this application, after a logical channel is deactivated, carriers that should be used for a remaining activated logical channel can be known, so that the terminal device can perform a correct operation.

After the first logical channel is deactivated, if there are a plurality of remaining activated logical channels of the MAC entity, and if none of association relationships between carriers and these remaining activated logical channels applies or if an association relationship between a carrier and a logical channel (for example, the second logical channel) in these remaining activated logical channels does not apply but an association relationship between a carrier and another logical channel still applies, a same carrier may be selected for two logical channels to transmit data. Consequently, duplication transmission cannot be implemented. Therefore, to avoid this case, in another implementation of this embodiment of this application, a quantity of remaining logical channels in the activated state may be further considered to determine whether an association relationship between a carrier and a remaining logical channel in the activated state applies.

For example, in FIG. 5, if the logical channel 3 is deactivated, a quantity of remaining activated logical channels of the MAC entity 2 is 1. Alternatively, in FIG. 9, if a logical channel 3 is deactivated, a quantity of remaining activated logical channels of a MAC entity 1 is 2.

If the logical channel in the activated state and the first logical channel belong to the same MAC entity, and a quantity of logical channels in the activated state that are of the MAC entity is 1, the terminal device may determine that the association relationship between a carrier and the logical channel in the activated state does not apply. For descriptions about that an association relationship between a carrier and a logical channel does not apply, refer to the foregoing descriptions.

For example, in FIG. 5, if the logical channel 3 is deactivated, a quantity of remaining activated logical channels of the MAC entity 2 is 1, and a first type of carrier of the MAC entity may be used for the remaining logical channel (the logical channel 4).

Alternatively, if the logical channel in the activated state and the first logical channel belong to the same MAC entity, and there are a plurality of remaining activated logical channels of the MAC entity, and if none of association relationships between carriers and these remaining activated logical channels applies or if an association relationship between a carrier and a logical channel (for example, the second logical channel) in these remaining activated logical channels does not apply but an association relationship between a carrier and another logical channel still applies, a same carrier may be selected for two logical channels to transmit data. Consequently, duplication transmission cannot be implemented. For example, in FIG. 9, if the logical channel 3 is deactivated, the quantity of remaining activated logical channels of the MAC entity 1 is 2. If association relationships between carriers and the two logical channels do not apply, a first type of carrier of the MAC entity 1 may be used for a logical channel 1 and a logical channel 2. If a same carrier is selected for the logical channel 1 and the logical channel 2 to transmit data, it means that two data packets are transmitted by using one MAC PDU, and consequently, duplication transmission is not implemented.

To avoid this case, in this embodiment of this application, if the logical channel in the activated state and the first logical channel belong to the same MAC entity, and a quantity of logical channels in the activated state that are of the MAC entity is greater than 1, the terminal device may determine that the association relationship between a carrier and the logical channel in the activated state applies. Alternatively, because the association relationship previously applied, this may alternatively be described as that the terminal device determines that the association relationship between a carrier and the logical channel in the activated state still applies. That an association relationship between a carrier and a logical channel applies may alternatively be described as that a specific carrier or specific carriers on which data carried on the logical channel is transmitted is/are limited by the association relationship between a carrier and a logical channel. In other words, data carried on the logical channel can be transmitted only on a carrier that has an association relationship with the logical channel.

Figure 9:
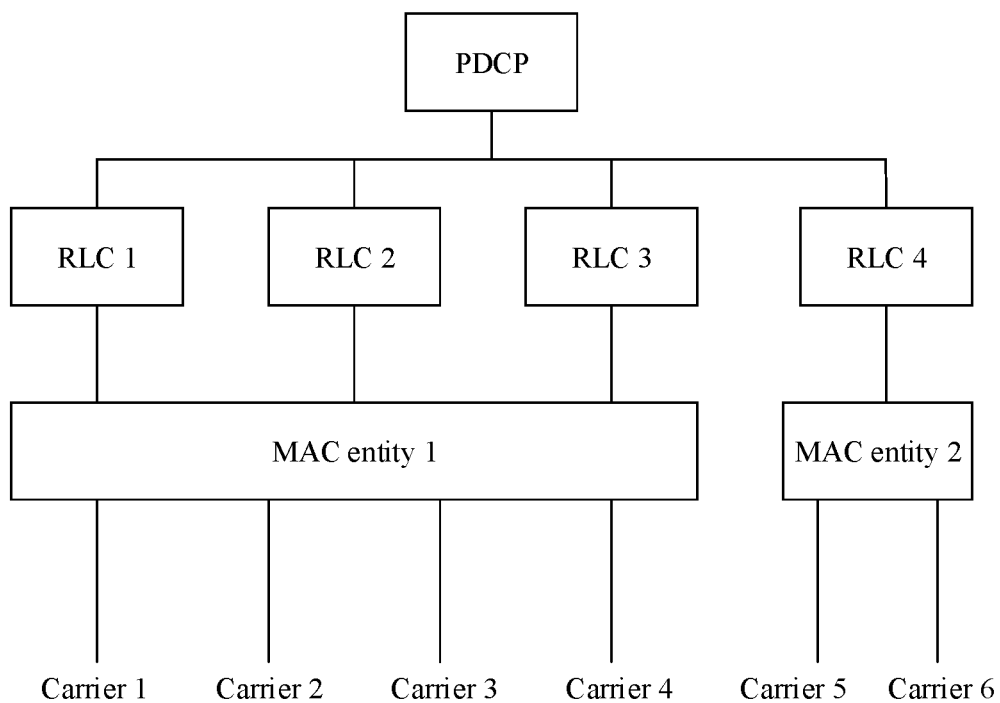
FIG. 9 is another schematic diagram in which PDCP duplication transmission may be performed by using four logical channels in a 5G system according to an embodiment of this application.

For example, in FIG. 9, if the logical channel 3 is deactivated, the quantity of remaining activated logical channels of the MAC entity 1 is 2, and the association relationships between carriers and the two remaining logical channels (i.e., the logical channel 1 and the logical channel 2) still apply. For example, data of the logical channel 1 may be transmitted on a carrier 1, and data of the logical channel 2 may be transmitted on a carrier 2. In other words, the logical channel 1 has an association relationship with the carrier 1, and the logical channel 2 has an association relationship with the carrier 2. In this case, after the logical channel 3 is deactivated, the logical channel 1 still has an association relationship with the carrier 1, and the logical channel 2 still has an association relationship with the carrier 2.

Alternatively, if the logical channel in the activated state and the first logical channel belong to the same MAC entity, and a quantity of logical channels in the activated state that are of the MAC entity is greater than 1, the terminal device may determine, based on first information, a carrier used to transmit a data packet carried on the logical channel in the activated state. For example, the first information may be carried in the first signaling, and the terminal device may obtain the first information from the first signaling. Alternatively, the first information may be preset information. For example, the first information is specified in a protocol, or is information sent by the network device to the terminal device in advance.

For example, the first information is used to indicate to set an association relationship in a first manner, and the association relationship includes an association relationship between a carrier and a remaining activated logical channel of the MAC entity. The carrier may include only the carrier that was associated with the first logical channel before the first logical channel is deactivated. Alternatively, the carrier may include all carriers in an activated state that are of the MAC entity, and all the carriers in the activated state that are of the MAC entity may include all carriers in the activated state that are associated with the logical channels corresponding to the MAC entity, and may further include all carriers in the activated state that are not associated with any logical channel corresponding to the MAC entity, where all the carriers in the activated state that are of the MAC entity include the carrier that was associated with the first logical channel before the first logical channel is deactivated. Alternatively, the carrier may include a carrier that is in the activated state and that is of the MAC entity other than carriers associated with the activated logical channels, and the carrier that is in the activated state and that is of the MAC entity other than the carriers associated with the activated logical channels may include the carrier that was associated with the first logical channel before the first logical channel is deactivated, and certainly may further include all carriers in the activated state that are not associated with any logical channel of the MAC entity.

If the first information is sent by the network device to the terminal device, when determining the first information, the network device may have determined logical channels of the radio bearer that are to be deactivated. For example, the first information is carried in the first signaling, and a remaining activated logical channel indicated by the first information may be definite. For example, the network device indicates, by using the first signaling, to deactivate a logical channel 1 of the radio bearer, where the logical channel 1 belongs to a MAC entity 1; and after the logical channel 1 is deactivated, remaining activated logical channels corresponding to the MAC entity 1 include a logical channel 2 and a logical channel 3. In this case, the network device may indicate an association relationship between a carrier and the logical channel 2 and an association relationship between a carrier and the logical channel 3 by using the first information.

Alternatively, the first information is specified in a protocol. Alternatively, although the first information is sent by the network device to the terminal device, when determining the first information, the network device may have not determined logical channels of the radio bearer that are to be deactivated. For example, the first information is not carried in the first signaling but is sent by using other signaling. For example, the network device may include the first information in signaling used to configure the PDCP duplication transmission function for the radio bearer. That is, after the network device sends the first information, all logical channels of the radio bearer are activated, and there is no deactivated logical channel. In this case, a remaining activated logical channel indicated by the first information may be indefinite, and is merely indirect, that is, if a logical channel of a MAC entity is subsequently deactivated, the first information indicates an association relationship between a carrier and a remaining activated logical channel of the MAC entity.

In this embodiment of this application, the first manner may include one or any combination of the following sub-manners.

Sub-manner 1: Establish association relationships between the carriers and the remaining activated logical channels in order of identifiers (IDs) of the carriers, where an association relationship is established between one of the carriers and one of the remaining activated logical channels each time.

Sub-manner 2: Establish association relationships between the carriers and the remaining activated logical channels in order of channel quality of the carriers, where an association relationship is established between one of the carriers and one of the remaining activated logical channels each time.

Sub-manner 3: Establish an association relationship between the carriers and one of the remaining activated logical channels.

Sub-manner 4: When the quantity of remaining activated logical channels is equal to 1, establish an association relationship between the carriers and the remaining activated logical channel.

Sub-manner 5: Establish association relationships between the carriers and the remaining activated logical channels in order of IDs of corresponding remaining deactivated logical channels, where an association relationship is established between one activated logical channel and all carriers that were associated with one deactivated logical channel before the logical channel is deactivated.

Sub-manner 6: Randomly establish an association relationship between each of the carriers and one of the remaining activated logical channels.

In the sub-manner 1, the sequentially establishing association relationships between the carriers and the remaining activated logical channels in order of IDs of the carriers may be sequentially establishing the association relationships between the carriers and the remaining activated logical channels in order of both the IDs of the carriers and IDs of the logical channels.

An association relationship may be established between a corresponding carrier with a largest ID and a corresponding logical channel with a largest ID, or an association relationship may be established between a corresponding carrier with a largest ID and a corresponding logical channel with a smallest ID. For example, if the carriers are a carrier 3, a carrier 5, and a carrier 6, and the remaining activated logical channels are a logical channel 1 and a logical channel 2, a sequence of sorting the carriers in descending order of IDs of the carriers should be the carrier 6>the carrier 5>the carrier 3, and a sequence of sorting the logical channels in descending order of IDs of the logical channels should be the logical channel 2>the logical channel 1. Association relationships between the carriers and the remaining activated logical channels are sequentially established in order of both the IDs of the carriers and the IDs of the logical channels. Specifically, an association relationship may be established between the carrier 3 and the logical channel 1, an association relationship may be established between the carrier 5 and the logical channel 2, and an association relationship may be established between the carrier 6 and the logical channel 1. Alternatively, an association relationship may be established between the carrier 3 and the logical channel 2, an association relationship may be established between the carrier 5 and the logical channel 1, and an association relationship may be established between the carrier 6 and the logical channel 2. Association relationships may be simultaneously or asynchronously established between a plurality of carriers and corresponding logical channels. If the association relationships are asynchronously established between a plurality of carriers and corresponding logical channels, an association relationship may be first established between a carrier with a largest carrier ID and a logical channel with a largest logical channel ID, or an association relationship may be first established between a carrier with a smallest carrier ID and a logical channel with a smallest logical channel ID. This is not specifically limited.

It should be noted that, similar to the sub-manner 1, another possible implementation may include one or more of the following steps (for example, may include a and c in the following steps, or include b and c in the following steps, or include a, b, and c in the following steps).

Step a: Sort the carriers in order of the IDs of the carriers, and sequentially assign new IDs starting from 0 or 1 to the sorted carriers. For example, the IDs of the sorted carriers are 0, 1, 2, 3, and the like, or are 1, 2, 3, and the like.

Step b: Sort the remaining activated logical channels in order of the IDs of the logical channels, and sequentially assign new IDs starting from 0 or 1 to the sorted logical channels. For example, the IDs of the sorted logical channels are 0, 1, 2, 3, and the like, or are 1, 2, 3, and the like.

Step c: Determine mapping relationships between the carriers and the remaining activated logical channels.

A manner of determining the mapping relationships may be one of the following manners in addition to the manner described in the sub-manner 1.

Modulo operation: Specifically, the quantity N of remaining activated logical channels is determined, then a modulo operation is performed on N and a newly numbered ID of a carrier, and the carrier is associated with a corresponding logical channel based on an operation result. For example, N is 2. In this case, if a result of a modulo operation performed on an ID of a carrier and N is 0, an association relationship is established between the carrier and a logical channel whose new ID is 0; or if a result of a modulo operation performed on an ID of a carrier and N is 1, an association relationship is established between the carrier and a logical channel whose new ID is 1.

Division into subsets: If the quantity of remaining activated logical channels is 2, the carriers are divided into two subsets based on parity of the IDs of the carriers (IDs that do not need to be renumbered, namely, the original IDs of the carriers), and association relationships are established between the two subsets and the two logical channels, where an association relationship is established between one subset and one logical channel. Alternatively, the carriers sorted in order of the IDs of the carriers (IDs that do not need to be renumbered, namely, the original IDs of the carriers) are divided in the middle into two subsets that are, for example, referred to as a first subset and a second subset, where the first subset is a set of IDs located before a division point, and the second subset is a set of IDs located after the division point. An ID at the division point is, for example, an ID whose value is centered in the IDs of the carriers. Association relationships are established between the two logical channels and the first and the second subsets, where an association relationship is established between one subset and one logical channel, and quantities of carriers included in the first subset and the second subset may be the same (a total quantity of carriers is an even number), or quantities of carriers included in the first subset and the second subset may be different (a total quantity of carriers is an odd number).

In the sub-manner 2, the sequentially establishing association relationships between the carriers and the remaining activated logical channels in order of channel quality of the carriers may be sequentially establishing the association relationships between the carriers and the remaining activated logical channels in order of both the channel quality of the carriers and IDs of the logical channels. An association relationship may be established between a carrier with best channel quality and a corresponding logical channel with a largest ID, or an association relationship may be established between a carrier with worst channel quality and a corresponding logical channel with a smallest ID. For example, the carriers are a carrier 3, a carrier 5, and a carrier 6, channel quality of the carrier 3 is better than channel quality of the carrier 6, the channel quality of the carrier 6 is better than channel quality of the carrier 5, and the remaining activated logical channels are a logical channel 1 and a logical channel 2. A sequence of sorting the logical channels in descending order of IDs of the logical channels should be the logical channel 2>the logical channel 1. Association relationships between the carriers and the remaining activated logical channels are sequentially established in order of both the channel quality of the carriers and the IDs of the logical channels. Specifically, an association relationship may be established between the carrier 3 and the logical channel 1, an association relationship may be established between the carrier 6 and the logical channel 2, and an association relationship may be established between the carrier 5 and the logical channel 1. Alternatively, an association relationship may be established between the carrier 3 and the logical channel 2, an association relationship may be established between the carrier 6 and the logical channel 1, and an association relationship may be established between the carrier 5 and the logical channel 2. Association relationships may be simultaneously or asynchronously established between a plurality of carriers and corresponding logical channels. If the association relationships are asynchronously established between a plurality of carriers and corresponding logical channels, an association relationship may be first established between a carrier with best channel quality and a logical channel with a largest logical channel ID, or an association relationship may be first established between a carrier with worst channel quality and a logical channel with a smallest logical channel ID. This is not specifically limited. If carriers associated with some logical channels have relatively good channel quality, and carriers associated with some logical channels have relatively poor channel quality, data packets duplicated at the PDCP layer may not be well transmitted. In this case, as proposed in this embodiment of this application, the association relationships are sequentially established with the logical channels in order of the channel quality of the carriers, so that channel quality of the carriers associated with the logical channels does not differ much, and transmission quality on the logical channels is relatively balanced, thereby well transmitting the data packets duplicated at the PDCP layer. The channel quality of the carrier may be obtained by the network device through measurement. After obtaining the channel quality of the carrier through measurement, the network device may send the channel quality of the carrier to the terminal device. For example, the network device may send the channel quality of the carrier to the terminal device by using the first signaling. Alternatively, the network device may send the channel quality of the carrier to the terminal device by using other signaling. In addition, the channel quality of the carrier may alternatively be determined by the terminal device or the network device based on a success rate (for example, a proportion of a received/sent acknowledgment (ACK)) of data transmission on a carrier.

In the sub-manner 3, the association relationship may be established between the carriers and one of the remaining activated logical channels. That is, if the quantity of remaining activated logical channels is greater than 1, an association relationship may be established between all the carriers and one of a plurality of activated logical channels. If the quantity of remaining activated logical channels is greater than 1, a specific activated logical channel that is to be selected for establishing an association relationship with all the carriers is not limited in this embodiment of this application. For example, for one radio bearer, there is usually one primary logical channel, and all remaining logical channels are secondary logical channels. If the remaining activated logical channels include the primary logical channel, an association relationship may be established between the carriers and the primary logical channel. For example, a MAC entity has a logical channel 1, a logical channel 2, and a logical channel 3 that are used to transmit data packets duplicated at the PDCP layer, the logical channel 1 is the primary logical channel of the radio bearer, the logical channel 3 is deactivated, and the logical channel 3 had an association relationship with a carrier 3 before being deactivated. In this case, an association relationship may be established between the carrier 3 and the logical channel 1. Certainly, an association relationship may alternatively be established between the carriers and an activated logical channel other than the primary logical channel in the remaining activated logical channels. The foregoing example is still used. If the logical channel 3 is deactivated, an association relationship may be established between the carrier 3 and the logical channel 1 or the logical channel 2. Therefore, it may be considered that an association relationship may be established between the carriers and any one of the remaining activated logical channels. If the association relationship is established between the carriers and the primary logical channel in the remaining activated logical channels, the network device may also indicate the primary logical channel to the terminal device in the first information. For example, the first information may carry an ID of the primary logical channel. Therefore, the terminal device may determine to establish the association relationship between the carriers and the primary logical channel in the remaining activated logical channels. Alternatively, the primary logical channel may be specified in a protocol, and no additional indication from the network device is required. However, if an association relationship is established between the carriers and any one of the remaining activated logical channels, for example, an association relationship is established between the carriers and a logical channel randomly selected from the remaining activated logical channels, the network device may indicate the logical channel to the terminal device in the first information. For example, the first information may carry an ID of the logical channel with which the association relationship needs to be established, so that the terminal device may determine to establish the association relationship between the carriers and the logical channel.

In the sub-manner 4, when the quantity of remaining activated logical channels is equal to 1, an association relationship may be established between the carriers and the activated logical channel. When the quantity of remaining activated logical channels is greater than 1, association relationships between carriers and the remaining activated logical channels remain unchanged, that is, original association relationships between carriers and the remaining activated logical channels are maintained, and an association relationship is not established between a remaining activated logical channel and a carrier that was associated with a deactivated logical channel before the logical channel is deactivated. For example, a MAC entity transmits, by using a logical channel 1, a logical channel 2, and a logical channel 3, data packets duplicated at the PDCP layer, where the logical channel 1 has an association relationship with a carrier 1, the logical channel 2 has an association relationship with a carrier 2 and a carrier 3, and the logical channel 3 has an association relationship with a carrier 4. If both the logical channel 2 and the logical channel 3 are deactivated, a quantity of remaining activated logical channels is 1, and an association relationship may be established between the logical channel 1 and all the carrier 2 and the carrier 3 that were associated with the logical channel 2 before the logical channel 2 is deactivated and the carrier 4 that was associated with the logical channel 3 before the logical channel 3 is deactivated. Alternatively, if only the logical channel 3 is deactivated, a quantity of remaining activated logical channels is 2, the association relationship between the logical channel 1 and the carrier remains unchanged, the association relationship between the logical channel 2 and the carriers remains unchanged, the logical channel 1 is still associated only with the carrier 1, and the logical channel 2 is still associated only with the carrier 2 and the carrier 3. This is to simplify an implementation. For example, if the quantity of remaining activated logical channels is greater than 1, how to allocate associated carriers to the remaining activated logical channels requires a specific rule, and a protocol may be modified. Therefore, in the sub-manner 4, if the quantity of remaining activated logical channels is greater than 1, the association relationships between carriers and the logical channels may remain unchanged. In this way, the protocol does not need to be modified. If the quantity of remaining activated logical channels is equal to 1, an association relationship is directly established between the carriers and the activated logical channel. This is relatively simple.

In the sub-manner 5, the sequentially establishing association relationships between the carriers and the remaining activated logical channels in order of IDs of corresponding deactivated logical channels may be sequentially establishing the association relationships between the carriers and the remaining activated logical channels in order of both the IDs of the corresponding deactivated logical channels and IDs of the activated logical channels, where an association relationship may be established between a carrier corresponding to a deactivated logical channel with a largest ID and a corresponding logical channel with a largest ID, or an association relationship may be established between a carrier corresponding to a deactivated logical channel with a smallest ID and a corresponding logical channel with a largest ID. For example, a MAC entity transmits, by using a logical channel 1, a logical channel 3, a logical channel 3, and a logical channel 4, data packets duplicated at the PDCP layer, the logical channel 3 and the logical channel 4 are deactivated, a carrier 3 was associated with the logical channel 3 before the logical channel 3 is deactivated, a carrier 4, a carrier 5, and a carrier 6 were associated with the logical channel 4 before the logical channel 4 is deactivated, and remaining activated logical channels are the logical channel 1 and the logical channel 2. A sequence of sorting the remaining activated logical channels in descending order of IDs of the logical channels should be the logical channel 2>the logical channel 1, and a sequence of sorting the deactivated logical channels in descending order of IDs of the logical channels should be the logical channel 4>the logical channel 3. In this case, association relationships are sequentially established between the carriers and the remaining activated logical channels in order of the IDs of the logical channels. Specifically, an association relationship may be established between the logical channel 1 and the carrier 3 that was associated with the logical channel 3 before the logical channel 3 is deactivated, and an association relationship may be established between the logical channel 2 and the carrier 4, the carrier 5, and the carrier 6 that were associated with the logical channel 4 before the logical channel 4 is deactivated. Alternatively, an association relationship may be established between the logical channel 2 and the carrier 3 that was associated with the logical channel 3 before the logical channel 3 is deactivated, and an association relationship may be established between the logical channel 1 and the carrier 4, the carrier 5, and the carrier 6 that were associated with the logical channel 4 before the logical channel 4 is deactivated. This manner is simpler in implementation than the sub-manners 1 and 2 in which the carriers are sequentially associated.

In the sub-manner 6, the association relationship may be randomly established between each of the carriers and one of the remaining activated logical channels, that is, association relationships between the carriers and the remaining activated logical channels are completely randomly established. This implementation is relatively simple and does not require excessive rules. The network device may indicate, to the terminal device in the first information, a specific logical channel that is in the remaining activated logical channels and with which each of the carriers is to be associated. The terminal device may determine to establish an association relationship between each of the carriers and the corresponding logical channel in the remaining activated logical channels.

Certainly, the first manner may further include another manner of establishing an association relationship between the carriers and the remaining activated logical channels in addition to at least one of the foregoing sub-manners. This is not limited in this embodiment of this application.

The first manner may be specified in a protocol. In this case, if a quantity of sub-manners included in the first manner specified in the protocol is greater than 1, for example, it is specified in the protocol that the first manner includes the sub-manner 1, the sub-manner 2, and the sub-manner 5, specific sub-manners to be used may be further indicated to the terminal device in combination with information of the network device. For example, the network device sends the first information to indicate the terminal device to set the association relationship between the carriers and the remaining activated logical channels in the first manner. In this case, the network device does not need to include the specific first manner in the first information, but may include only identification information of the first manner. The identification information of the first manner may be used as indication information. For example, the identification information of the first manner is an ID of the first manner. For example, if the first manner includes the foregoing sub-manner 2, the network device may include an ID of the sub-manner 2 in the first information, to indicate, by using the first information, to set the association relationship between the carriers and the remaining activated logical channels in the first manner. After receiving the first information, the terminal device may determine, based on the ID of the sub-manner 2, to set the association relationship between the carriers and the remaining activated logical channels in the sub-manner 2. This manner helps reduce signaling overheads. If a quantity of sub-manners included in the first manner specified in the protocol is equal to 1, for example, it is specified in the protocol that the first manner includes the sub-manner 1 or the sub-manner 4, in other words, the first manner specified in the protocol is one sub-manner, a specific sub-manner to be used may be indicated to the terminal device without combination of information of the network device, and the terminal device may determine the specific sub-manner of the first manner according to the protocol. In this case, the network device may not need to send the first information to the terminal device either. This helps reduce signaling overheads. Certainly, even if a quantity of sub-manners included in the first manner specified in the protocol is greater than 1, it may be specified that the terminal device is to set the association relationship between the carriers and the remaining activated logical channels by using the plurality of sub-manners. In this case, the network device may not need to send the first information to the terminal device either, and the terminal device sets the association relationship between the carriers and the remaining activated logical channels in each sub-manner specified in the protocol. This is not specifically limited.

Alternatively, the first manner may not be specified in a protocol. In this case, the network device may include specific information about the first manner in the first information, and the information about the first manner may be used as indication information. For example, if the first manner includes the foregoing sub-manner 2, the network device may include information about the sub-manner 2 in the first information, to indicate, by using the first information, to set the association relationship between the carriers and the remaining activated logical channels in the first manner. After receiving the first information, the terminal device may determine, based on the information about the sub-manner 2, to set the association relationship between the carriers and the remaining activated logical channels in the sub-manner 2, and may know the sub-manner 2. In this manner, the terminal device can obtain relatively definite information.

In addition, the first manner may further have another implementation form in addition to the implementation form in which the first manner may include at least one of the foregoing several sub-manners. Alternatively, this may be understood as that the first manner may further include another manner in addition to at least one of the foregoing several sub-manners.

In an implementation of the first manner, the first information may further include a bitmap corresponding to each of all or a part of the remaining activated logical channels, and the bitmap of each logical channel may be used to indicate an association relationship between a carrier and the logical channel. One bitmap may correspond to an ID of one logical channel. For example, this correspondence may also be included in the first information, so that the terminal device can know a correspondence between a bitmap and a logical channel. In other words, the first information may include one or more bitmaps, and one bitmap is used to indicate an association relationship between a carrier and one logical channel. A logical channel corresponding to the one or more bitmaps is all or a part of the remaining activated logical channels. In this case, the first manner may be a manner of setting an association relationship between the carrier and the remaining activated logical channel based on the bitmap included in the first signaling, in other words, the first manner is a manner of setting an association relationship between the carrier and the remaining activated logical channel based on the bitmap.

For example, the first information is carried in the signaling used to configure the PDCP duplication transmission function of the radio bearer. For example, when the PDCP duplication transmission function of the radio bearer is configured, the signaling used to configure the PDCP duplication transmission function of the radio bearer may carry a bitmap corresponding to each of all logical channels of each of all or a part of MAC entities corresponding to the radio bearer, so that the terminal device knows carriers having an association relationship with each logical channel of a corresponding MAC entity.

Alternatively, the first information is carried in the first signaling.

For example, the first signaling indicates to deactivate the first logical channel of the radio bearer, the first signaling may further carry the first information, and the first information indicates a bitmap corresponding to each of all or a part of remaining activated logical channels of a MAC entity to which the first logical channel belongs. The remaining activated logical channels may be activated logical channels of the MAC entity that remain after the first logical channel is deactivated by using the first signaling.

For example, the PDCP duplication transmission function of the radio bearer corresponds to four logical channels that are a logical channel 1, a logical channel 2, a logical channel 3, and a logical channel 4. The logical channel 1 has an association relationship with a carrier 1 and a carrier 2, the logical channel 2 has an association relationship with a carrier 3, the logical channel 3 has an association relationship with a carrier 4 and a carrier 5, and the logical channel 4 has an association relationship with a carrier 6. The logical channel 1 corresponds to a MAC entity 1, and the logical channel 2, the logical channel 3, and the logical channel 4 correspond to a MAC entity 2. If the network device indicates, by using the first signaling, to deactivate the logical channel 3, remaining activated logical channels of the MAC entity 2 are the logical channel 2 and the logical channel 4, and the network device may determine to establish an association relationship between the logical channel 2 and/or the logical channel 4 and the carriers associated with the logical channel 3 before the logical channel 3 is deactivated. Specifically, an association relationship may be established between the logical channel 2 or the logical channel 4 and the carriers associated with the logical channel 3 before the logical channel 3 is deactivated, or an association relationship may be established between both the logical channel 2 and the logical channel 4 and the carriers associated with the logical channel 3 before the logical channel 3 is deactivated. For example, if the network device determines to establish an association relationship between the logical channel 2 and the carrier 4 associated with the logical channel 3 before the logical channel 3 is deactivated, and to establish an association relationship between the logical channel 4 and the carrier 5 associated with the logical channel 3 before the logical channel 3 is deactivated, the network device may generate a bitmap corresponding to the logical channel 2, and generate a bitmap corresponding to the logical channel 4. For example, because the logical channel 1 to the logical channel 4 were originally associated with the carrier 1 to the carrier 6, each bitmap may have six bits, each bit represents one carrier, and bits of one bitmap that are from a most significant bit to a least significant bit respectively correspond to the carrier 1 to the carrier 6. A specific carrier corresponding to each bit of a bitmap may be pre-specified in a protocol, or may be preconfigured by the network device and notified to the terminal device. For a bitmap corresponding to a logical channel, if a value of a bit is "1", it indicates that an association relationship is to be established between a carrier corresponding to the bit and the logical channel; or if a value of a bit is "0", it indicates that an association relationship is not to be established between a carrier corresponding to the bit and the logical channel. For example, the two bitmaps generated by the network device each include six bits, the bitmap corresponding to the logical channel 2 is 001100, and the bitmap corresponding to the logical channel 4 is 000011. This indicates that an association relationship is to be established between the logical channel 2 and both the carrier 3 and the carrier 4, and an association relationship is to be established between the logical channel 4 and both the carrier 5 and the carrier 6. Because the logical channel 2 originally has an association relationship with the carrier 3, and the logical channel 4 originally has an association relationship with the carrier 6, the terminal device may only need to establish an association relationship between the logical channel 2 and the carrier 4, and establish an association relationship between the logical channel 4 and the carrier 6.

In the foregoing example, the first information includes bitmaps corresponding to all of the remaining activated logical channels. In another case, the first information may include a bitmap corresponding to a part of the remaining activated logical channels. For example, for the remaining activated logical channels, association relationships between some logical channels and carriers may not change. In this case, the first information may not include bitmaps corresponding to these logical channels, but include only a bitmap corresponding to a logical channel whose association relationship with a carrier has changed. In this manner, signaling overheads can be effectively reduced, and workload of the terminal device can also be reduced.

For example, the PDCP duplication transmission function of the radio bearer corresponds to four logical channels that are a logical channel 1, a logical channel 2, a logical channel 3, and a logical channel 4. The logical channel 1 has an association relationship with a carrier 1 and a carrier 2, the logical channel 2 has an association relationship with a carrier 3, the logical channel 3 has an association relationship with a carrier 4 and a carrier 5, and the logical channel 4 has an association relationship with a carrier 6. The logical channel 1 corresponds to a MAC entity 1, and the logical channel 2, the logical channel 3, and the logical channel 4 correspond to a MAC entity 2. If the network device indicates, by using the first signaling, to deactivate the logical channel 3, remaining activated logical channels of the MAC entity 2 are the logical channel 2 and the logical channel 4, and the network device may determine to establish an association relationship between the logical channel 2 and/or the logical channel 4 and the carriers associated with the logical channel 3 before the logical channel 3 is deactivated. For example, the network device determines to establish an association relationship between the logical channel 2 and both the carrier 4 and the carrier 5 that were associated with the logical channel 3 before the logical channel 3 is deactivated. In other words, the association relationship between the logical channel 4 and the carrier does not change. In this case, the network device may generate a bitmap corresponding to the logical channel 2, and does not need to generate a bitmap corresponding to the logical channel 4. For example, the bitmap has six bits, each bit represents one carrier, and the bits from a most significant bit to a least significant bit respectively correspond to the carrier 1 to the carrier 6. In this case, the bitmap corresponding to the logical channel 2 may be 001110. This indicates that an association relationship is to be established between the logical channel 2 and all the carrier 3, the carrier 4, and the carrier 5. Because the logical channel 2 originally has an association relationship with the carrier 3, the terminal device may only need to establish an association relationship between the logical channel 2 and both the carrier 4 and the carrier 5.

Certainly, for the remaining activated logical channels, even if association relationships between carriers and some logical channels do not change, the first information may also include bitmaps corresponding to these logical channels. In other words, if association relationships between carriers and all the remaining activated logical channels change, the first information may include bitmaps corresponding to all the remaining activated logical channels; and if an association relationship between a carrier and a logical channel in the remaining activated logical channels does not change, the first information may include bitmaps corresponding to all the remaining activated logical channels, or may include a bitmap corresponding to a part of the remaining activated logical channels. This is not specifically limited.

As described above, the first information includes a bitmap, to indicate an association relationship between a carrier and a logical channel. This indication manner is relatively definite and simple, and helps the terminal device to perform setting based on the first information.

In addition, the first manner may further have another implementation form in addition to the foregoing implementation form of the first manner. In other words, the first manner may further include one or any combination of the following several implementations in addition to the manners described above.

In an implementation, the first manner may be a manner of lifting an association relationship between the second logical channel and a first carrier, and the second logical channel may be one of the remaining activated logical channels. In this manner, the first information indicates, for example, an ID of the second logical channel and an ID of the first carrier, so that the terminal device may determine to lift the association relationship between the second logical channel and the first carrier. For example, the second logical channel has an association relationship with a plurality of carriers, and the first carrier has relatively poor channel quality and has little effect on transmitting a data packet duplicated at the PDCP layer. Therefore, the network device may indicate, by using the first information, to lift the association relationship between the second logical channel and the first carrier.

Alternatively, this implementation may be understood as: The first manner may be a manner of lifting an association relationship between at least one logical channel and a corresponding carrier, and the at least one logical channel may be one or more of the remaining activated logical channels. For each of the at least one logical channel, a corresponding carrier may be all or a part of carriers associated with the logical channel.

In another implementation, the first manner may be lifting an association relationship between the second logical channel and a second carrier, and establishing an association relationship between the second carrier and a third logical channel. This means moving the second carrier from the second logical channel to the third logical channel. The second logical channel and the third logical channel may be two of the remaining activated logical channels. In this manner, the first information indicates, for example, an ID of the second logical channel, an ID of the second carrier, and an ID of the third logical channel, so that the terminal device may determine to lift the association relationship between the second logical channel and the second carrier, and establish the association relationship between the second carrier and the third logical channel. For example, if the second logical channel has an association relationship with a plurality of carriers, channel quality of the plurality of carriers is relatively good, and channel quality of carriers having an association relationship with the third logical channel may not be very good, the network device may indicate to lift the association relationship between the second logical channel and the second carrier and establish the association relationship between the second carrier and the third logical channel to associate the third logical channel with a carrier having better channel quality, to improve transmission quality of the data packet duplicated at the PDCP layer.

Certainly, this implementation is not limited to moving only one carrier, and batch processing may be performed on carriers. For example, an association relationship between the second logical channel and a plurality of carriers may be lifted, and an association relationship between each of the plurality of carriers and one or more logical channels may be established. Alternatively, association relationships between a plurality of logical channels and corresponding carriers may be lifted, and an association relationship between a carrier whose association relationship has been lifted and one or more logical channels may be established. There is another case.

In still another implementation, the first manner may alternatively be a manner of establishing an association relationship between the second logical channel and a third carrier, where the third carrier is a carrier in the activated state that has no association relationship with any logical channel of the MAC entity, and the second logical channel is one of the remaining activated logical channels. That is, no association relationship was previously established between the third carrier and any logical channel of the MAC entity, and the network device may indicate, by using the first information, to establish the association relationship between the third carrier and the second logical channel. For example, channel quality of a carrier having an association relationship with the second logical channel may not be very good, and channel quality of the third carrier is relatively good. In this case, the network device may indicate to establish the association relationship between the third carrier and the second logical channel, to improve transmission quality of a data packet duplicated at the PDCP layer.

Certainly, this implementation is not limited to moving only one carrier either, and batch processing may also be performed on carriers. For example, an association relationship between the second logical channel and a plurality of carriers may be established, where the plurality of carriers are carriers in the activated state that have no association relationship with any logical channel of the MAC entity. There is another case.

In yet another implementation, the first manner may be a manner of establishing an association relationship between the second logical channel and a fourth carrier, where the fourth carrier is a carrier indicated by the first information, and the second logical channel is one of the remaining activated logical channels. For example, an association relationship may need to be established between the second logical channel and one or more carriers. For example, the first information may include IDs of these carriers. Therefore, after receiving the first information, the terminal device may establish an association relationship between the second logical channel and the carriers corresponding to the carrier IDs included in the first information. The fourth carrier is any one of the carriers whose association relationships with the second logical channel need to be established. The carriers whose association relationships with the second logical channel need to be established may include at least one of a carrier that currently has an association relationship with another activated logical channel of the MAC entity and a carrier that has no association relationship with any logical channel of the MAC entity. In this case, if the carriers whose association relationships with the second logical channel need to be established include the carrier that currently has an association relationship with another activated logical channel of the MAC entity, after receiving the first information, the terminal device needs to lift the association relationship between the carrier and the logical channel whose association relationship with the carrier was previously established, and establish an association relationship between the carrier and the second logical channel. If the carriers whose association relationships with the second logical channel need to be established include the carrier that has no association relationship with any logical channel of the MAC entity, after receiving the first information, the terminal device directly establishes an association relationship between the carrier and the second logical channel.

The foregoing describes a plurality of implementation forms of the first manner. A specific to-be-used implementation form of the first manner may be specified in a protocol, or may be preconfigured by the network device.

For example, if logical channels of a MAC entity that were used to transmit data packets duplicated at the PDCP layer were originally the first logical channel, the second logical channel, a third logical channel, and a fourth logical channel, and then the network device indicates to deactivate the first logical channel, logical channels of the MAC entity that are used to transmit the data packets duplicated at the PDCP layer become the second logical channel, the third logical channel, and the fourth logical channel. For example, the network device indicates, by using the first signaling, to deactivate the first logical channel. In this case, the network device may include the first information in the first signaling, and the first information includes, for example, a bitmap corresponding to the second logical channel, a bitmap corresponding to the third logical channel, and a bitmap corresponding to the fourth logical channel, to indicate association relationships between carriers and the three logical channels. Therefore, the terminal device may associate the carriers with the corresponding logical channels based on the three bitmaps. Certainly, if an association relationship between a carrier and a logical channel in the second logical channel, the third logical channel, and the fourth logical channel does not change, the network device may not include, in the first information, a bitmap of the logical channel whose association relationship does not change, so that signaling overheads are reduced, and steps of processing the first information by the terminal device are also reduced.

Alternatively, if logical channels of a MAC entity that were used to transmit data packets duplicated at the PDCP layer were originally the first logical channel, the second logical channel, a third logical channel, and a fourth logical channel, and then the network device indicates to deactivate the first logical channel, logical channels of the MAC entity that are used to transmit the data packets duplicated at the PDCP layer become the second logical channel, the third logical channel, and the fourth logical channel. For example, the network device indicates, by using the first signaling, to deactivate the first logical channel, the first signaling may further include the first information, and the first information may indicate to set an association relationship between a carrier and an activated logical channel in the first manner. In this case, the terminal device may alternatively set the association relationship between a carrier and an activated logical channel in the first manner. The first manner herein includes, for example, at least one of the foregoing sub-manner 1, sub-manner 2, sub-manner 3, sub-manner 4, sub-manner 5, or sub-manner 6.

Alternatively, if logical channels of a MAC entity that were used to transmit data packets duplicated at the PDCP layer were originally the first logical channel, the second logical channel, a third logical channel, and a fourth logical channel, and then the network device indicates to deactivate the first logical channel, logical channels of the MAC entity that are used to transmit the data packets duplicated at the PDCP layer become the second logical channel, the third logical channel, and the fourth logical channel. For example, the network device indicates, by using the first signaling, to deactivate the first logical channel, the first signaling may further include the first information, the first information may include one carrier ID or a plurality of carrier IDs, and a carrier corresponding to the carrier ID included in the first information is a carrier whose association relationship with the second logical channel needs to be established. After receiving the first information, the terminal device may establish an association relationship between the carrier and the second logical channel.

In this embodiment of this application, if the first logical channel is deactivated, carriers corresponding to remaining logical channels in the activated state that are of the MAC entity to which the first logical channel belongs may be determined based on a quantity of the logical channels, so that a system capacity is improved as much as possible, and a possibility that a same carrier is used for two logical channels is reduced, thereby ensuring that the PDCP duplication transmission function can be implemented. In addition, according to the method provided in this embodiment of this application, after a logical channel is deactivated, carriers that should be used for a remaining logical channel can be known, so that the terminal device can perform a correct operation.

In addition, the first information may be used to indicate to set an association relationship between the remaining activated logical channel and at least one carrier in the first manner, where the at least one carrier includes a carrier associated with a logical channel before the logical channel is deactivated. That is, when data packets of the radio bearer that are duplicated at the PDCP layer are transmitted by using a plurality of logical channels, if a logical channel is deactivated, this embodiment of this application provides a method for allocating, to the remaining activated logical channel, a carrier associated with the deactivated logical channel. In addition, the first manner may have a plurality of implementation forms, and is relatively flexible.

Figure 10:
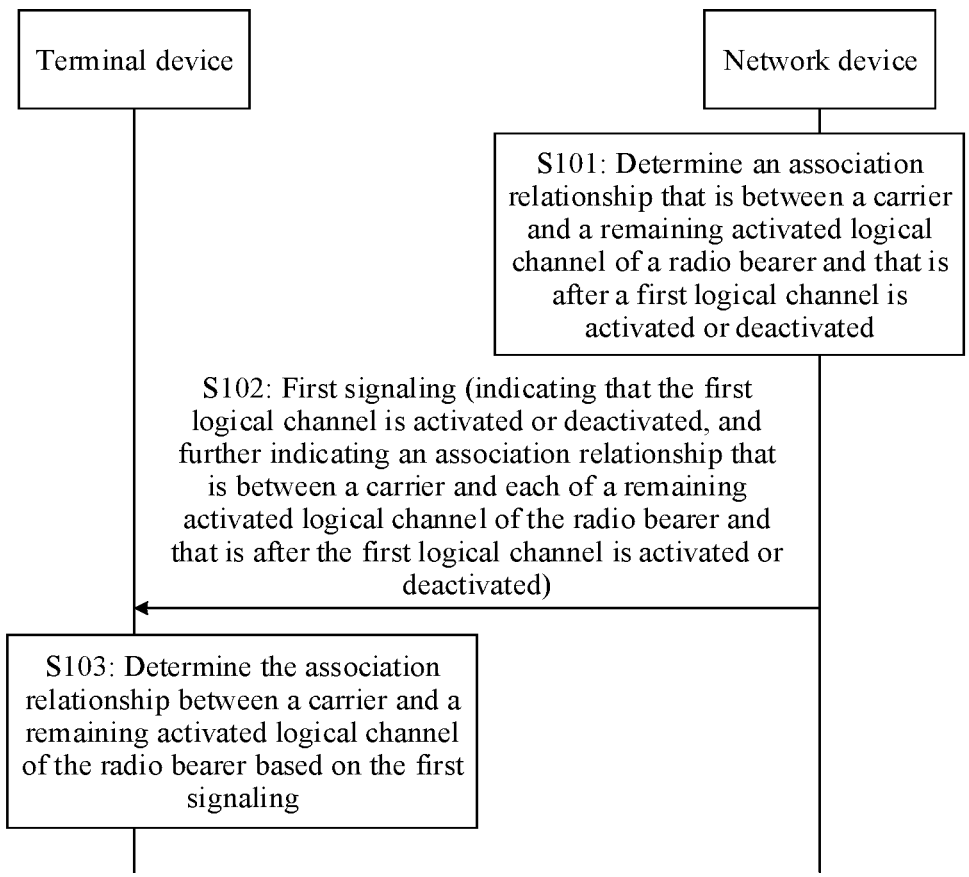
FIG. 10 is a flowchart of a second communication method according to an embodiment of this application.

To resolve a same technical problem, an embodiment of this application provides a second communication method. FIG. 10 is a flowchart of the method. In the following description process, an example in which the method is applied to the network architecture shown in FIG. 6 or FIG. 7 is used. In addition, the method may be performed by two communication apparatuses. The two communication apparatuses are, for example, a third communication apparatus and a fourth communication apparatus. The third communication apparatus may be a network device or a communication apparatus that can support the network device in implementing a function required for the method, or the third communication apparatus may be a terminal device or a communication apparatus that can support the terminal device in implementing a function required for the method. Certainly, the third communication apparatus may alternatively be another communication apparatus, for example, a chip system. Similarly, the fourth communication apparatus may be a network device or a communication apparatus that can support the network device in implementing a function required for the method, or the fourth communication apparatus may be a terminal device or a communication apparatus that can support the terminal device in implementing a function required for the method. Certainly, the fourth communication apparatus may alternatively be another communication apparatus, for example, a chip system. In addition, implementations of the third communication apparatus and the fourth communication apparatus are not limited. For example, the third communication apparatus may be a network device, and the fourth communication apparatus is a terminal device; or both the third communication apparatus and the fourth communication apparatus are network devices; or both the third communication apparatus and the fourth communication apparatus are terminal devices; or the third communication apparatus is a network device, and the fourth communication apparatus is a communication apparatus that can support a terminal device in implementing a function required for the method. The network device is, for example, a base station.

For ease of description, the following uses an example in which the method is performed by a network device and a terminal device. In other words, an example in which the third communication apparatus is a network device and the fourth communication apparatus is a terminal device is used. If this embodiment is applied to the network architecture shown in FIG. 6, the following network device may be the network device in the network architecture shown in FIG. 6, and the following terminal device may be the terminal device in the network architecture shown in FIG. 6. Alternatively, if this embodiment is applied to the network architecture shown in FIG. 7, the following network device may be the first network device or the second network device in the network architecture shown in FIG. 7, and the following terminal device may be the terminal device in the network architecture shown in FIG. 7. In the following descriptions, an example in which this embodiment is applied to the network architecture shown in FIG. 7 is mainly used.

S101: The network device determines an association relationship that is between a carrier and a remaining activated logical channel of a radio bearer and that is after a first logical channel is activated or deactivated, where the radio bearer is a radio bearer to which the first logical channel belongs, and a PDCP duplication transmission function is configured for the radio bearer. Alternatively, the network device determines an association relationship that is between a carrier and a remaining activated logical channel of the radio bearer and that is after the PDCP duplication transmission function of the radio bearer is activated.

The first logical channel belongs to the radio bearer, and the PDCP duplication transmission function is configured for the radio bearer. A PDCP entity of the radio bearer is associated with at least two RLC entities, and the at least two RLC entities are configured to perform the PDCP duplication transmission function.

That the PDCP duplication transmission function is configured for the radio bearer may be understood as: When a quantity of activated logical channels of the radio bearer is greater than or equal to 2, a data packet of the radio bearer is duplicated at a PDCP layer to obtain at least two copies of data packets, and the at least two copies of data packets are separately transmitted on the at least two logical channels, in other words, identical duplicated data packets are transmitted on the at least two logical channels. Each of the at least two logical channels may be used to transmit one data packet, in other words, the at least two logical channels are used to transmit at least two data packets. In the at least two data packets, one data packet may be an original data packet, and another data packet is a data packet obtained after the original data packet is duplicated. In short, the at least two data packets are collectively referred to as duplicated data packets, or referred to as data packets duplicated at the PDCP layer. The following "duplicated data packet" or "data packet duplicated at the PDCP layer" is understood in the same manner.

For example, an association relationship between a carrier and each logical channel of the radio bearer may be preset. In addition, for one logical channel, only one association relationship with a carrier may be set, or a plurality of association relationships with carriers may be set.

For example, when determining to activate or deactivate a logical channel of a radio bearer, the network device may determine an association relationship that should be used between a carrier and a remaining activated logical channel of the radio bearer after the logical channel of the radio bearer is activated or deactivated. For example, if the network device needs to activate or deactivate the first logical channel of the radio bearer, the network device may also determine the association relationship that is between a carrier and a remaining activated logical channel of the radio bearer and that is after the first logical channel is activated or deactivated. In this manner, the network device may directly determine an association relationship between a carrier and a logical channel, and may directly send the association relationship between a carrier and a logical channel to the terminal device, so that the terminal device obtains information more directly.

Alternatively, the network device may determine an identifier, where the identifier is used to indicate an association relationship that is between a carrier and each of a remaining activated logical channel of the radio bearer and that is after the first logical channel is activated or deactivated.

In this embodiment of this application, the network device may set a correspondence between an identifier and a first association relationship. After setting the correspondence, the network device may send the correspondence to the terminal device, so that the terminal device may receive the correspondence from the network device. Alternatively, the correspondence may be specified in a protocol. The first association relationship includes the association relationship between a carrier and each logical channel of the radio bearer. If a first implementation of the identifier is used, one identifier is used to indicate an association relationship between a carrier and one logical channel of the radio bearer. If a second implementation of the identifier is used, one identifier is used to indicate association relationships between carriers and all logical channels of the radio bearer. The first implementation and the second implementation of the identifier are described below.

When determining to activate or deactivate a logical channel of a radio bearer, the network device may determine an association relationship that should be used between a carrier and a remaining activated logical channel of the radio bearer after the logical channel of the radio bearer is activated or deactivated. For example, if the network device needs to activate or deactivate the first logical channel of the radio bearer, the network device may also determine the association relationship that is between a carrier and a remaining activated logical channel of the radio bearer and that is after the first logical channel is activated or deactivated. Therefore, the network device may select a corresponding identifier from a preset correspondence between an identifier and an association relationship, and an association relationship indicated by the identifier is the association relationship that is between a carrier and a remaining activated logical channel of the radio bearer and that is after the first logical channel is activated or deactivated.

Alternatively, when determining to activate the PDCP duplication transmission function of the radio bearer, the network device may determine the association relationship that should be used between a carrier and a remaining activated logical channel of the radio bearer after the PDCP duplication transmission function of the radio bearer is activated. For example, if the network device needs to activate the PDCP duplication transmission function of the radio bearer, the network device may also determine the association relationship that is between a carrier and a remaining activated logical channel of the radio bearer and that is after the PDCP duplication transmission function of the radio bearer is activated. Therefore, the network device may select a corresponding identifier from a preset correspondence between an identifier and an association relationship, and an association relationship indicated by the identifier is the association relationship that is between a carrier and a remaining activated logical channel of the radio bearer and that is after the PDCP duplication transmission function of the radio bearer is activated. In this case, the remaining activated logical channel of the radio bearer may be all logical channels of the radio bearer.

In the first implementation of the identifier, one or more identifiers may be set for one logical channel, and each identifier corresponds to one association relationship between a carrier and the logical channel. In this case, if only one identifier is set for one logical channel, there is only one association relationship between the logical channel and a carrier. If a plurality of identifiers are set for one logical channel, there may be a plurality of association relationships between the logical channel and carriers. One or more identifiers may be set for each logical channel of the radio bearer. This means that one or more association relationships may be set for each logical channel. Quantities of association relationships set for different logical channels may be the same or different.

For example, three identifiers may be preset for a logical channel 1 of a radio bearer, and the three identifiers correspond to three association relationships. For example, the association relationships corresponding to the logical channel 1 may be implemented by using a list, as shown below in Table 1.

TABLE 1

| Identifier | ID of a carrier (cell) associated with the logical channel 1 |
|---|---|
| 1 | Carrier (cell) 2 and carrier (cell) 3 |
| 2 | Carrier (cell) 4 and carrier (cell) 5 |
| 3 | Carrier (cell) 1 |

For example, in Table 1, an association relationship corresponding to the identifier 1 is an association relationship between the logical channel 1 and the carriers 2 and 3. Certainly, the content included in Table 1 is merely an example. In addition, an association relationship corresponding to a logical channel is not limited to being implemented by using a list.

In the second implementation of the identifier, one or more identifiers may be set for all logical channels of one radio bearer, in other words, one or more identifiers are set for one radio bearer, where one identifier corresponds to one association relationship between carriers and all the logical channels of the radio bearer. In this case, if only one identifier is set for one radio bearer, there is only one association relationship between carriers and all logical channels of the radio bearer. If a plurality of identifiers are set for one radio bearer, there may be a plurality of association relationships between carriers and all logical channels of the radio bearer.

For example, one radio bearer includes a logical channel 1, a logical channel 2, and a logical channel 3, and two identifiers may be preset for the three logical channels. The two identifiers correspond to two association relationships, to be specific, the two identifiers correspond to two association relationships between the logical channel 1 and carriers, two association relationships between the logical channel 2 and carriers, and two association relationships between the logical channel 3 and carriers. For example, the association relationships corresponding to all the logical channels of the radio bearer may be implemented by using a list, as shown below in Table 2.

TABLE 2

| Identifier | ID of a carrier associated with the logical channel 1 | ID of a carrier associated with the logical channel 2 | ID of a carrier associated with the logical channel 3 |
| --- | --- | --- | --- |
| 1 | Carrier 2 and carrier 3 | Carrier 4 and carrier 5 | Carrier 1 |
| 2 | Carrier 4 and carrier 5 | Carrier 2 and carrier 3 | Carrier 6 |

For example, in Table 2, association relationships corresponding to the identifier 1 are an association relationship between the logical channel 1 and the carriers 2 and 3, an association relationship between the logical channel 2 and the carriers 4 and 5, and an association relationship between the logical channel 3 and the carrier 1. Certainly, the content included in Table 2 is merely an example. In addition, an association relationship corresponding to all logical channels of one radio bearer is not limited to being implemented by using a list.

If the foregoing first implementation of the identifier is used, that is, one or more identifiers are set for each logical channel of one radio bearer, when determining to activate or deactivate the first logical channel (or when determining to activate the PDCP duplication transmission function of the radio bearer), the network device may also determine at least one identifier, where the at least one identifier is in a one-to-one correspondence with the remaining activated logical channel. In the first implementation of the identifier, the network device may only need to determine an identifier corresponding to an activated logical channel, and does not need to determine an identifier corresponding to a deactivated logical channel. In addition, the identifier is in a one-to-one correspondence with the logical channel, so that an indication is relatively definite. Further, if the first logical channel is activated or deactivated, after the first logical channel is deactivated or activated, in the remaining activated logical channels of the radio bearer, association relationships between carriers and some logical channels may have changed, and association relationships between carriers and some logical channels do not change. In this case, the network device may alternatively determine only an identifier corresponding to a logical channel whose association relationship with a carrier has changed. In this way, an indication can be definite, and signaling overheads can be reduced.

For example, one radio bearer corresponds to three logical channels that are a logical channel 1, a logical channel 2, and a logical channel 3, and a correspondence between an identifier and an association relationship is pre-specified in a protocol. The correspondence is specifically: the logical channel 1 corresponds to an identifier 1, the logical channel 2 corresponds to an identifier 2 and an identifier 3, and the logical channel 3 corresponds to an identifier 4 and an identifier 5. At a specific moment, if the network device determines to deactivate the logical channel 2, the network device may also determine an association relationship between the logical channel 1 and a carrier and an association relationship between the logical channel 3 and a carrier that are after the logical channel 2 is deactivated, and determine corresponding identifiers. For example, the identifiers determined by the network device include the identifier 1 of the logical channel 1 and the identifier 4 of the logical channel 3. Alternatively, if an association relationship between the logical channel 1 and a carrier does not change, and only an association relationship between the logical channel 3 and a carrier has changed, the network device only needs to determine the identifier 4, and does not need to determine the identifier 1.

For another example, still using the foregoing example, after the logical channel 2 is deactivated, the network device further determines to activate the logical channel 2. In this case, the network device may determine an association relationship between the logical channel 1 and a carrier, an association relationship between the logical channel 2 and a carrier, and an association relationship between the logical channel 3 and a carrier that are after the logical channel 2 is activated, and determine corresponding identifiers. For example, the identifiers determined by the network device include the identifier 1 of the logical channel 1, the identifier 3 of the logical channel 2, and the identifier 4 of the logical channel 3. Before the logical channel 2 is deactivated, a corresponding identifier may be the identifier 3 or the identifier 2. This is not specifically limited.

Alternatively, if the foregoing second implementation of the identifier is used, that is, one or more identifiers are set for one radio bearer, when determining to activate or deactivate the first logical channel (or when determining to activate the PDCP duplication transmission function of the radio bearer), the network device may also determine one identifier, where the identifier may indicate the association relationship between a carrier and each of a remaining activated logical channel of the radio bearer. In this case, because one identifier may correspond to all logical channels of one radio bearer, the network device indicates one identifier to the terminal device. If the network device activates or deactivates the first logical channel, some logical channels corresponding to the identifier may be deactivated logical channels. In this case, the terminal device directly ignores association relationships between carriers and these logical channels corresponding to the identifier, and only needs to set an association relationship between a carrier and an activated logical channel based on an indication of the identifier. In the second implementation of the identifier, the network device only needs to send one identifier to indicate association relationships between carriers and all logical channels. Relatively much content is indicated by using relatively little information, so that information utilization is relatively high, and signaling overheads are reduced.

For example, one radio bearer corresponds to three logical channels that are a logical channel 1, a logical channel 2, and a logical channel 3, and a correspondence between an identifier and an association relationship is pre-specified in a protocol. The correspondence is specifically a correspondence between an identifier 1 and an association relationship and a correspondence between an identifier 2 and an association relationship. For example, refer to Table 2. At a specific moment, if the network device determines to deactivate the logical channel 2, the network device may also determine an association relationship between the logical channel 1 and a carrier and an association relationship between the logical channel 3 and a carrier that are after the logical channel 2 is deactivated, and determine a corresponding identifier. For example, the identifier determined by the network device is the identifier 2 in Table 2. It can be learned that the logical channel 2 corresponding to the identifier 2 is a deactivated logical channel. In this case, the terminal device directly ignores the association relationship that is between the logical channel 2 and a carrier and that corresponds to the identifier, and only needs to set the association relationship between the logical channel 1 and a carrier and the association relationship between the logical channel 3 and a carrier based on an indication of the identifier.

For another example, still using the foregoing example, after the logical channel 2 is deactivated, the network device further determines to activate the logical channel 2. In this case, the network device may determine an association relationship between the logical channel 1 and a carrier, an association relationship between the logical channel 2 and a carrier, and an association relationship between the logical channel 3 and a carrier that are after the logical channel 2 is activated, and determine a corresponding identifier. For example, the identifier determined by the network device is the identifier 1. Before the logical channel 2 is deactivated, a corresponding identifier may be the identifier 2 or the identifier 1. This is not specifically limited.

S102: The network device sends first signaling to the terminal device, and the terminal device receives the first signaling from the network device, where the first signaling indicates to activate or deactivate the first logical channel, and the first signaling further indicates the association relationship that is between a carrier and each of a remaining activated logical channel of the radio bearer and that is after the first logical channel is activated or deactivated. If the PDCP duplication transmission function of the radio bearer has not been activated before, the first signaling may be used to indicate that the PDCP duplication transmission function of the radio bearer is activated. Alternatively, if the PDCP duplication transmission function of the radio bearer has been activated before, the first signaling may indicate that the PDCP duplication transmission function of the radio bearer is deactivated, or may indicate that the first logical channel of the radio bearer is activated or deactivated.

If the network device directly sends the first signaling including the association relationship between a carrier and a remaining activated logical channel of the radio bearer to the terminal device, in other words, the network device does not send the identifier to the terminal device, the terminal device does not need to search for the correspondence between an identifier and an association relationship, but may directly determine the association relationship between a carrier and a remaining activated logical channel of the radio bearer based on the first signaling. In this manner, the terminal device obtains information more directly.

The network device may send the association relationship between a carrier and each remaining activated logical channel to the terminal device. Alternatively, for the remaining activated logical channels of the radio bearer, an association relationship that is between a carrier and a logical channel and that is after the first logical channel is activated or deactivated is the same as that before the first logical channel is activated or deactivated. In this case, the network device may send, to the terminal device, only an association relationship between a carrier and a logical channel whose association relationship with a carrier has changed, and may not send, to the terminal device, the association relationship between a carrier and a logical channel whose association relationship with a carrier does not change. In this way, an indication can be definite, and signaling overheads can be reduced.

Alternatively, if the network device sends the first signaling including the identifier to the terminal device, and the identifier is used to indicate the association relationship that is between a carrier and each of a remaining activated logical channel of the radio bearer and that is after the first logical channel is activated or deactivated, the terminal device may determine, based on the identifier, the association relationship that is between a carrier and each of a remaining activated logical channel of the radio bearer and that is after the first logical channel is activated or deactivated.

For example, after determining to activate the PDCP duplication transmission function of the radio bearer, the network device may send the first signaling to the terminal device, to indicate to activate the PDCP duplication transmission function of the radio bearer. The first signaling may carry the association relationship between a carrier and a remaining activated logical channel of the radio bearer, or may carry the identifier.

Alternatively, if the network device sends the first signaling to the terminal device after determining to deactivate the PDCP duplication transmission function of the radio bearer, the first signaling may not carry the identifier, and not directly carry the association relationship between a carrier and a remaining activated logical channel of the radio bearer either. This is because: In this case, all the logical channels of the radio bearer are in an inactivated state, and therefore an association relationship between a carrier and an activated logical channel does not need to be indicated.

Alternatively, after determining to activate or deactivate the first logical channel, the network device may send the first signaling to the terminal device, to indicate to activate or deactivate the first logical channel. The first signaling may carry the association relationship between a carrier and a remaining activated logical channel of the radio bearer, or may carry the identifier.

S102 uses an example in which the network device sends the first signaling including the identifier. Alternatively, in another implementation, the network device does not include the identifier in the first signaling, but separately sends the identifier by using other signaling. For example, the network device sends the identifier by using second signaling. In addition, if the network device sends the identifier by using the second signaling, the network device may first send the first signaling and then send the second signaling, or first send the second signaling and then send the first signaling, or simultaneously send the first signaling and the second signaling.

It can be learned from the descriptions in S101 that if the foregoing first implementation of the identifier is used, a quantity of identifiers carried in the first signaling may be equal to a quantity of remaining activated logical channels of the radio bearer. This may be understood as that the identifier carried in the first signaling is in a one-to-one correspondence with the remaining activated logical channel of the radio bearer. Alternatively, if the foregoing first implementation of the identifier is used, a quantity of identifiers carried in the first signaling may be less than a quantity of remaining activated logical channels of the radio bearer. For example, the first signaling carries only an identifier corresponding to a logical channel whose association relationship with a carrier has changed. However, if the foregoing second implementation of the identifier is used, a quantity of identifiers carried in the first signaling may be 1, and the identifier may indicate the association relationship between a carrier and each logical channel of the radio bearer.

If the first signaling indicates to activate the PDCP duplication transmission function of the radio bearer, the remaining activated logical channel of the radio bearer may be all logical channels of the radio bearer that are in an activated state after the PDCP duplication transmission function of the radio bearer is activated. Alternatively, if the first signaling indicates to deactivate the PDCP duplication transmission function of the radio bearer, a quantity of remaining activated logical channels of the radio bearer should be 0, in other words, all the logical channels of the radio bearer are deactivated. Alternatively, if the first signaling indicates to activate or deactivate the first logical channel of the radio bearer, the remaining activated logical channel of the radio bearer may be a remaining logical channel that is of the radio bearer and that is in the activated state after the first logical channel is activated or deactivated.

The first signaling is, for example, DCI, a MAC CE, RRC signaling, an RLC control PDU, or a PDCP control PDU. This is not specifically limited, provided that the first signaling indicates to deactivate the first logical channel.

The RLC control PDU is an RLC PDU different from an RLC data PDU, and is distinguished from the RLC data PDU by using indication information of a header. Usually, the RLC control PDU is used to transmit control information or feedback information of an RLC layer, and in this embodiment of this application, may be used to transmit control information related to the PDCP duplication transmission function, where the control information includes an activation/deactivation indication, and the like.

The PDCP control PDU is a PDCP PDU different from a PDCP data PDU, and is distinguished from the PDCP data PDU by using indication information of a header. Usually, the PDCP control PDU is used to transmit control information or feedback information of a PDCP layer, and in this embodiment of this application, may be used to transmit control information related to the PDCP duplication transmission function, where the control information includes an activation/deactivation indication, and the like.

S103: The terminal device determines the association relationship between a carrier and a remaining activated logical channel of the radio bearer based on the first signaling, where the radio bearer is the radio bearer to which the first logical channel belongs, and the PDCP duplication transmission function is configured for the radio bearer. That the terminal device determines the association relationship between a carrier and a remaining activated logical channel of the radio bearer based on the first signaling may alternatively be that the terminal device sets the association relationship between a carrier and a remaining activated logical channel of the radio bearer based on the first signaling. In other words, the terminal device may first determine a corresponding association relationship, and then set the corresponding association relationship. Alternatively, the terminal device may directly set a corresponding association relationship without performing a step of "determining" the corresponding association relationship. In the following description process, an example in which the terminal device determines the association relationship between a carrier and a remaining activated logical channel of the radio bearer based on the first signaling is used.

If the first signaling does not carry the identifier, but carries the association relationship between a carrier and a remaining activated logical channel of the radio bearer, the terminal device may directly determine the association relationship between a carrier and a remaining activated logical channel of the radio bearer based on the first signaling. Alternatively, if the first signaling carries the identifier, the terminal device may determine the association relationship between a carrier and a remaining activated logical channel of the radio bearer based on the identifier, without searching for the correspondence between an identifier and an association relationship. This is relatively simple. If the network device sends the association relationship between a carrier and each remaining activated logical channel, the terminal device may obtain the association relationship between a carrier and each remaining activated logical channel from the first signaling. Alternatively, if the network device sends an association relationship between a carrier and a part of the remaining activated logical channels, for example, sends an association relationship between a carrier and a logical channel whose association relationship with a carrier has changed, the terminal device may obtain the association relationship between a carrier and a part of the remaining activated logical channels from the first signaling. If the terminal device obtains the association relationship between a carrier and a part of the remaining activated logical channels from the first signaling, for the other part of the remaining activated logical channels (namely, logical channels whose association relationships with carriers are not carried in the first signaling), the terminal device may determine that original association relationships between carriers and these logical channels can still apply.

If a quantity of identifiers carried in the first signaling is 1, the terminal device may determine association relationships between carriers and all the remaining activated logical channels of the radio bearer based on the identifier. The quantity of remaining activated logical channels of the radio bearer may be 1 or may be greater than 1. If the quantity of remaining activated logical channels of the radio bearer is greater than 1, it indicates that the first implementation of the identifier is used. If the quantity of remaining activated logical channels of the radio bearer is 1, it indicates that the first implementation of the identifier or the second implementation of the identifier is used. In short, the terminal device may determine, based on one identifier, the association relationships between carriers and all the remaining activated logical channels of the radio bearer.

For example, one radio bearer corresponds to three logical channels that are a logical channel 1, a logical channel 2, and a logical channel 3, and a correspondence between an identifier and an association relationship is pre-specified in a protocol. The correspondence specifically includes a correspondence between an identifier 1 and an association relationship and a correspondence between an identifier 2 and an association relationship. For example, refer to Table 2. At a specific moment, if the network device determines to deactivate the logical channel 2, the network device may also determine an association relationship between the logical channel 1 and a carrier and an association relationship between the logical channel 3 and a carrier that are after the logical channel 2 is deactivated, and determine a corresponding identifier. For example, the identifier determined by the network device is the identifier 2 in Table 2. The first signaling sent by the network device carries the identifier 2, and the terminal device may determine, based on Table 2, the association relationship between the logical channel 1 and a carrier and the association relationship between the logical channel 3 and a carrier that correspond to the identifier 2. Because the logical channel 2 is a deactivated logical channel, the terminal device directly ignores the association relationship that is between the logical channel 2 and a carrier and that corresponds to the identifier 2.

Alternatively, if the quantity of identifiers carried in the first signaling is greater than 1, the terminal device may determine association relationships between carriers and all or some of the remaining activated logical channels of the radio bearer based on the identifiers. The terminal device may determine the association relationship between a carrier and each remaining activated logical channel of the radio bearer based on the identifiers carried in the first signaling. In other words, the identifiers carried in the first signaling are in a one-to-one correspondence with the remaining activated logical channels of the radio bearer. Alternatively, the terminal device may determine the association relationships between carriers and some of the remaining activated logical channels of the radio bearer based on the identifiers carried in the first signaling, and the first signaling does not carry corresponding identifiers for the other part of the remaining activated logical channels of the radio bearer. The terminal device may determine that association relationships between carriers and these activated logical channels do not change. That the quantity of identifiers carried in the first signaling is greater than 1 indicates that the first implementation of the identifier is used.

For example, one radio bearer corresponds to three logical channels that are a logical channel 1, a logical channel 2, and a logical channel 3, and a correspondence between an identifier and an association relationship is pre-specified in a protocol. The correspondence is specifically: the logical channel 1 corresponds to an identifier 1, the logical channel 2 corresponds to an identifier 2 and an identifier 3, and the logical channel 3 corresponds to an identifier 4 and an identifier 5. At a specific moment, if the network device determines to deactivate the logical channel 2, the network device may also determine an association relationship between the logical channel 1 and a carrier and an association relationship between the logical channel 3 and a carrier that are after the logical channel 2 is deactivated, and determine corresponding identifiers. For example, the identifiers determined by the network device include the identifier 1 of the logical channel 1 and the identifier 4 of the logical channel 3. In this case, the first signaling sent by the network device carries the identifier 1 and the identifier 4, and the terminal device may determine, based on the correspondence, the association relationship that is between the logical channel 1 and a carrier and that corresponds to the identifier 2 and the association relationship that is between the logical channel 3 and a carrier and that corresponds to the identifier 4. Alternatively, if an association relationship between the logical channel 1 and a carrier does not change, and only an association relationship between the logical channel 3 and a carrier has changed, the network device only needs to determine the identifier 4, and does not need to determine the identifier 1. The first signaling sent by the network device carries the identifier 4. The terminal device may determine, based on the correspondence, the association relationship that is between the logical channel 3 and a carrier and that corresponds to the identifier 4, and the terminal device may determine that the association relationship between the logical channel 1 and a carrier does not change.

In this embodiment of this application, the network device may explicitly indicate an association relationship between a carrier and a logical channel by using the identifier, to reduce a possibility that an error occurs in a PDCP duplication transmission process, and an indication manner is relatively definite. In addition, in this manner of changing an association relationship between a carrier and a logical channel, an association relationship may be re-established between a logical channel and a carrier that had an association relationship with another logical channel that has been deactivated, so that these carriers are used, thereby helping improve a system capacity.

Figure 11:
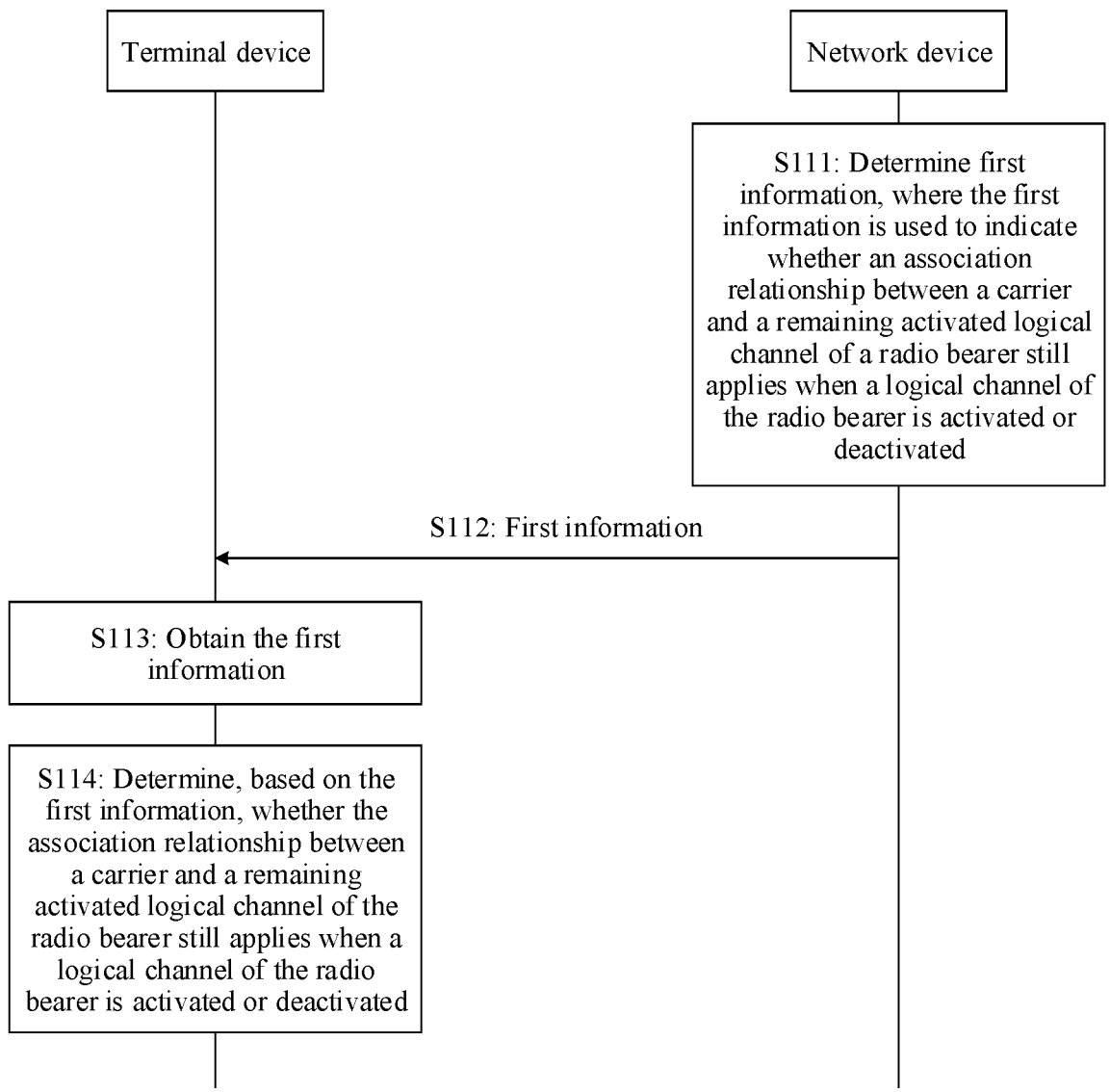
FIG. 11 is a flowchart of a third communication method according to an embodiment of this application.

To resolve the same technical problem, an embodiment of this application provides a third communication method. FIG. 11 is a flowchart of the method. In the following description process, an example in which the method is applied to the network architecture shown in FIG. 6 or FIG. 7 is used. In addition, the method may be performed by two communication apparatuses. The two communication apparatuses are, for example, a fifth communication apparatus and a sixth communication apparatus. The fifth communication apparatus may be a network device or a communication apparatus that can support the network device in implementing a function required for the method, or the fifth communication apparatus may be a terminal device or a communication apparatus that can support the terminal device in implementing a function required for the method. Certainly, the fifth communication apparatus may alternatively be another communication apparatus, for example, a chip system. Similarly, the sixth communication apparatus may be a network device or a communication apparatus that can support the network device in implementing a function required for the method, or the sixth communication apparatus may be a terminal device or a communication apparatus that can support the terminal device in implementing a function required for the method. Certainly, the sixth communication apparatus may alternatively be another communication apparatus, for example, a chip system. In addition, implementations of the fifth communication apparatus and the sixth communication apparatus are not limited. For example, the fifth communication apparatus may be a network device, and the sixth communication apparatus is a terminal device; or both the fifth communication apparatus and the sixth communication apparatus are network devices; or both the fifth communication apparatus and the sixth communication apparatus are terminal devices; or the fifth communication apparatus is a network device, and the sixth communication apparatus is a communication apparatus that can support a terminal device in implementing a function required for the method. The network device is, for example, a base station.

For ease of description, the following uses an example in which the method is performed by a network device and a terminal device. In other words, an example in which the fifth communication apparatus is a network device and the sixth communication apparatus is a terminal device is used. If this embodiment is applied to the network architecture shown in FIG. 6, the following network device may be the network device in the network architecture shown in FIG. 6, and the following terminal device may be the terminal device in the network architecture shown in FIG. 6. Alternatively, if this embodiment is applied to the network architecture shown in FIG. 7, the following network device may be the first network device or the second network device in the network architecture shown in FIG. 7, and the following terminal device may be the terminal device in the network architecture shown in FIG. 7. In the following descriptions, an example in which this embodiment is applied to the network architecture shown in FIG. 7 is mainly used.

S111: The network device determines first information, where the first information is used to indicate whether an association relationship between a carrier and a remaining activated logical channel of a radio bearer still applies when a logical channel of the radio bearer is activated or deactivated, where a PDCP duplication transmission function is configured for the radio bearer.

A PDCP entity of the radio bearer may be associated with at least two RLC entities, and the at least two RLC entities are configured to perform the PDCP duplication transmission function.

That the PDCP duplication transmission function is configured for the radio bearer may be understood as: When a quantity of activated logical channels of the radio bearer is greater than or equal to 2, a data packet of the radio bearer is duplicated at a PDCP layer to obtain at least two copies of data packets, and the at least two copies of data packets are separately transmitted on the at least two logical channels, in other words, identical duplicated data packets are transmitted on the at least two logical channels. Each of the at least two logical channels may be used to transmit one data packet, in other words, the at least two logical channels are used to transmit at least two data packets. In the at least two data packets, one data packet may be an original data packet, and another data packet is a data packet obtained after the original data packet is duplicated. In short, the at least two data packets are collectively referred to as duplicated data packets, or referred to as data packets duplicated at the PDCP layer. The following "duplicated data packet" or "data packet duplicated at the PDCP layer" is understood in the same manner.

In this embodiment of this application, the radio bearer may correspond to one MAC entity, or may correspond to a plurality of MAC entities. If the radio bearer corresponds to a plurality of MAC entities, the first information may indicate whether the association relationship between a carrier and a remaining activated logical channel of the radio bearer still applies when a logical channel of the radio bearer is activated or deactivated. In this case, the MAC entities are not distinguished, and the first information indicates whether association relationships between carriers and activated logical channels of all the MAC entities still apply. Alternatively, if the radio bearer corresponds to a plurality of MAC entities, the first information may indicate whether an association relationship between a carrier and a remaining activated logical channel of a MAC entity (for example, referred to as a first MAC entity) of the radio bearer still applies when a logical channel of the first MAC entity is activated or deactivated, in other words, the first information indicates a case of one MAC entity.

For one MAC entity, whether an association relationship between a carrier and a remaining activated logical channel still applies may alternatively be related to a quantity of remaining activated logical channels. Therefore, if one piece of first information indicates a case of the first MAC entity, the first information may indicate: when a logical channel of the first MAC entity corresponding to the radio bearer is activated or deactivated and a quantity of remaining activated logical channels of the first MAC entity is 1, whether an association relationship between a carrier and each of the remaining activated logical channel still applies; or the first information may indicate: when a logical channel of the first MAC entity corresponding to the radio bearer is activated or deactivated and a quantity of remaining activated logical channels of the first MAC entity is greater than 1, whether an association relationship between a carrier and each of the remaining activated logical channels still applies; or the first information may indicate: when a logical channel of the first MAC entity corresponding to the radio bearer is activated or deactivated and a quantity of remaining activated logical channels of the first MAC entity is greater than or equal to 1, whether an association relationship between a carrier and each of the remaining activated logical channel still applies.

In addition, specific logical channels that are activated or deactivated are not distinguished herein, the first information provides only an indirect indication, and whether an association relationship between a carrier and a remaining activated logical channel of the radio bearer or a MAC entity of the radio bearer still applies may be indicated by using the first information regardless of which logical channel or logical channels is/are activated or deactivated. In this case, when the network device determines the first information, a logical channel of the radio bearer may have been deactivated. Alternatively, when the network device determines the first information, all the logical channels of the radio bearer are in an initially activated state, and no logical channel is deactivated. Alternatively, when the network device determines the first information, a logical channel in the logical channels of the radio bearer is deactivated and then activated. Alternatively, the network device determines the first information when determining to activate or deactivate a logical channel of the radio bearer.

This is not specifically limited.

For example, an architecture of a radio bearer is shown in FIG. 5. The network device may determine the first information, where the first information may indicate that the association relationship between a carrier and a remaining activated logical channel of the first MAC entity still applies or does not apply when a logical channel of the first MAC entity of the radio bearer is activated or deactivated and the quantity of remaining activated logical channels of the first MAC entity is 1. The first MAC entity may be a MAC entity 1 or a MAC entity 2 shown in FIG. 5, and the activated or deactivated logical channel may be one or more of a logical channel 1 to a logical channel 4 shown in FIG. 5. For example, the first information indicates: when a logical channel of the first MAC entity of the radio bearer is activated or deactivated and the quantity of remaining activated logical channels of the first MAC entity is 1, the association relationship between a carrier and a remaining activated logical channel of the first MAC entity does not apply. In this case, for example, if the logical channel 1 of the MAC entity 1 is deactivated, a quantity of remaining activated logical channels of the MAC entity 1 is 1, and the terminal device may determine that an association relationship between a carrier and the remaining activated logical channel of the MAC entity 1 does not apply, and all carriers of the MAC entity 1 may be used for the logical channel 2.

For another example, an architecture of a radio bearer is shown in FIG. 9. The network device may determine the first information, and the first information may indicate that the association relationship between a carrier and a remaining activated logical channel of the first MAC entity still applies or does not apply when a logical channel of the first MAC entity of the radio bearer is activated or deactivated and the quantity of remaining activated logical channels of the first MAC entity is 1, and indicate that the association relationship between a carrier and a remaining activated logical channel of the first MAC entity still applies or does not apply when a logical channel of the first MAC entity of the radio bearer is activated or deactivated and the quantity of remaining activated logical channels of the first MAC entity is greater than 1. The first MAC entity may be a MAC entity 1 or a MAC entity 2 shown in FIG. 9, and the activated or deactivated logical channel may be one or more of a logical channel 1 to a logical channel 4 shown in FIG. 9. For example, the first information indicates: when a logical channel of the first MAC entity of the radio bearer is activated or deactivated and the quantity of remaining activated logical channels of the first MAC entity is greater than 1, the association relationship between a carrier and a remaining activated logical channel of the first MAC entity still applies. In this case, for example, if the logical channel 1 of the MAC entity 1 is deactivated, a quantity of remaining activated logical channels of the MAC entity 1 is 2, and the terminal device may determine that association relationships between carriers and the remaining activated logical channels of the MAC entity 1 still apply.

S112: The network device sends the first information to the terminal device, and the terminal device receives the first information from the network device.

After determining the first information, the network device may send the first information to the terminal device.

For example, the network device may send the first information to the terminal device when activating or deactivating a logical channel of the radio bearer. For example, the network device sends first signaling to the terminal device, where the first signaling carries the first information, and the first signaling is used to activate or deactivate one or more logical channels of the radio bearer.

The first signaling is, for example, DCI, a MAC CE, RRC signaling, an RLC control PDU, or a PDCP control PDU. This is not specifically limited, provided that the first signaling indicates to deactivate the first logical channel.

The RLC control PDU is an RLC PDU different from an RLC data PDU, and is distinguished from the RLC data PDU by using indication information of a header. Usually, the RLC control PDU is used to transmit control information or feedback information of an RLC layer, and in this embodiment of this application, may be used to transmit control information related to the PDCP duplication transmission function, where the control information includes an activation/deactivation indication, and the like.

The PDCP control PDU is a PDCP PDU different from a PDCP data PDU, and is distinguished from the PDCP data PDU by using indication information of a header. Usually, the PDCP control PDU is used to transmit control information or feedback information of a PDCP layer, and in this embodiment of this application, may be used to transmit control information related to the PDCP duplication transmission function, where the control information includes an activation/deactivation indication, and the like.

Alternatively, the network device may specially send the first information to the terminal device, and does not need to send the first information to the terminal device when activating or deactivating a logical channel.

S113: The terminal device obtains the first information.

The terminal device may receive the first information from the network device, and that the terminal device receives the first information may be considered as that the terminal device obtains the first information. In this case, S112 and S113 may be a same step.

Alternatively, the first information may be specified in a protocol or preconfigured in the terminal device. The network device does not need to send the first information to the terminal device. In this case, that the terminal device determines the first information according to the protocol or the terminal device obtains the preconfigured first information may be considered as that the terminal device obtains the first information. In this case, S111 and S112 may not be performed.

S114: The terminal device determines, based on the first information, whether the association relationship between a carrier and a remaining activated logical channel of the radio bearer still applies when a logical channel of the radio bearer is activated or deactivated, where the PDCP duplication transmission function is configured for the radio bearer.

For example, an architecture of a radio bearer is shown in FIG. 5. The first information indicates: when a logical channel of the first MAC entity of the radio bearer is activated or deactivated and the quantity of remaining activated logical channels of the first MAC entity is 1, the association relationship between a carrier and a remaining activated logical channel of the first MAC entity does not apply. For example, the network device sends the first signaling including the first information, and the first signaling indicates to deactivate the logical channel 1 of the MAC entity 1. In this case, the quantity of remaining activated logical channels of the MAC entity 1 is 1, and the terminal device may determine that the association relationship between a carrier and the remaining activated logical channel of the MAC entity 1 does not apply, in other words, the terminal device determines that all carriers of the first MAC entity may be used for the logical channel 2.

For another example, an architecture of a radio bearer is shown in FIG. 9. The first information indicates: when a logical channel of the first MAC entity of the radio bearer is activated or deactivated and the quantity of remaining activated logical channels of the first MAC entity is greater than 1, the association relationship between a carrier and a remaining activated logical channel of the first MAC entity still applies. For example, the first information is specified in a protocol. In this case, if the logical channel 1 of the MAC entity 1 is deactivated, the quantity of remaining activated logical channels of the MAC entity 1 is 2, and the terminal device may determine that the association relationships between carriers and the remaining activated logical channels of the MAC entity 1 still apply, in other words, the terminal device may determine that an association relationship between the logical channel 2 and a carrier still applies, and determine that an association relationship between the logical channel 3 and a carrier still applies.

In this embodiment of this application, whether an association relationship between a carrier and a logical channel still applies may be explicitly indicated by using the first information, to reduce a possibility that an error occurs in a PDCP duplication transmission process, and an indication manner is relatively definite. In addition, if a logical channel of the first MAC entity of the radio bearer is activated or deactivated, and the quantity of remaining activated logical channels of the first MAC entity is 1, the association relationship between a carrier and the remaining activated logical channel of the first MAC entity may not apply. In this manner, an association relationship may be re-established between a logical channel and a carrier that had an association relationship with another logical channel that has been deactivated, so that these carriers are used, thereby helping improve a system capacity.

The following describes, with reference to the accompanying drawings, apparatuses configured to implement the foregoing methods in the embodiments of this application. Therefore, all the foregoing content may be used in subsequent embodiments, and repeated content is not described again.

Figure 12:
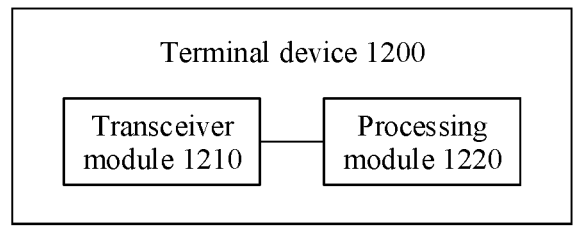
FIG. 12 is a schematic block diagram of a first terminal device according to an embodiment of this application.

FIG. 12 is a schematic block diagram of a communication device 1200 according to an embodiment of this application. For example, the communication device 1200 is a terminal device 1200. The terminal device 1200 includes a processing module 1220 and a transceiver module 1210. The processing module 1220 may be configured to perform all operations, except sending and receiving operations, performed by the terminal device in the embodiment shown in FIG. 8, for example, S83 in the embodiment shown in FIG. 8, and/or configured to support another process of the technology described in this specification. The transceiver module 1210 may be configured to perform all sending and receiving operations performed by the terminal device in the embodiment shown in FIG. 8, for example, S82 in the embodiment shown in FIG. 8, and/or configured to support another process of the technology described in this specification.

The transceiver module 1210 is configured to receive first signaling, where the first signaling is used to indicate to deactivate a first logical channel.

The processing module 1220 is configured to determine, depending on whether a logical channel in an activated state and the first logical channel belong to a same MAC entity, whether an association relationship between a carrier and the logical channel in the activated state applies, where the first logical channel and the logical channel in the activated state belong to a same radio bearer, and a PDCP duplication transmission function is configured for the radio bearer.

In an optional implementation, the processing module 1220 is configured to determine, in the following manner and depending on whether the logical channel in the activated state and the first logical channel belong to the same MAC entity, whether the association relationship between a carrier and the logical channel in the activated state applies:

when a second logical channel in the activated state and the first logical channel belong to a same MAC entity, determining that an association relationship between a carrier and the second logical channel does not apply.

In an optional implementation, the processing module 1220 is further configured to determine that a data packet carried on the second logical channel is capable of being transmitted on a first type of carrier, where the first type of carrier includes all carriers corresponding to the MAC entity, or the first type of carrier includes a carrier that had an association relationship with the first logical channel before the first logical channel is deactivated and a carrier that has an association relationship with the second logical channel.

In an optional implementation, the processing module 1220 is configured to determine, in the following manner and depending on whether the logical channel in the activated state and the first logical channel belong to the same MAC entity, whether the association relationship between a carrier and the logical channel in the activated state applies:

when the logical channel in the activated state and the first logical channel belong to the same MAC entity, and a quantity of logical channels in the activated state is 1, determining that the association relationship between a carrier and the logical channel in the activated state does not apply;

when the logical channel in the activated state and the first logical channel belong to the same MAC entity, and a quantity of logical channels in the activated state is greater than 1, determining that the association relationship between a carrier and the logical channel in the activated state still applies; or when the logical channel in the activated state and the first logical channel belong to the same MAC entity, and a quantity of logical channels in the activated state is greater than 1, determining, based on first information, a carrier used to transmit a data packet carried on the logical channel in the activated state, where the first information is obtained from the first signaling, or the first information is preset information.

In an optional implementation, the processing module 1220 is configured to determine, in the following manner and depending on whether the logical channel in the activated state and the first logical channel belong to the same MAC entity, whether the association relationship between a carrier and the logical channel in the activated state applies:

when the logical channel in the activated state and the first logical channel belong to different MAC entities, determining that the association relationship between a carrier and the logical channel in the activated state still applies.

It should be understood that the processing module 1220 in this embodiment of this application may be implemented by a processor or a processor-related circuit component, and the transceiver module 1210 may be implemented by a transceiver or a transceiver-related circuit component.

Figure 13:
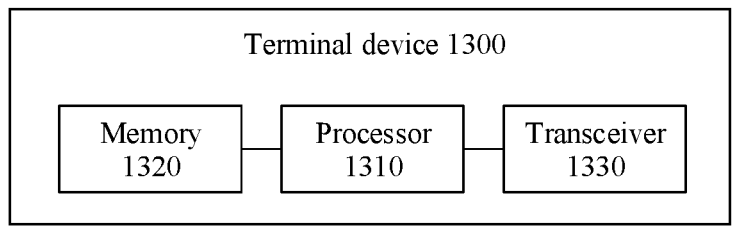
FIG. 13 is another schematic block diagram of a first terminal device according to an embodiment of this application.

As shown in FIG. 13, an embodiment of this application further provides a communication device 1300. For example, the communication device 1300 is a terminal device 1300. The terminal device 1300 includes a processor 1310, a memory 1320, and a transceiver 1330. The memory 1320 stores instructions or a program. The processor 1310 is configured to execute the instructions or the program stored in the memory 1320. When the instructions or the program stored in the memory 1320 are/is executed, the processor 1310 is configured to perform an operation performed by the processing module 1220 in the foregoing embodiment, and the transceiver 1330 is configured to perform an operation performed by the transceiver module 1210 in the foregoing embodiment.

It should be understood that the terminal device 1200 or the terminal device 1300 according to the embodiments of this application may correspond to the terminal device in the embodiment shown in FIG. 8, and operations and/or functions of the modules in the terminal device 1200 or the terminal device 1300 are intended to implement corresponding procedures in the embodiment shown in FIG. 8. For brevity, details are not described herein again.

Figure 14:
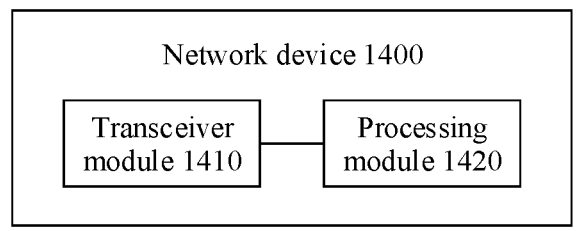
FIG. 14 is a schematic block diagram of a first network device according to an embodiment of this application.

FIG. 14 is a schematic block diagram of a communication device 1400 according to an embodiment of this application. For example, the communication device 1400 is a network device 1400. The network device 1400 includes a processing module 1420 and a transceiver module 1410. The processing module 1420 may be configured to perform all operations, except sending and receiving operations, performed by the network device in the embodiment shown in FIG. 8, for example, S81 in the embodiment shown in FIG. 8, and/or configured to support another process of the technology described in this specification. The transceiver module 1410 may be configured to perform all sending and receiving operations performed by the network device in the embodiment shown in FIG. 8, for example, S82 in the embodiment shown in FIG. 8, and/or configured to support another process of the technology described in this specification.

The processing module 1420 is configured to determine to deactivate a first logical channel.

The transceiver module 1410 is configured to send first signaling to a terminal device, where the first signaling indicates to deactivate the first logical channel, to indicate the terminal device to determine, depending on whether a logical channel in an activated state and the first logical channel belong to a same MAC entity, whether an association relationship between a carrier and the logical channel in the activated state applies.

In an optional implementation, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when a second logical channel in the activated state and the first logical channel belong to a same MAC entity, that an association relationship between a carrier and the second logical channel does not apply.

In an optional implementation, the first signaling further indicates the terminal device to determine that a data packet carried on the second logical channel is capable of being transmitted on a first type of carrier, where the first type of carrier includes all carriers corresponding to the MAC entity, or the first type of carrier includes a carrier that had an association relationship with the first logical channel before the first logical channel is deactivated and a carrier that has an association relationship with the second logical channel.

In an optional implementation, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when the logical channel in the activated state and the first logical channel belong to the same MAC entity, and a quantity of logical channels in the activated state is 1, that the association relationship between a carrier and the logical channel in the activated state does not apply;

the first signaling indicates the terminal device to determine, when the logical channel in the activated state and the first logical channel belong to the same MAC entity, and a quantity of logical channels in the activated state is greater than 1, that the association relationship between a carrier and the logical channel in the activated state still applies; or the first signaling indicates the terminal device to determine, based on first information when the logical channel in the activated state and the first logical channel belong to the same MAC entity, and a quantity of logical channels in the activated state is greater than 1, a carrier used to transmit a data packet carried on the logical channel in the activated state, where the first information is obtained from the first signaling, or the first information is preset information.

In an optional implementation, that the first signaling indicates the terminal device to determine, depending on whether a logical channel in an activated state and the first logical channel belong to a same MAC entity, whether an association relationship between a carrier and the logical channel in the activated state applies includes:

the first signaling indicates the terminal device to determine, when the logical channel in the activated state and the first logical channel belong to different MAC entities, that the association relationship between a carrier and the logical channel in the activated state still applies.

It should be understood that the processing module 1420 in this embodiment of this application may be implemented by a processor or a processor-related circuit component, and the transceiver module 1410 may be implemented by a transceiver or a transceiver-related circuit component.

Figure 15:
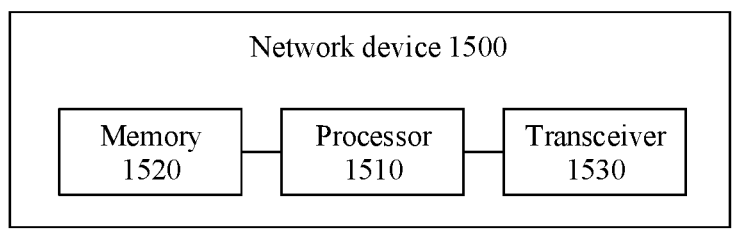
FIG. 15 is another schematic block diagram of a first network device according to an embodiment of this application.

As shown in FIG. 15, an embodiment of this application further provides a communication device 1500. For example, the communication device 1500 is a network device 1500. The network device 1500 includes a processor 1510, a memory 1520, and a transceiver 1530. The memory 1520 stores instructions or a program. The processor 1510 is configured to execute the instructions or the program stored in the memory 1520. When the instructions or the program stored in the memory 1520 are/is executed, the processor 1510 is configured to perform an operation performed by the processing module 1420 in the foregoing embodiment, and the transceiver 1530 is configured to perform an operation performed by the transceiver module 1410 in the foregoing embodiment.

It should be understood that the network device 1400 or the network device 1500 according to the embodiments of this application may correspond to the network device in the embodiment shown in FIG. 8, and operations and/or functions of the modules in the network device 1500 or the network device 1500 are intended to implement corresponding procedures in the embodiment shown in FIG. 8. For brevity, details are not described herein again.

Figure 16:
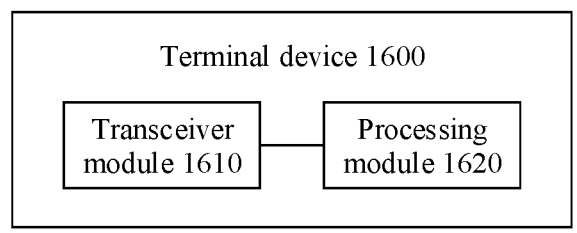
FIG. 16 is a schematic block diagram of a second terminal device according to an embodiment of this application.

FIG. 16 is a schematic block diagram of a communication device 1600 according to an embodiment of this application. For example, the communication device 1600 is a terminal device 1600. The terminal device 1600 includes a processing module 1620 and a transceiver module 1610. The processing module 1620 may be configured to perform all operations, except sending and receiving operations, performed by the terminal device in the embodiment shown in FIG. 10, for example, S103 in the embodiment shown in FIG. 10, and/or configured to support another process of the technology described in this specification. The transceiver module 1610 may be configured to perform all sending and receiving operations performed by the terminal device in the embodiment shown in FIG. 10, for example, S102 in the embodiment shown in FIG. 10, and/or configured to support another process of the technology described in this specification.

The transceiver module 1610 is configured to receive first signaling, where the first signaling indicates to activate or deactivate a first logical channel.

The processing module 1620 is configured to determine an association relationship between a carrier and a remaining activated logical channel of a radio bearer based on the first signaling, where the radio bearer is a radio bearer to which the first logical channel belongs, and a PDCP duplication transmission function is configured for the radio bearer.

In an optional implementation, the first signaling further carries an identifier, and the processing module 1620 is configured to determine the association relationship between a carrier and a remaining activated logical channel of the radio bearer based on the first signaling in the following manner:

determining the association relationship between a carrier and a remaining activated logical channel of the radio bearer based on the identifier.

In an optional implementation, a quantity of identifiers carried in the first signaling is 1, and the identifier is used to indicate an association relationship between a carrier and each logical channel of the radio bearer; or a quantity of identifiers carried in the first signaling is less than or equal to a quantity of remaining activated logical channels of the radio bearer, and one of the identifiers is used to indicate an association relationship between a carrier and one activated logical channel.

In an optional implementation, the transceiver module 1610 is further configured to receive a correspondence between an identifier and a first association relationship, where the first association relationship includes the association relationship between a carrier and each logical channel of the radio bearer, and one identifier is used to indicate an association relationship between a carrier and one logical channel, or one identifier is used to indicate an association relationship between carriers and all logical channels.

Figure 17:
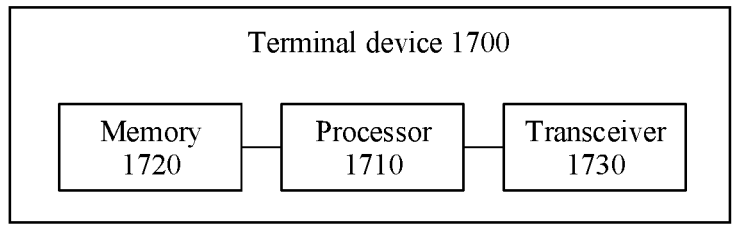
FIG. 17 is another schematic block diagram of a second terminal device according to an embodiment of this application.

As shown in FIG. 17, an embodiment of this application further provides a communication device 1700. For example, the communication device 1700 is a terminal device 1700. The terminal device 1700 includes a processor 1710, a memory 1720, and a transceiver 1730. The memory 1720 stores instructions or a program. The processor 1710 is configured to execute the instructions or the program stored in the memory 1720. When the instructions or the program stored in the memory 1720 are/is executed, the processor 1710 is configured to perform an operation performed by the processing module 1620 in the foregoing embodiment, and the transceiver 1730 is configured to perform an operation performed by the transceiver module 1610 in the foregoing embodiment.

It should be understood that the terminal device 1600 or the terminal device 1700 according to the embodiments of this application may correspond to the terminal device in the embodiment shown in FIG. 10, and operations and/or functions of the modules in the terminal device 1600 or the terminal device 1700 are intended to implement corresponding procedures in the embodiment shown in FIG. 10. For brevity, details are not described herein again.

Figure 18:
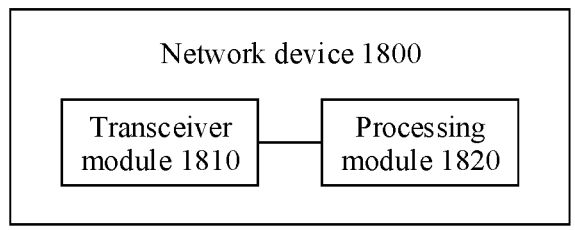
FIG. 18 is a schematic block diagram of a second network device according to an embodiment of this application.

FIG. 18 is a schematic block diagram of a communication device 1800 according to an embodiment of this application. For example, the communication device 1800 is a network device 1800. The network device 1800 includes a processing module 1820 and a transceiver module 1810. The processing module 1820 may be configured to perform all operations, except sending and receiving operations, performed by the network device in the embodiment shown in FIG. 10, for example, S101 in the embodiment shown in FIG. 10, and/or configured to support another process of the technology described in this specification. The transceiver module 1810 may be configured to perform all sending and receiving operations performed by the network device in the embodiment shown in FIG. 10, for example, S102 in the embodiment shown in FIG. 10, and/or configured to support another process of the technology described in this specification.

The processing module 1820 is configured to determine an association relationship that is between a carrier and each of a remaining activated logical channel of a radio bearer and that is after a first logical channel is activated or deactivated, where the radio bearer is a radio bearer to which the first logical channel belongs, and a PDCP duplication transmission function is configured for the radio bearer.

The transceiver module 1810 is configured to send first signaling to a terminal device, where the first signaling indicates to activate or deactivate the first logical channel, and the first signaling is further used to indicate the association relationship that is between a carrier and each of a remaining activated logical channel of the radio bearer and that is after the first logical channel is activated or deactivated.

In an optional implementation, the first signaling further carries an identifier, and the identifier is used to indicate the association relationship that is between a carrier and each of a remaining activated logical channel of the radio bearer and that is after the first logical channel is activated or deactivated.

In an optional implementation, the identifier is used to indicate the association relationship between a carrier and each logical channel of the radio bearer; or the identifier is used to indicate an association relationship between a carrier and one activated logical channel of the radio bearer.

In an optional implementation, the transceiver module 1810 is further configured to send a correspondence between an identifier and a first association relationship to the terminal device, where the first association relationship includes an association relationship between a carrier and a logical channel of the radio bearer, and one identifier is used to indicate an association relationship between a carrier and one logical channel, or one identifier is used to indicate an association relationship between carriers and all logical channels.

It should be understood that the processing module 1820 in this embodiment of this application may be implemented by a processor or a processor-related circuit component, and the transceiver module 1810 may be implemented by a transceiver or a transceiver-related circuit component.

Figure 19:
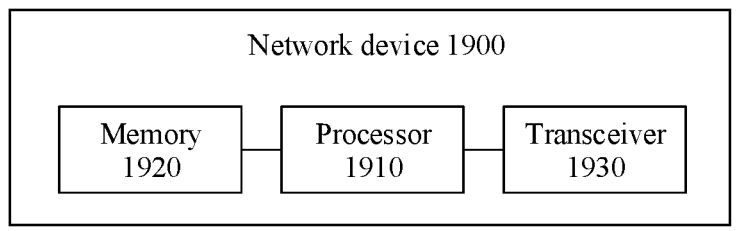
FIG. 19 is another schematic block diagram of a second network device according to an embodiment of this application.

As shown in FIG. 19, an embodiment of this application further provides a communication device 1900. For example, the communication device 1900 is a network device 1900. The network device 1900 includes a processor 1910, a memory 1920, and a transceiver 1930. The memory 1920 stores instructions or a program. The processor 1910 is configured to execute the instructions or the program stored in the memory 1920. When the instructions or the program stored in the memory 1920 are/is executed, the processor 1910 is configured to perform an operation performed by the processing module 1820 in the foregoing embodiment, and the transceiver 1930 is configured to perform an operation performed by the transceiver module 1810 in the foregoing embodiment.

It should be understood that the network device 1800 or the network device 1900 according to the embodiments of this application may correspond to the network device in the embodiment shown in FIG. 10, and operations and/or functions of the modules in the network device 1800 or the network device 1900 are intended to implement corresponding procedures in the embodiment shown in FIG. 10. For brevity, details are not described herein again.

Figure 20:
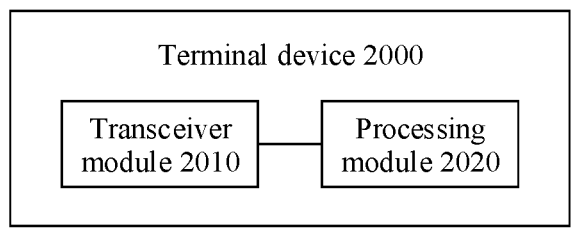
FIG. 20 is a schematic block diagram of a third terminal device according to an embodiment of this application.

FIG. 20 is a schematic block diagram of a communication device 2000 according to an embodiment of this application. For example, the communication device 2000 is a terminal device 2000. The terminal device 2000 includes a processing module 2020 and a transceiver module 2010. The processing module 2020 may be configured to perform all operations, except sending and receiving operations, performed by the terminal device in the embodiment shown in FIG. 11, for example, S113 and S114 in the embodiment shown in FIG. 11, and/or configured to support another process of the technology described in this specification. The transceiver module 2010 may be configured to perform all sending and receiving operations performed by the terminal device in the embodiment shown in FIG. 11, for example, S112 in the embodiment shown in FIG. 11, and/or configured to support another process of the technology described in this specification.

The processing module 2020 is configured to obtain first information.

The processing module 2020 is further configured to determine, based on the first information, whether an association relationship between a carrier and a remaining activated logical channel of a radio bearer still applies when a logical channel of the radio bearer is activated or deactivated, where a PDCP duplication transmission function is configured for the radio bearer.

In an optional implementation, the first information indicates: when a logical channel of a first MAC entity corresponding to the radio bearer is activated or deactivated and a quantity of remaining activated logical channels of the first MAC entity is 1, whether an association relationship between a carrier and the remaining activated logical channel still applies; and/or the first information indicates: when a logical channel of a first MAC entity corresponding to the radio bearer is activated or deactivated and a quantity of remaining activated logical channels of the first MAC entity is greater than 1, whether an association relationship between a carrier and each of the remaining activated logical channels still applies.

It should be understood that the processing module 2020 in this embodiment of this application may be implemented by a processor or a processor-related circuit component, and the transceiver module 2010 may be implemented by a transceiver or a transceiver-related circuit component.

Figure 21:
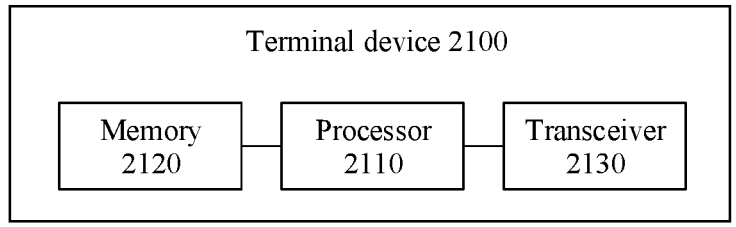
FIG. 21 is another schematic block diagram of a third terminal device according to an embodiment of this application.

As shown in FIG. 21, an embodiment of this application further provides a communication device 2100. For example, the communication device 2100 is a terminal device 2100. The terminal device 2100 includes a processor 2110, a memory 2120, and a transceiver 2130. The memory 2120 stores instructions or a program. The processor 2110 is configured to execute the instructions or the program stored in the memory 2120. When the instructions or the program stored in the memory 2120 are/is executed, the processor 2110 is configured to perform an operation performed by the processing module 2020 in the foregoing embodiment, and the transceiver 2130 is configured to perform an operation performed by the transceiver module 2010 in the foregoing embodiment.

It should be understood that the terminal device 2000 or the terminal device 2100 according to the embodiments of this application may correspond to the terminal device in the embodiment shown in FIG. 10, and operations and/or functions of the modules in the terminal device 2000 or the terminal device 2100 are intended to implement corresponding procedures in the embodiment shown in FIG. 10. For brevity, details are not described herein again.

Figure 22:
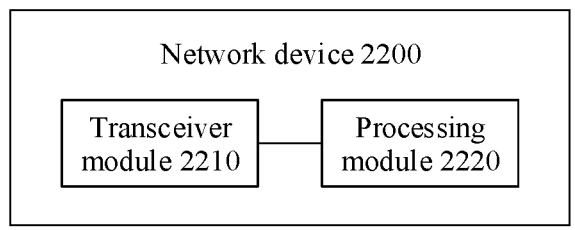
FIG. 22 is a schematic block diagram of a third network device according to an embodiment of this application.

FIG. 22 is a schematic block diagram of a communication device 2200 according to an embodiment of this application. For example, the communication device 2200 is a network device 2200. The network device 2200 includes a processing module 2220 and a transceiver module 2210. The processing module 2220 may be configured to perform all operations, except sending and receiving operations, performed by the network device in the embodiment shown in FIG. 11, for example, S111 in the embodiment shown in FIG. 11, and/or configured to support another process of the technology described in this specification. The transceiver module 2210 may be configured to perform all sending and receiving operations performed by the network device in the embodiment shown in FIG. 11, for example, S112 in the embodiment shown in FIG. 11, and/or configured to support another process of the technology described in this specification.

The processing module 2220 is configured to determine first information, where the first information is used to indicate whether an association relationship between a carrier and a remaining activated logical channel of a radio bearer still applies when a logical channel of the radio bearer is activated or deactivated, where a PDCP duplication transmission function is configured for the radio bearer.

The transceiver module 2210 is configured to send the first information to a terminal device.

In an optional implementation, that the first information is used to indicate whether an association relationship between a carrier and a remaining activated logical channel of a radio bearer still applies when a logical channel of the radio bearer is activated or deactivated includes:

the first information indicates: when a logical channel of a first MAC entity corresponding to the radio bearer is activated or deactivated and a quantity of remaining activated logical channels of the first MAC entity is 1, whether an association relationship between a carrier and each of the remaining activated logical channel still applies; and/or the first information indicates: when a logical channel of a first MAC entity corresponding to the radio bearer is activated or deactivated and a quantity of remaining activated logical channels of the first MAC entity is greater than 1, whether an association relationship between a carrier and each of the remaining activated logical channels still applies.

It should be understood that the processing module 2220 in this embodiment of this application may be implemented by a processor or a processor-related circuit component, and the transceiver module 2210 may be implemented by a transceiver or a transceiver-related circuit component.

Figure 23:
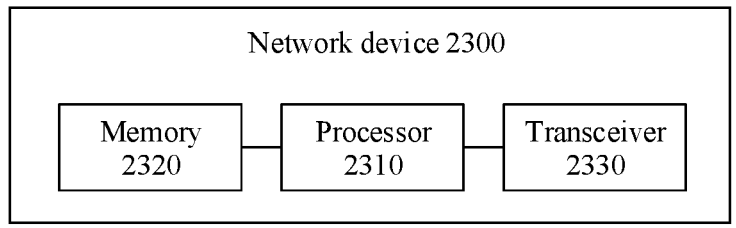
FIG. 23 is another schematic block diagram of a third network device according to an embodiment of this application.

As shown in FIG. 23, an embodiment of this application further provides a communication device 2300. For example, the communication device 2300 is a network device 2300. The network device 2300 includes a processor 2310, a memory 2320, and a transceiver 2330. The memory 2320 stores instructions or a program. The processor 2310 is configured to execute the instructions or the program stored in the memory 2320. When the instructions or the program stored in the memory 2320 are/is executed, the processor 2310 is configured to perform an operation performed by the processing module 2220 in the foregoing embodiment, and the transceiver 2330 is configured to perform an operation performed by the transceiver module 2210 in the foregoing embodiment.

It should be understood that the network device 2200 or the network device 2300 according to the embodiments of this application may correspond to the network device in the embodiment shown in FIG. 11, and operations and/or functions of the modules in the network device 2200 or the network device 2300 are intended to implement corresponding procedures in the embodiment shown in FIG. 11. For brevity, details are not described herein again.

An embodiment of this application further provides a communication apparatus, and the communication apparatus may be a terminal device or a circuit. The communication apparatus may be configured to perform actions performed by the terminal device in the method embodiment shown in FIG. 8, the method embodiment shown in FIG. 10, or the method embodiment shown in FIG. 11.

Figure 24:
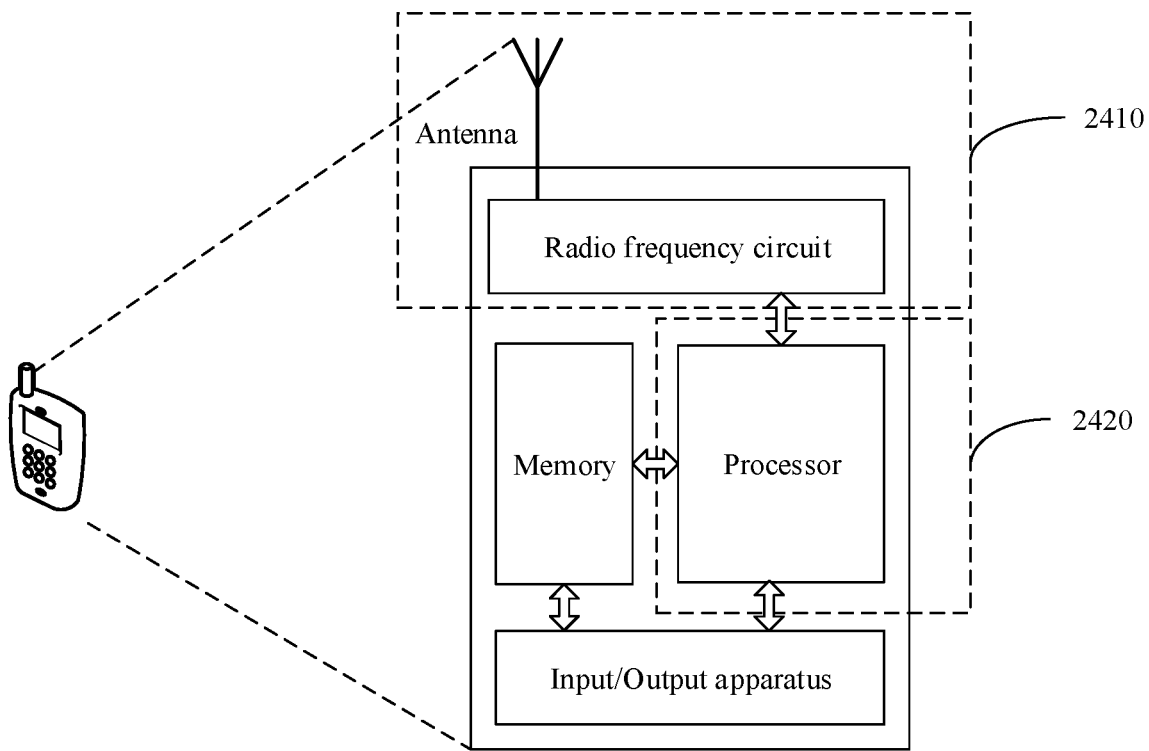
FIG. 24 is a schematic block diagram of a communication apparatus according to an embodiment of this application.

When the communication apparatus is a terminal device, FIG. 24 is a simplified schematic structural diagram of a terminal device. For ease of understanding and illustration, an example in which the terminal device is a mobile phone is used in FIG. 24. As shown in FIG. 24, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive the radio frequency signal in an electromagnetic wave form. The input/output apparatus, for example, a touchscreen, a display, or a keyboard, is mainly configured to receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit. After performing radio frequency processing on the baseband signal, the radio frequency circuit sends a radio frequency signal to the outside in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 24 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device. As shown in FIG. 24, the terminal device includes a transceiver unit 2410 and a processing unit 2420. The transceiver unit may also be referred to as a transceiver, a transceiver apparatus, or the like. The processing unit may also be referred to as a processor, a processing board, a processing module, a processing apparatus, or the like. Optionally, a component for implementing a receiving function in the transceiver unit 2410 may be considered as a receiving unit, and a component for implementing a sending function in the transceiver unit 2410 may be considered as a sending unit. In other words, the transceiver unit 2410 includes the receiving unit and the sending unit. The transceiver unit may also be sometimes referred to as a transceiver, a transceiver circuit, or the like. The receiving unit may also be sometimes referred to as a receiver, a receiver circuit, or the like. The sending unit may also be sometimes referred to as a transmitter, a transmitter circuit, or the like.

It should be understood that the transceiver unit 2410 is configured to perform sending and receiving operations on a terminal device side in the method embodiment shown in FIG. 8, and the processing unit 2420 is configured to perform an operation other than the sending and receiving operations on the terminal device side in the method embodiment shown in FIG. 8.

For example, in an implementation, the transceiver unit 2410 is configured to perform sending and receiving steps on the terminal device side in the embodiment shown in FIG. 8, for example, S83. The processing unit 2420 is configured to perform the operation other than the sending and receiving operations on the terminal device side in the embodiment shown in FIG. 8, for example, S82.

Alternatively, the transceiver unit 2410 is configured to perform sending and receiving operations on a terminal device side in the method embodiment shown in FIG. 10, and the processing unit 2420 is configured to perform an operation other than the sending and receiving operations on the terminal device side in the method embodiment shown in FIG. 10.

For example, in an implementation, the transceiver unit 2410 is configured to perform sending and receiving steps on the terminal device side in the embodiment shown in FIG. 10, for example, S103. The processing unit 2420 is configured to perform the operation other than the sending and receiving operations on the terminal device side in the embodiment shown in FIG. 10, for example, S102.

Alternatively, the transceiver unit 2410 is configured to perform sending and receiving operations on a terminal device side in the method embodiment shown in FIG. 11, and the processing unit 2420 is configured to perform an operation other than the sending and receiving operations on the terminal device side in the method embodiment shown in FIG. 11.

For example, in an implementation, the transceiver unit 2410 is configured to perform sending and receiving steps on the terminal device side in the embodiment shown in FIG. 11, for example, S113 and S114. The processing unit 2420 is configured to perform the operation other than the sending and receiving operations on the terminal device side in the embodiment shown in FIG. 11, for example, S112.

When the communication apparatus is a chip, the chip includes a transceiver unit and a processing unit. The transceiver unit may be an input/output circuit or a communication interface. The processing unit is a processor, a microprocessor, or an integrated circuit that is integrated on the chip.

Figure 25:
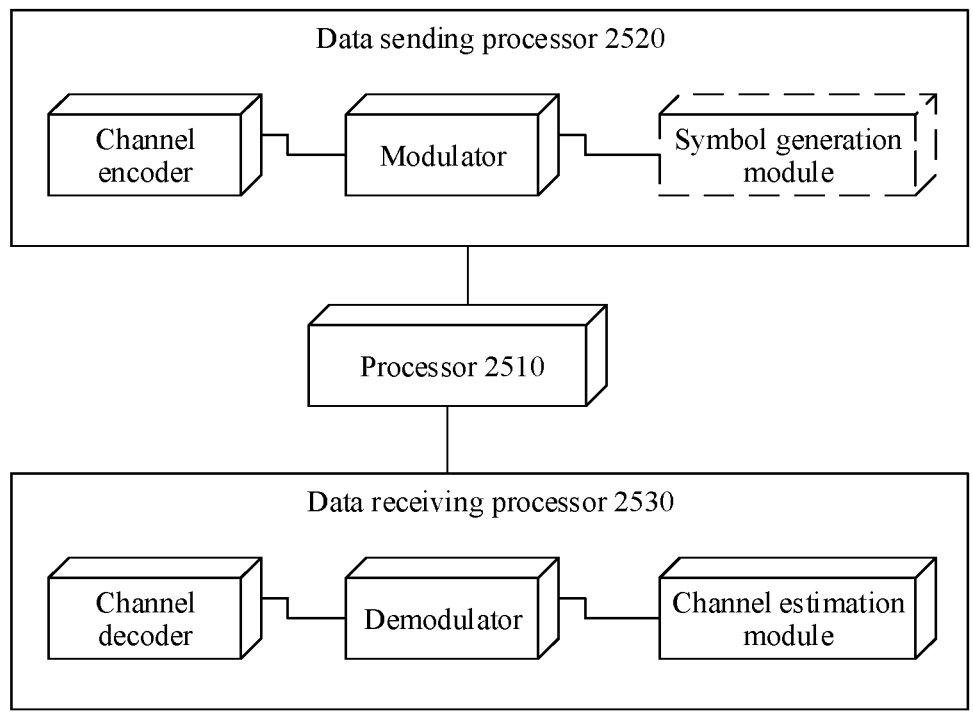
FIG. 25 is another schematic block diagram of a communication apparatus according to an embodiment of this application.

When the communication apparatus in this embodiment of this application is a terminal device, refer to a device shown in FIG. 25. In an example, the device can implement a function similar to a function of a processor 2510 in FIG. 25. In FIG. 25, the device includes the processor 2510, a data sending processor 2520, and a data receiving processor 2530. The processing module 1220 in the foregoing embodiment may be the processor 2510 in FIG. 25, and completes a corresponding function. The transceiver module 1210 in the foregoing embodiment may be the data sending processor 2520 and/or the data receiving processor 2530 in FIG. 25. Alternatively, the processing module 1620 in the foregoing embodiment may be the processor 2510 in FIG. 25, and completes a corresponding function. The transceiver module 1610 in the foregoing embodiment may be the data sending processor 2520 and/or the data receiving processor 2530 in FIG. 25. Alternatively, the processing module 2020 in the foregoing embodiment may be the processor 2510 in FIG. 25, and completes a corresponding function. The transceiver module 2010 in the foregoing embodiment may be the data sending processor 2520 and/or the data receiving processor 2530 in FIG. 25.

Although FIG. 25 shows a channel encoder and a channel decoder, it may be understood that these modules are merely examples, and do not constitute a limitation on this embodiment.

Figure 26:
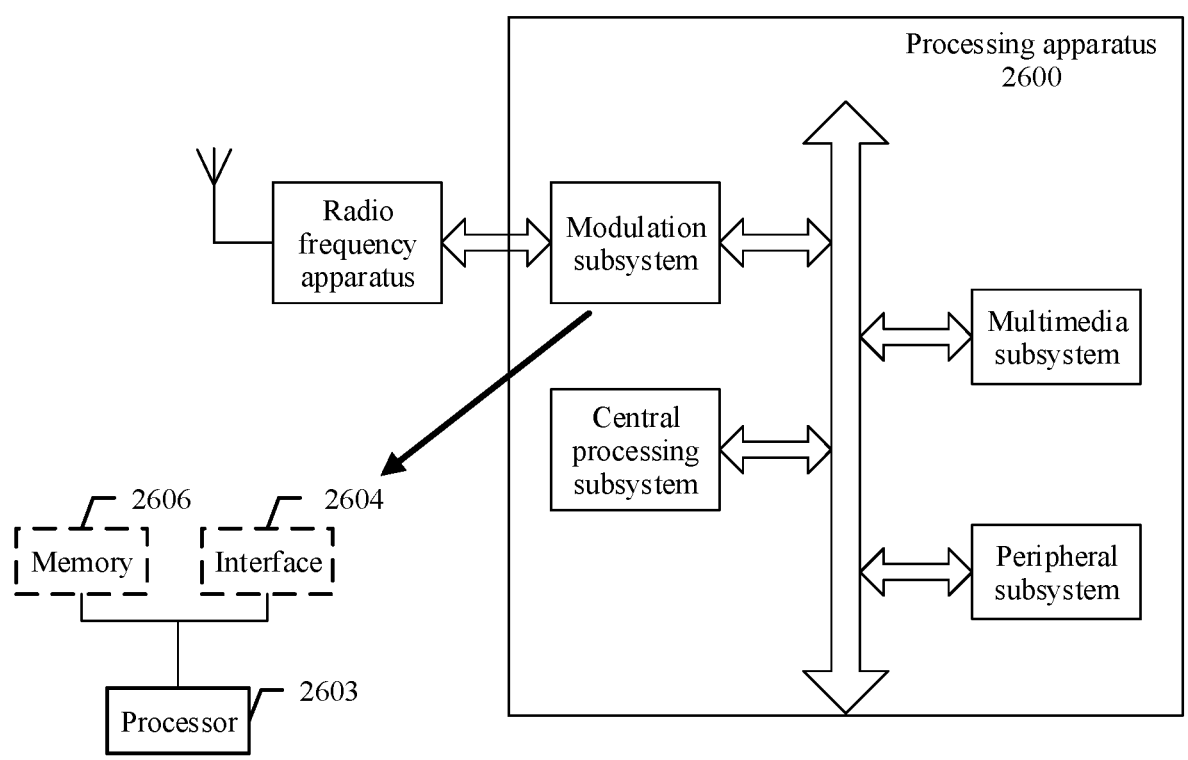
FIG. 26 is still another schematic block diagram of a communication apparatus according to an embodiment of this application.

FIG. 26 shows another form of this embodiment. A processing apparatus 2600 includes modules such as a modulation subsystem, a central processing subsystem, and a peripheral subsystem. The communication apparatus in this embodiment may be used as the modulation subsystem in the processing apparatus 2600. Specifically, the modulation subsystem may include a processor 2603 and an interface 2604. The processor 2603 implements the function of the processing module 1220, and the interface 2604 implements the function of the transceiver module 1210. Alternatively, the processor 2603 implements the function of the processing module 1620, and the interface 2604 implements the function of the transceiver module 1610. Alternatively, the processor 2603 implements the function of the processing module 2020, and the interface 2604 implements the function of the transceiver module 2010. In another variation, the modulation subsystem includes a memory 2606, a processor 2603, and a program that is stored in the memory 2606 and that can be run on the processor. When executing the program, the processor 2603 implements the method on the terminal device side in the method embodiment shown in FIG. 8, the method embodiment shown in FIG. 10, or the method embodiment shown in FIG. 11. It should be noted that the memory 2606 may be a nonvolatile memory, or may be a volatile memory. The memory 2606 may be located in the modulation subsystem, or may be located in the processing apparatus 2600, provided that the memory 2606 can be connected to the processor 2603.

An embodiment of this application further provides a computer-readable storage medium. The computer-readable storage medium stores a computer program. When the program is executed by a processor, a procedure related to the terminal device in the embodiment shown in FIG. 8 provided in the foregoing method embodiments may be implemented.

An embodiment of this application further provides a computer-readable storage medium. The computer-readable storage medium stores a computer program. When the program is executed by a processor, a procedure related to the network device in the embodiment shown in FIG. 8 provided in the foregoing method embodiments may be implemented.

An embodiment of this application further provides a computer-readable storage medium. The computer-readable storage medium stores a computer program. When the program is executed by a processor, a procedure related to the terminal device in the embodiment shown in FIG. 10 provided in the foregoing method embodiments may be implemented.

An embodiment of this application further provides a computer-readable storage medium. The computer-readable storage medium stores a computer program. When the program is executed by a processor, a procedure related to the network device in the embodiment shown in FIG. 10 provided in the foregoing method embodiments may be implemented.

An embodiment of this application further provides a computer-readable storage medium. The computer-readable storage medium stores a computer program. When the program is executed by a processor, a procedure related to the terminal device in the embodiment shown in FIG. 11 provided in the foregoing method embodiments may be implemented.

An embodiment of this application further provides a computer-readable storage medium. The computer-readable storage medium stores a computer program. When the program is executed by a processor, a procedure related to the network device in the embodiment shown in FIG. 11 provided in the foregoing method embodiments may be implemented.

An embodiment of this application further provides a computer program product including instructions. When the instructions are executed, the method on a terminal device side in the method embodiment shown in FIG. 8 is performed.

An embodiment of this application further provides a computer program product including instructions. When the instructions are executed, the method on a network device side in the method embodiment shown in FIG. 8 is performed.

An embodiment of this application further provides a computer program product including instructions. When the instructions are executed, the method on a terminal device side in the method embodiment shown in FIG. 10 is performed.

An embodiment of this application further provides a computer program product including instructions. When the instructions are executed, the method on a network device side in the method embodiment shown in FIG. 10 is performed.

An embodiment of this application further provides a computer program product including instructions. When the instructions are executed, the method on a terminal device side in the method embodiment shown in FIG. 11 is performed.

An embodiment of this application further provides a computer program product including instructions. When the instructions are executed, the method on a network device side in the method embodiment shown in FIG. 11 is performed.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through examples rather than limitative descriptions, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (e.g., a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the apparatus embodiments described in the foregoing are only examples. For example, division into the units is only division into logical functions, and may be another division manner during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. A part or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be subject to the protection scope of the claims.

What is claimed is:

1. A communication method, comprising:
   receiving first signaling, wherein the first signaling indicates to deactivate packet data convergence protocol (PDCP) duplication transmission of a first logical channel;
   determining, depending on whether a third logical channel in an activated state and the first logical channel belong to a same media access control (MAC) entity, whether an association relationship between a carrier and the third logical channel in the activated state applies, wherein the first logical channel and the third logical channel in the activated state belong to a same radio bearer, and the radio bearer is configured for PDCP duplication transmission; and
   transmitting data of the third logical channel.

2. The method according to claim 1, wherein the determining whether the association relationship between the carrier and the third logical channel in the activated state applies comprises:
   responsive to determining that a second logical channel in the activated state and the first logical channel belong to a same MAC entity, determining that an association relationship between the carrier and the second logical channel does not apply.

3. The method according to claim 2, wherein the method further comprises:
   determining that a data packet carried on the second logical channel is capable of being transmitted on a first type of carrier, wherein the first type of carrier comprises all carriers corresponding to the MAC entity, or the first type of carrier comprises a carrier that had an association relationship with the first logical channel before deactivation of the first logical channel and a carrier that has an association relationship with the second logical channel.

4. The method according to claim 1, wherein the determining whether the association relationship between the carrier and the third logical channel in the activated state applies comprises:
   responsive to determining that the third logical channel in the activated state and the first logical channel belong to the same MAC entity, and a quantity of logical channels in the activated state is 1, determining that the association relationship between the carrier and the third logical channel in the activated state does not apply;
   responsive to determining that the third logical channel in the activated state and the first logical channel belong to the same MAC entity, and a quantity of logical channels in the activated state is greater than 1, determining that the association relationship between the carrier and the third logical channel in the activated state still applies; or
   responsive to determining that the third logical channel in the activated state and the first logical channel belong to the same MAC entity, and a quantity of logical channels in the activated state is greater than 1, determining, based on first information, the carrier used to transmit a data packet carried on the third logical channel in the activated state, wherein the first information is obtained from the first signaling, or the first information is preset information.

5. The method according to claim 1, wherein the determining whether the association relationship between the carrier and the third logical channel in the activated state applies comprises:
  responsive to determining that the third logical channel in the activated state and the first logical channel belong to different MAC entities, determining that the association relationship between the carrier and the third logical channel in the activated state still applies.

6. A communication device, comprising:
  a transceiver, configured to receive first signaling, wherein the first signaling indicates to deactivate packet data convergence protocol (PDCP) duplication transmission of a first logical channel; and
  a processor, configured to:
    determine, depending on whether a third logical channel in an activated state and the first logical channel belong to a same media access control (MAC) entity, whether an association relationship between a carrier and the third logical channel in the activated state applies, wherein the first logical channel and the third logical channel in the activated state belong to a same radio bearer, and the radio bearer is configured for PDCP duplication transmission; and
    cause data of the third logical channel to be transmitted via the transceiver.

7. The communication device according to claim 6, wherein the processor configured to determine whether the association relationship between the carrier and the third logical channel in the activated state applies comprises:
  responsive to determining that a second logical channel in the activated state and the first logical channel belong to a same MAC entity, determining that an association relationship between the carrier and the second logical channel does not apply.

8. The communication device according to claim 7, wherein the processor is further configured to determine that a data packet carried on the second logical channel is capable of being transmitted on a first type of carrier, wherein the first type of carrier comprises all carriers corresponding to the MAC entity, or the first type of carrier comprises a carrier that had an association relationship with the first logical channel before deactivation of the first logical channel and a carrier that has an association relationship with the second logical channel.

9. The communication device according to claim 6, wherein the processor configured to determine whether the association relationship between the carrier and the third logical channel in the activated state applies comprises:
  responsive to determining that the third logical channel in the activated state and the first logical channel belong belongs to the same MAC entity, and a quantity of logical channels in the activated state is 1, determining that the association relationship between the carrier and the third logical channel in the activated state does not apply;
  responsive to determining that the third logical channel in the activated state and the first logical channel belong to the same MAC entity, and a quantity of logical channels in the activated state is greater than 1, determining that the association relationship between the carrier and the third logical channel in the activated state still applies; or
  responsive to determining that the third logical channel in the activated state and the first logical channel belong to the same MAC entity, and a quantity of logical channels in the activated state is greater than 1, determining, based on first information, the carrier used to transmit a data packet carried on the third logical channel in the activated state, wherein the first information is obtained from the first signaling, or the first information is preset information.

10. The communication device according to claim 6, wherein the processor configured to determine whether the association relationship between the carrier and the third logical channel in the activated state applies comprises:
  responsive to determining that the third logical channel in the activated state and the first logical channel belong to different MAC entities, determining that the association relationship between the carrier and the third logical channel in the activated state still applies.

11. A communication device, comprising:
  a processor, configured to determine to deactivate packet data convergence protocol (PDCP) duplication transmission of a first logical channel; and
  a transceiver, configured to send first signaling to a terminal device, wherein the first signaling indicates the terminal device to:
  deactivate the PDCP duplication transmission of the first logical channel;
  determine, depending on whether a third logical channel in an activated state and the first logical channel belong to a same media access control (MAC) entity, whether an association relationship between a carrier and the third logical channel in the activated state applies, wherein the first logical channel and the third logical channel in the activated state belong to a same radio bearer, and the radio bearer is configured for PDCP duplication transmission; and
  transmit data of the third logical channel.

12. The communication device according to claim 11, wherein that the first signaling indicates the terminal device to determine whether the association relationship between the carrier and the third logical channel in the activated state applies comprises:
  the first signaling indicates the terminal device to determine, responsive to determining that a second logical channel in the activated state and the first logical channel belong to a same MAC entity, that an association relationship between the carrier and the second logical channel does not apply.

13. The communication device according to claim 12, wherein the first signaling further indicates the terminal device to determine that a data packet carried on the second logical channel is capable of being transmitted on a first type of carrier, wherein the first type of carrier comprises all carriers corresponding to the MAC entity, or the first type of carrier comprises a carrier that had an association relationship with the first logical channel before deactivation of the first logical channel and a carrier that has an association relationship with the second logical channel.

14. The communication device according to claim 11, wherein that the first signaling indicates the terminal device to determine whether the association relationship between the carrier and the third logical channel in the activated state applies comprises:
  the first signaling indicates the terminal device to determine, responsive to determining that the third logical channel in the activated state and the first logical channel belong to the same MAC entity, and a quantity of logical channels in the activated state is 1, that the association relationship between the carrier and the third logical channel in the activated state does not apply;

the first signaling indicates the terminal device to determine, responsive to determining that the third logical channel in the activated state and the first logical channel belong to the same MAC entity, and a quantity of logical channels in the activated state is greater than 1, that the association relationship between the carrier and the third logical channel in the activated state still applies; or the first signaling indicates the terminal device to determine, based on first information and responsive to determining that the third logical channel in the activated state and the first logical channel belong to the same MAC entity, and a quantity of logical channels in the activated state is greater than 1, the carrier used to transmit a data packet carried on the third logical channel in the activated state, wherein the first information is obtained from the first signaling, or the first information is preset information.

15. The communication device according to claim 11, wherein that the first signaling indicates the terminal device to determine whether the association relationship between the carrier and the third logical channel in the activated state applies comprises:

the first signaling indicates the terminal device to determine, responsive to determining that the third logical channel in the activated state and the first logical channel belong to different MAC entities, that the association relationship between the carrier and the third logical channel in the activated state still applies.

16. A method applied in a terminal device or a processor of the terminal device, comprising:

obtaining, a configured parameter indicating an association between a logical channel and an allowed serving cell for data transmission on the logical channel; and determining, the association between the logical channel and the allowed serving cell does not apply when a PDCP duplication transmission function for a radio bearer in a CA scenario is deactivated, wherein the PDCP duplication transmission function for the radio bearer in the CA scenario is configured with logical channels, including the logical channel, for the PDCP duplication transmission function in the CA scenario and only the logical channel of the radio bearer remains activated when the PDCP duplication transmission function for the radio bearer in the CA scenario is deactivated.

17. The method according to claim 16, wherein the logical channels for the PDCP duplication transmission function in the CA scenario belong to a same MAC entity.

18. A communication device, comprising:

at least one processor; and one or more memories coupled to the at least one processor and storing programming instructions for execution by the at least one processor to perform operations comprising:

obtaining, a configured parameter indicating an association between a logical channel and an allowed serving cell for data transmission on the logical channel; and determining, the association between the logical channel and the allowed serving cell does not apply when a PDCP duplication transmission function for a radio bearer in a CA scenario is deactivated, wherein the PDCP duplication transmission function for the radio bearer in the CA scenario is configured with logical channels, including the logical channel, for the PDCP duplication transmission function in the CA scenario and only the logical channel of the radio bearer remains activated when the PDCP duplication transmission function for the radio bearer in the CA scenario is deactivated.

19. The apparatus according to claim 18, wherein the logical channels for the PDCP duplication transmission function in the CA scenario belong to a same MAC entity.

* * * * *